US007751539B2

(12) United States Patent
Watano

(10) Patent No.: US 7,751,539 B2
(45) Date of Patent: Jul. 6, 2010

(54) TELECOMMUNICATION CONTROL SYSTEM

(75) Inventor: Yuichi Watano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1104 days.

(21) Appl. No.: 11/412,941

(22) Filed: Apr. 28, 2006

(65) Prior Publication Data

US 2007/0172048 A1 Jul. 26, 2007

(30) Foreign Application Priority Data

Jan. 26, 2006 (JP) ............................. 2006-018072

(51) Int. Cl.
*H04M 11/00* (2006.01)
(52) U.S. Cl. ................. 379/93.08; 379/90.01
(58) Field of Classification Search ............. 379/93.32, 379/93.28, 93.08, 93.01
See application file for complete search history.

(56) References Cited

U.S. PATENT DOCUMENTS

2005/0064821 A1\* 3/2005 Hedberg et al. .......... 455/67.11

FOREIGN PATENT DOCUMENTS

| EP | 1594326 | 11/2005 |
|----|---------|---------|
| JP | A-H07-115634 | 5/1995 |
| JP | A-2000-174839 | 6/2000 |
| JP | A-2001-309086 | 11/2001 |
| JP | A-2002-281175 | 9/2002 |
| JP | A-2003-46676 | 2/2003 |

OTHER PUBLICATIONS

European Extended Search Report (for the corresponding European patent application No. 06252152.1-1249/1814346 dated Dec. 1, 2009.
"Universal Mobile Telecommunications System (UMTS); Technical realization of Circuit Switched (CS) multimedia service; UDI/RDI fallback and service modification; stage 2 (3GPP TS 23.172 version 6.3.0 Release 6)" dated Jun. 2005; pp. 1-57.

\* cited by examiner

*Primary Examiner*—Stella L Woo
(74) *Attorney, Agent, or Firm*—Hanify & King, PC

(57) ABSTRACT

In order to provide a telecommunication control system for determining the most appropriate connection configuration according to a connection configuration requested by a caller terminal and a receiver terminal, the telecommunication control system comprises a caller priority call category judgment unit for generating a first priority call category identifier by judging a priority call category from first connection configuration information; a priority call category identifier notification unit for notifying a receiver side telecommunication control system of the first priority call category identifier; a requested call category judgment unit for judging a requested call category from a first priority call category identifier; a requested call category notification unit for notifying the receiver terminal of the requested call category; a receiver priority call category judgment unit for generating a second priority call category identifier from second connection configuration information; a connection call category judgment unit for judging a connection call category from the first priority call category identifier and second priority call category identifier; and a telecommunication establishment unit for making telecommunication established by the connection call category.

7 Claims, 59 Drawing Sheets

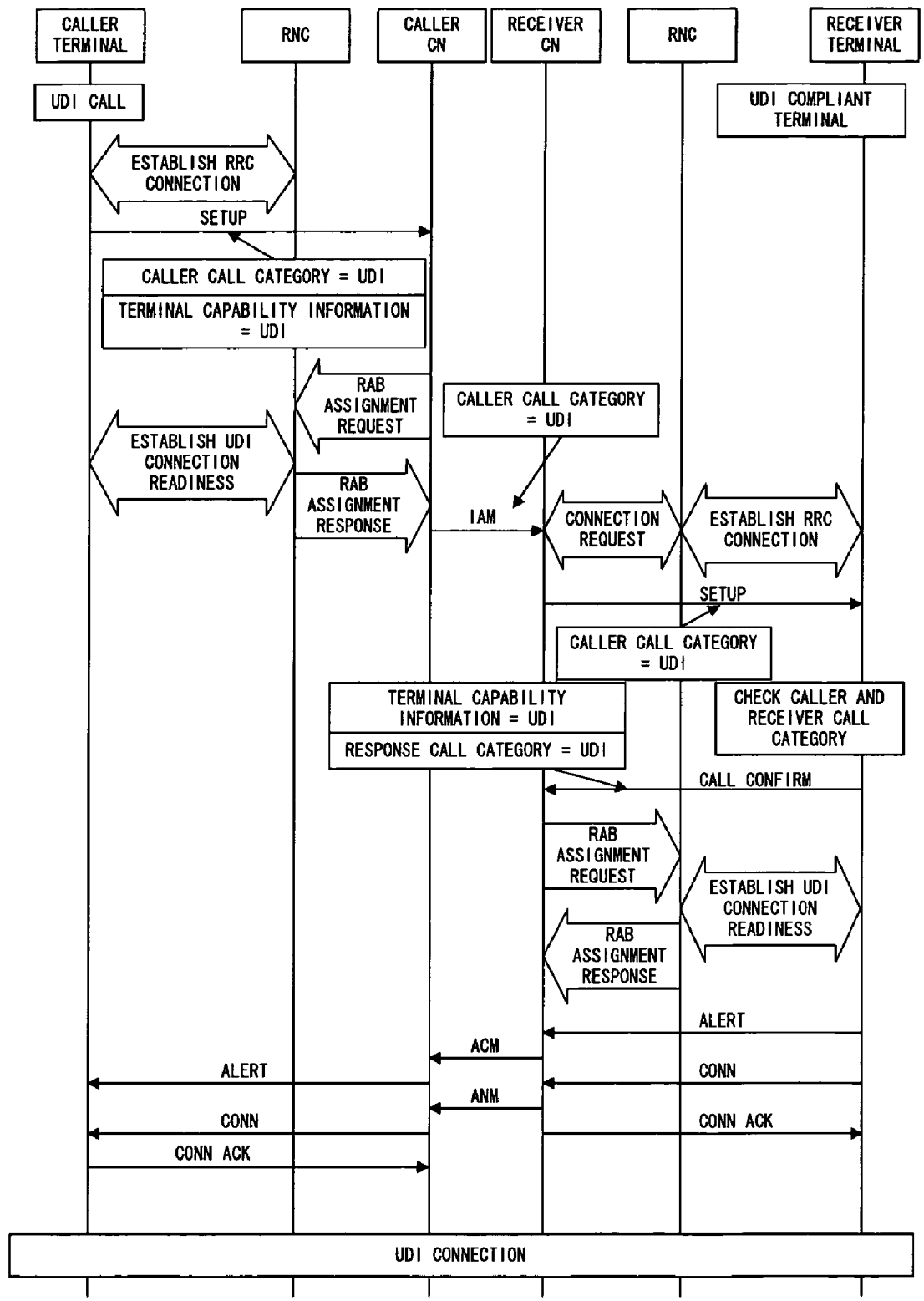
F I G. 1

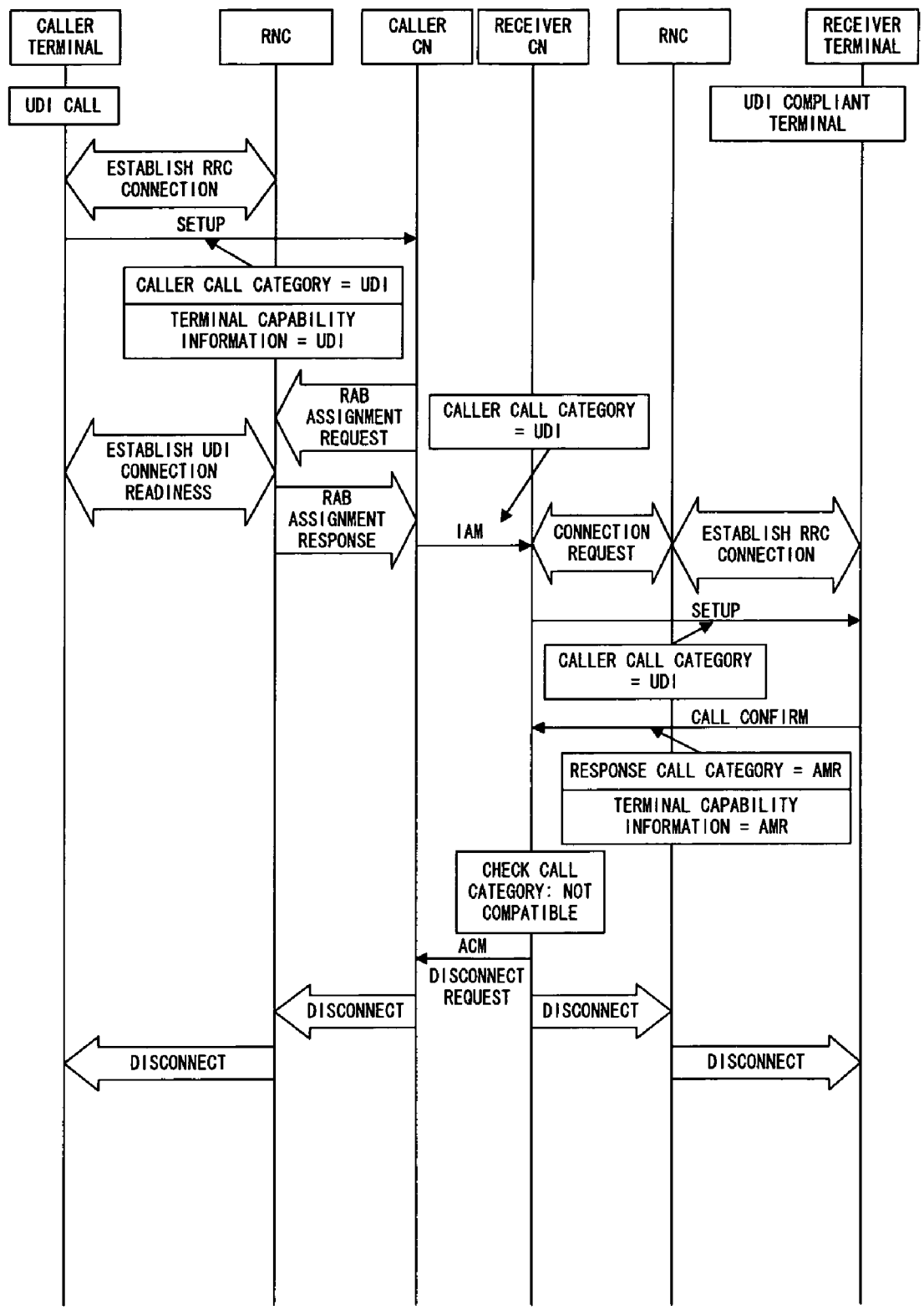
F I G. 2

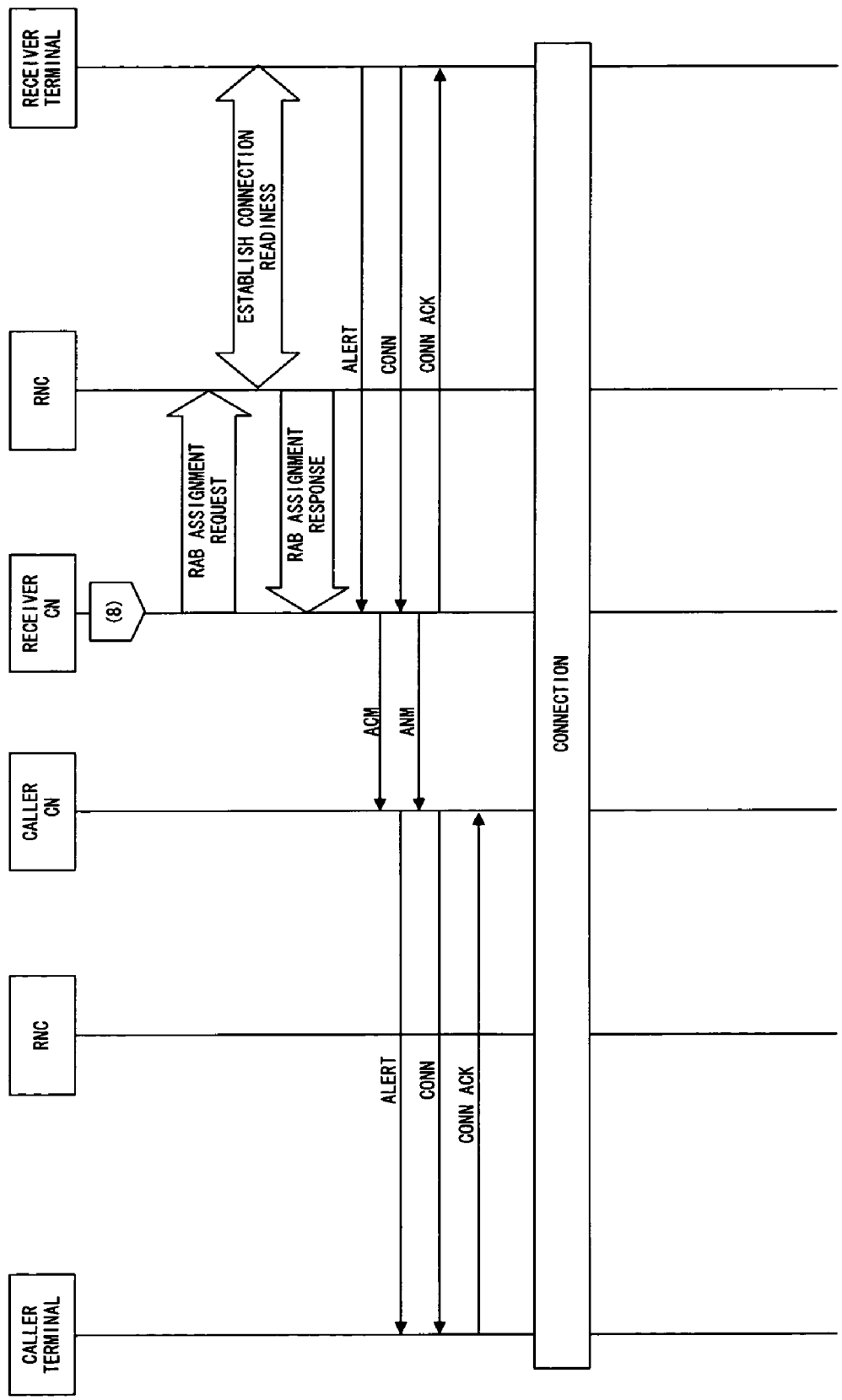
F I G. 7

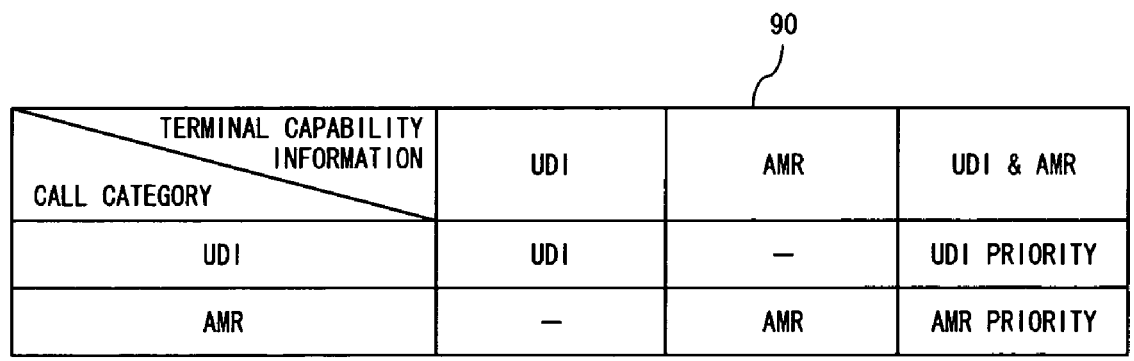
F I G. 1 1

| PRIORITY CALL CATEGORY IDENTIFIER | REQUESTED CALL CATEGORY |
|---|---|
| UDI | UDI |
| UDI PRIORITY | UDI |
| AMR | AMR |
| AMR PRIORITY | AMR |

F I G. 1 2

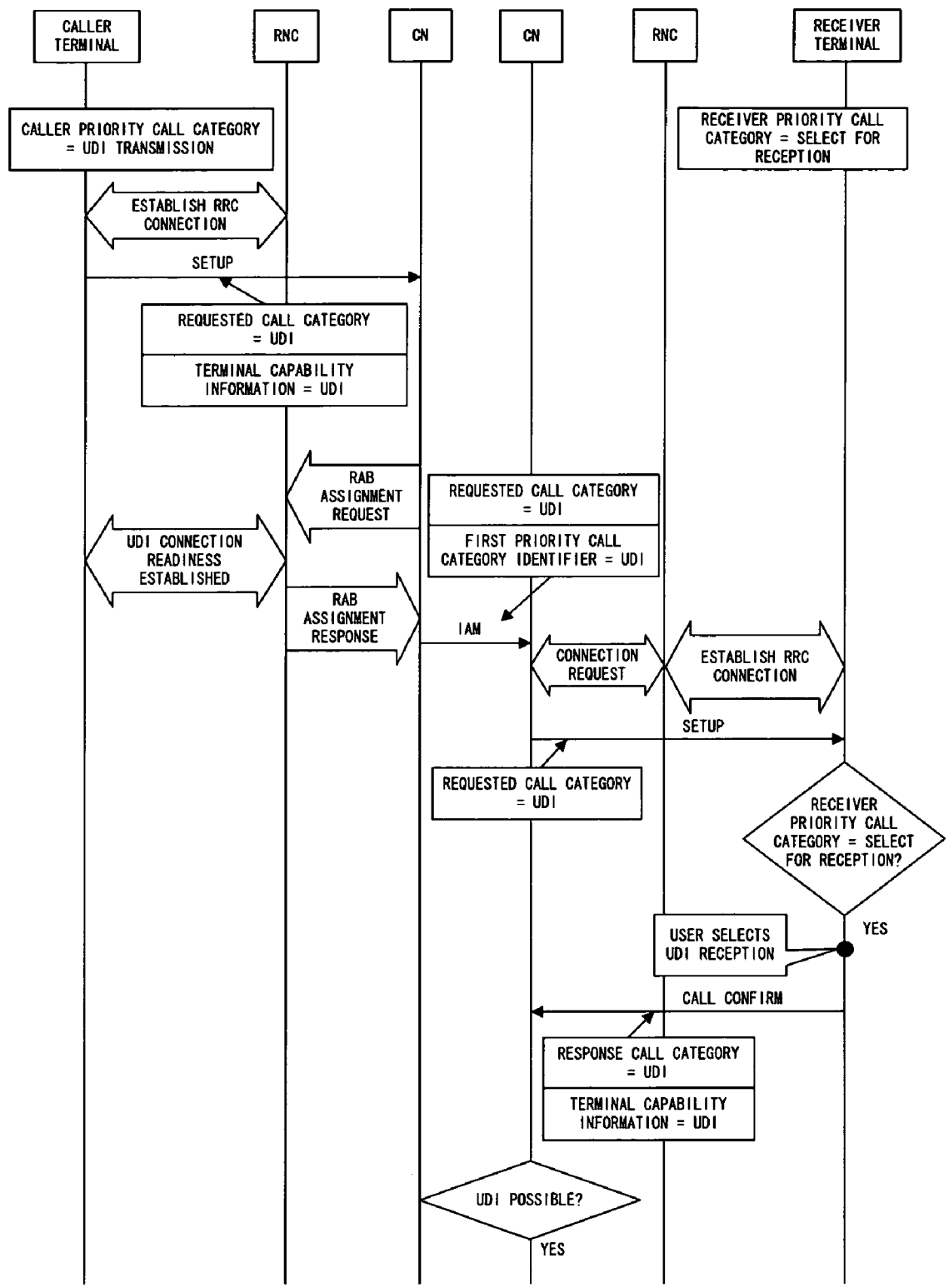
F I G. 2 3

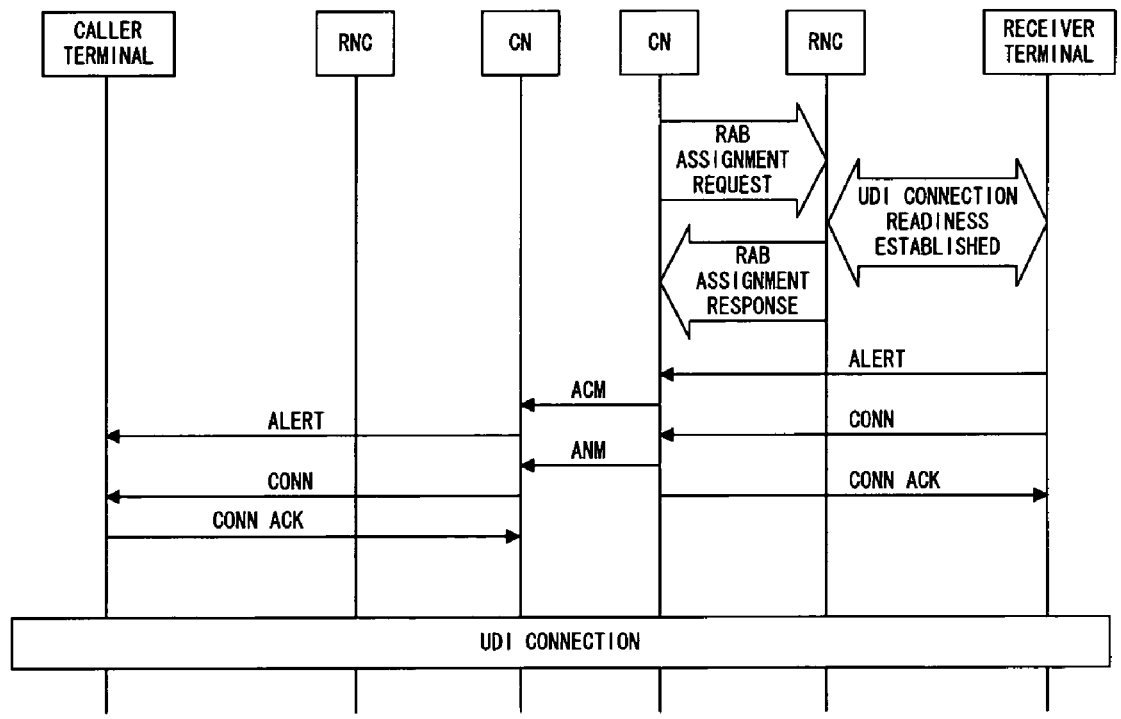
F I G. 2 4

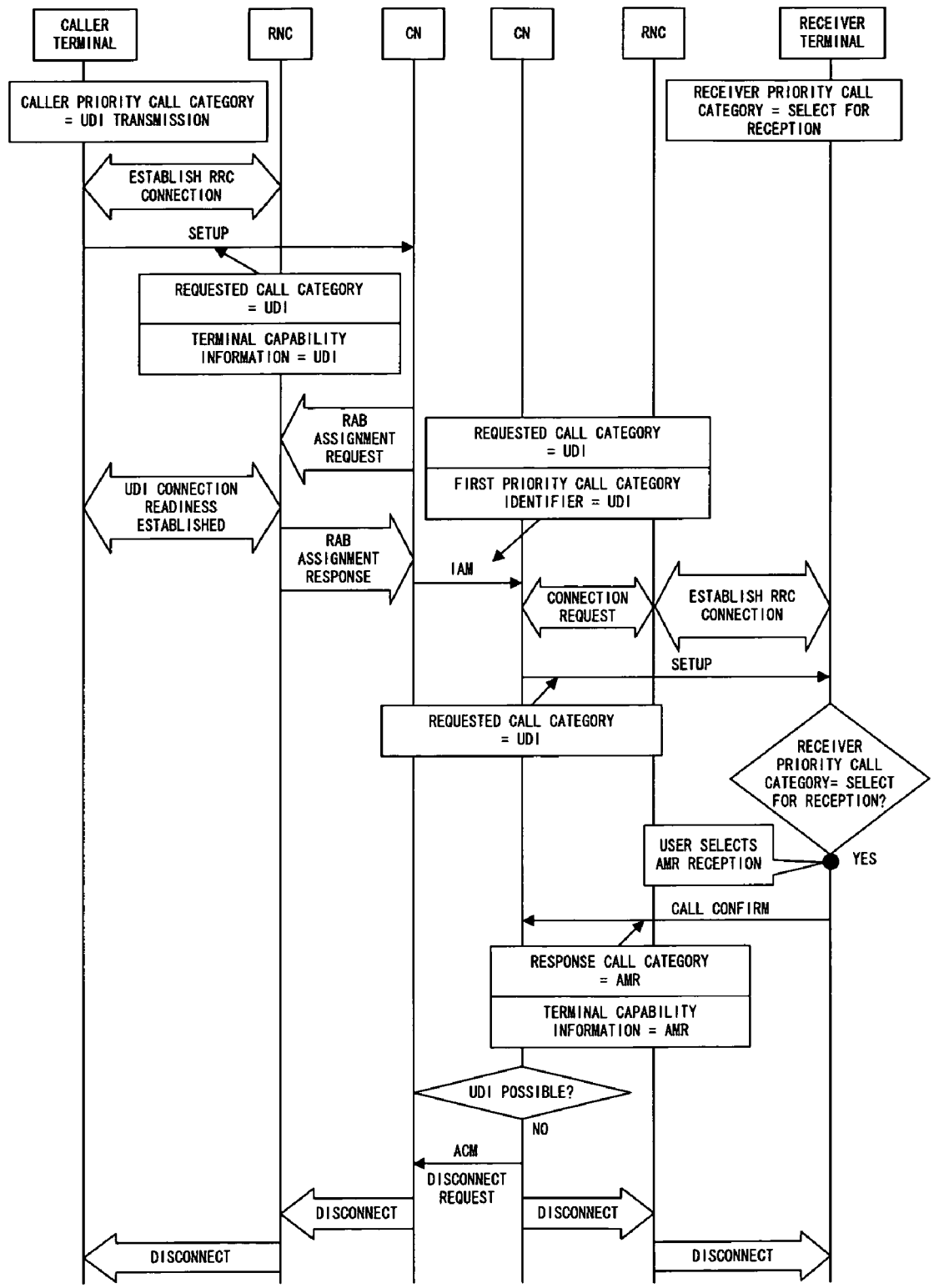
F I G. 2 5

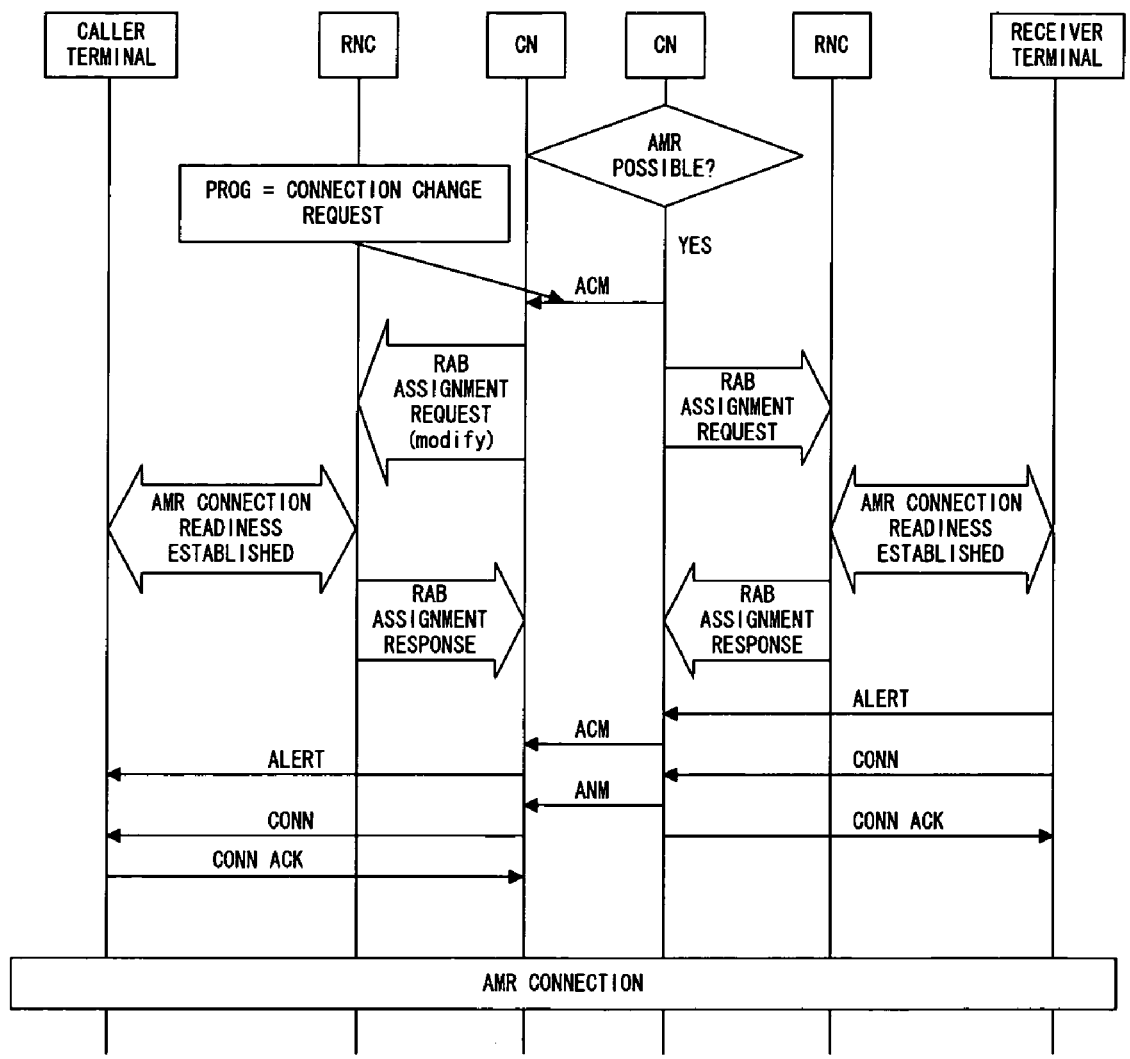
F I G. 3 1

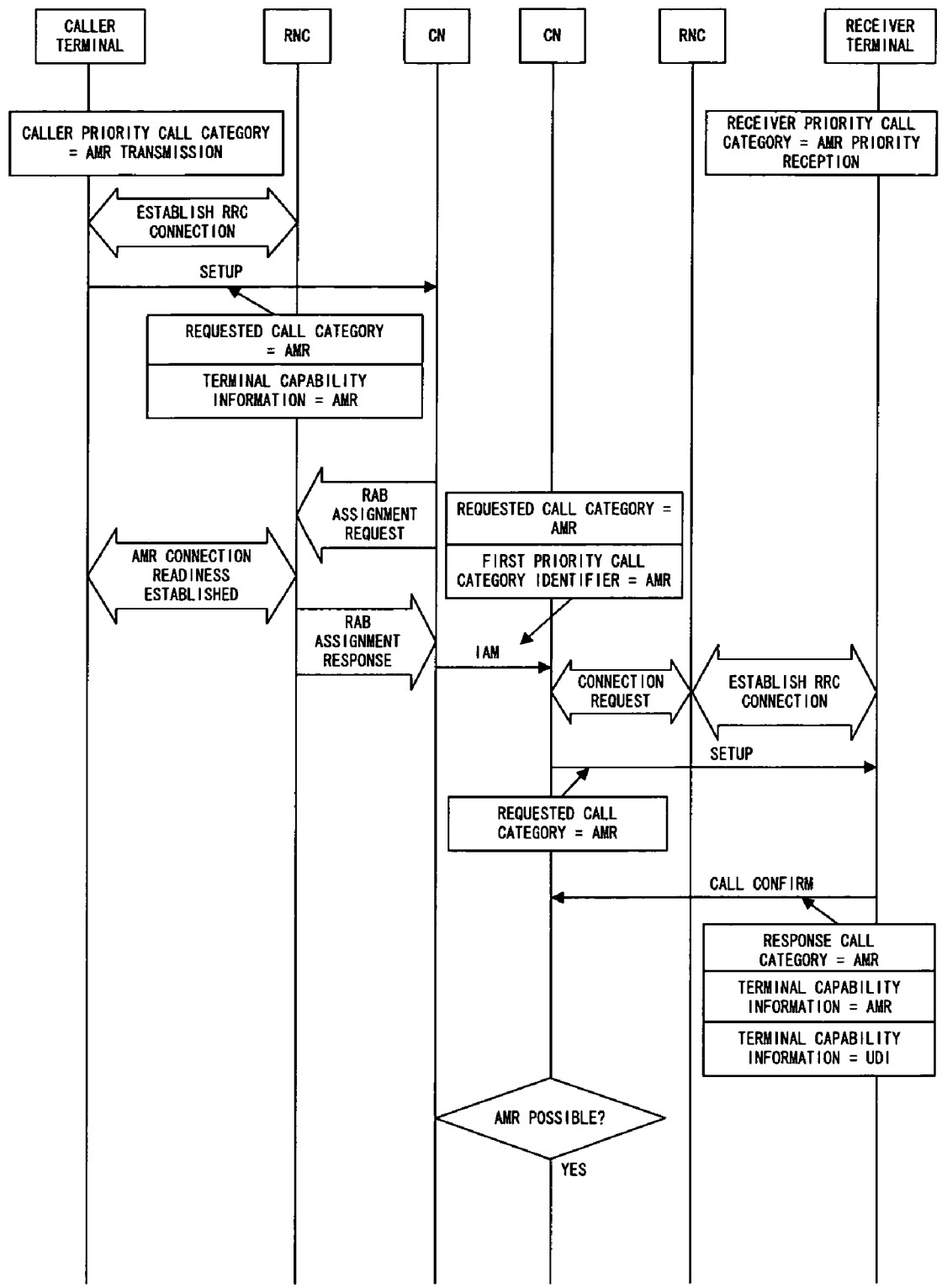
F I G. 40

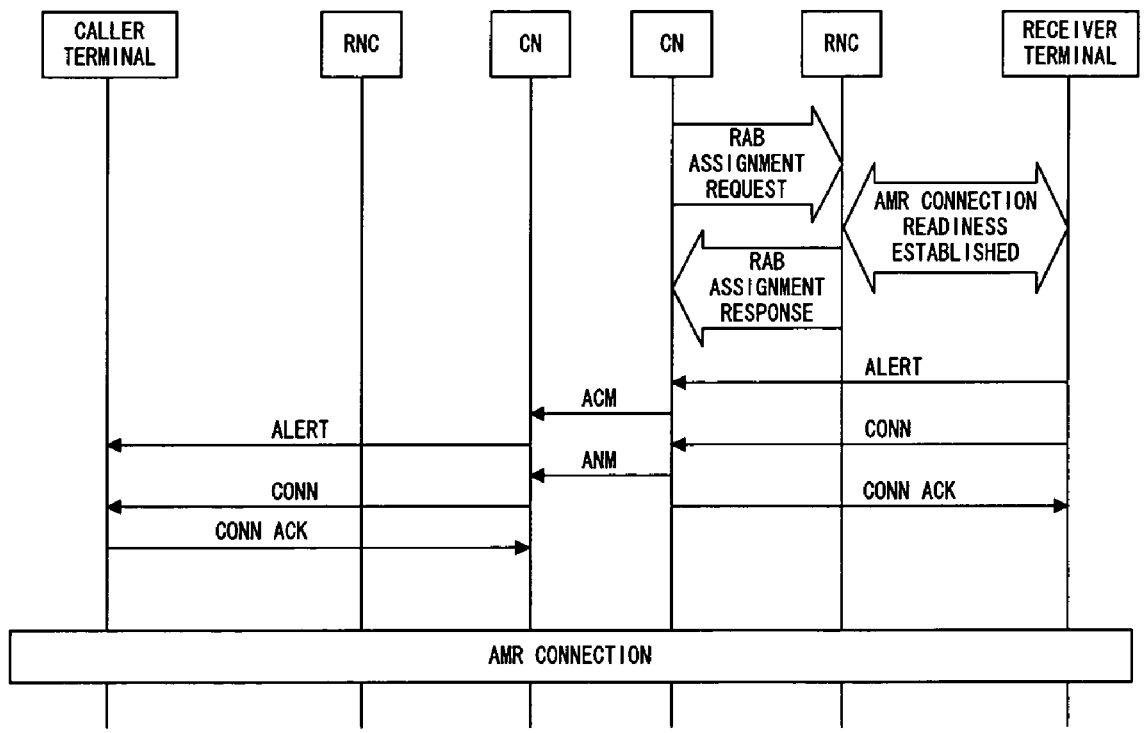
F I G. 4 1

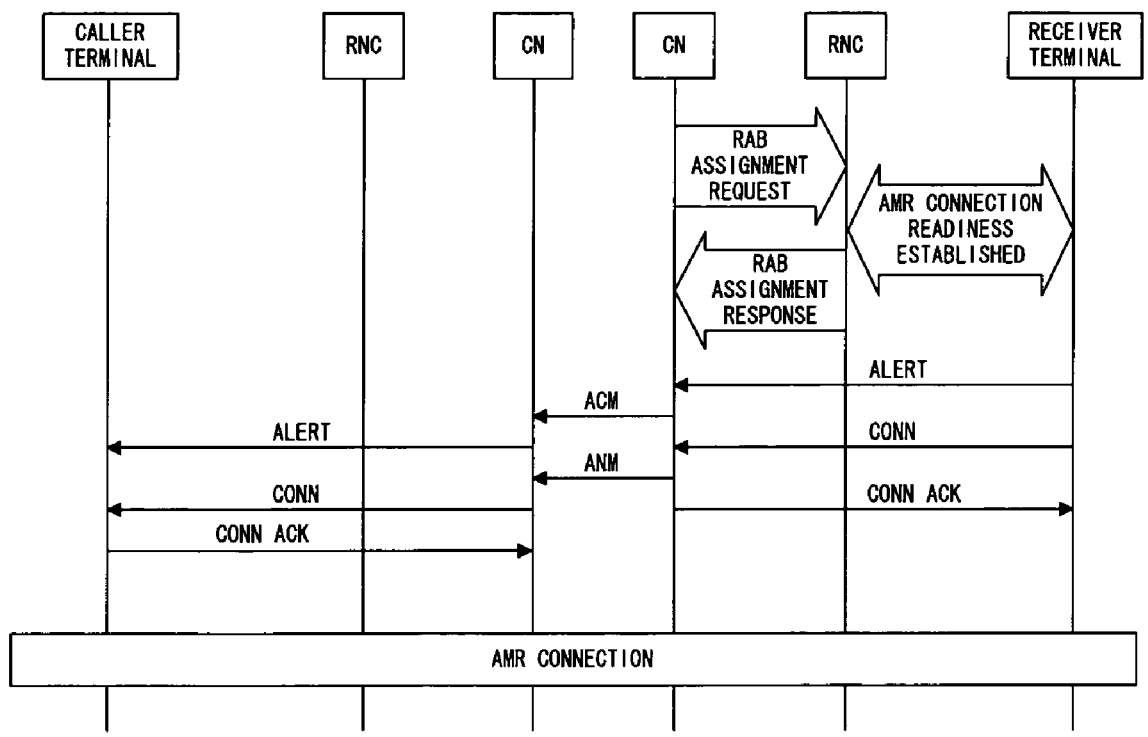
F I G. 4 4

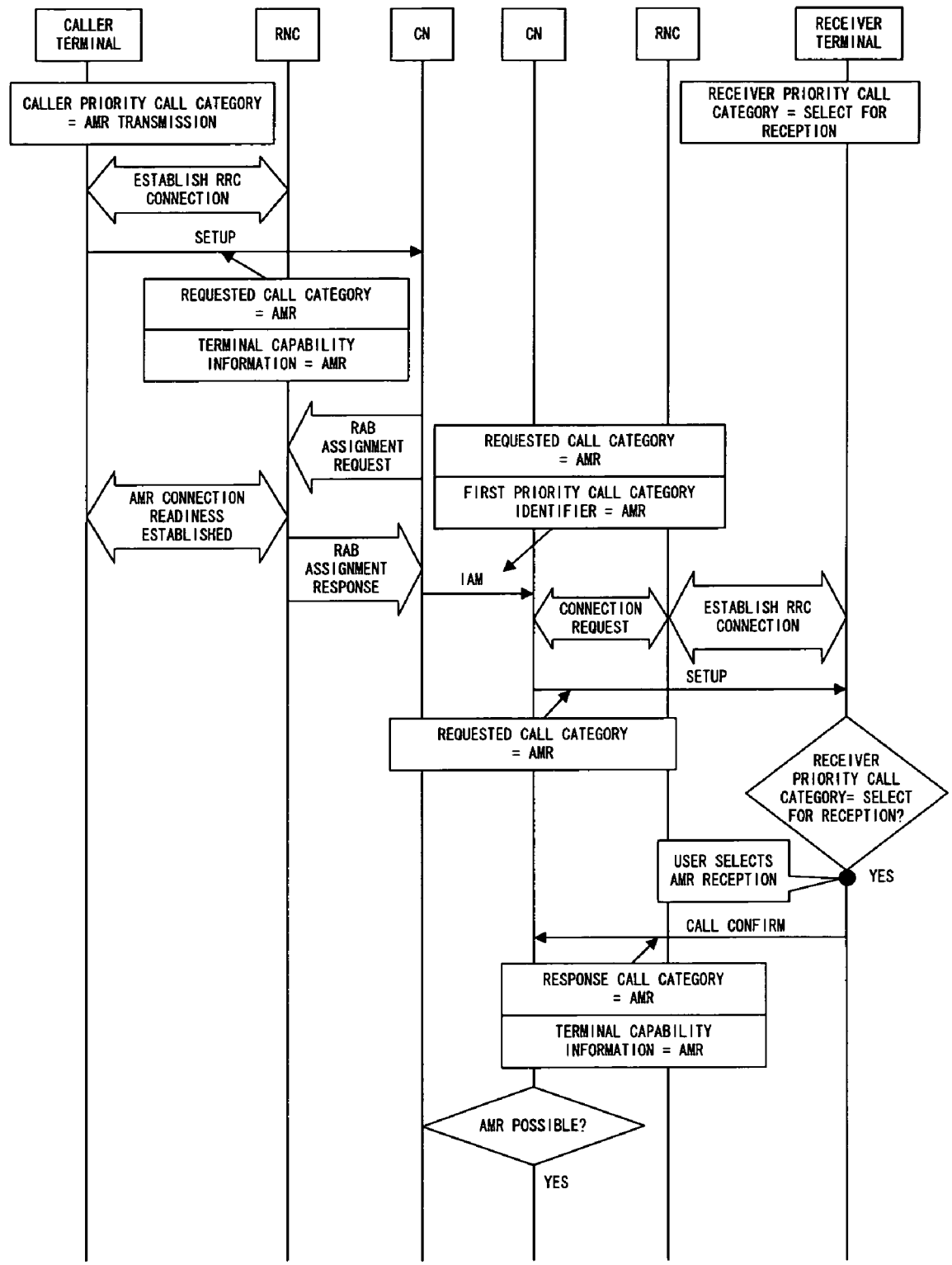
F I G. 4 5

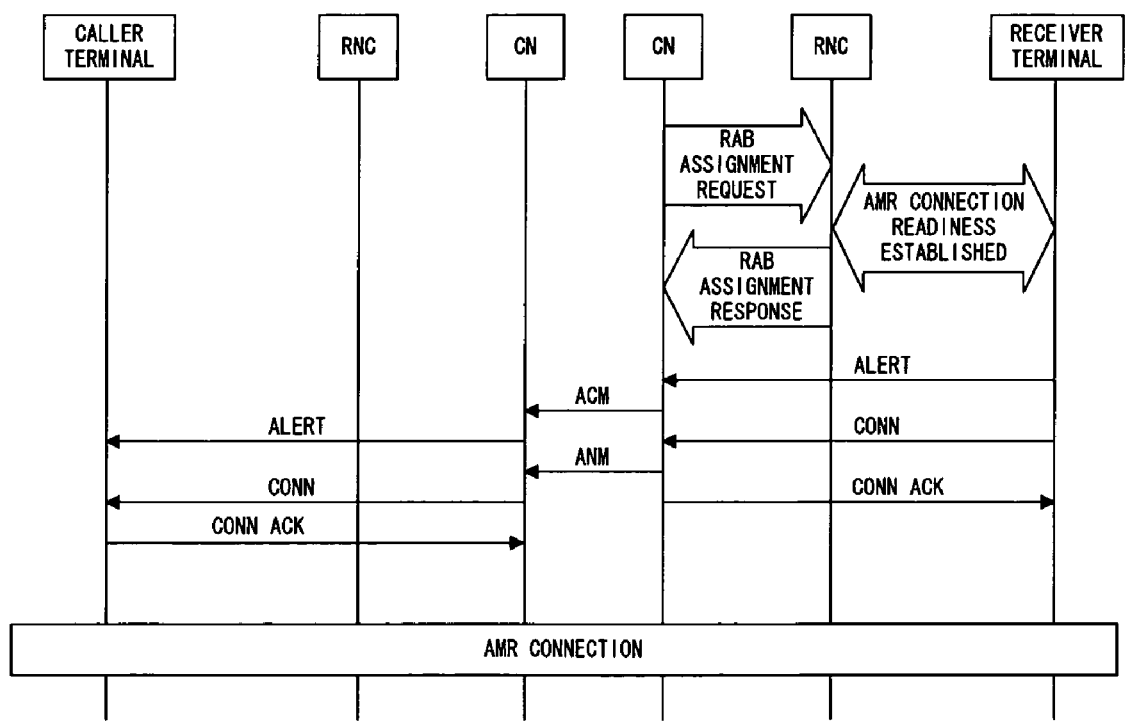
F I G. 4 6

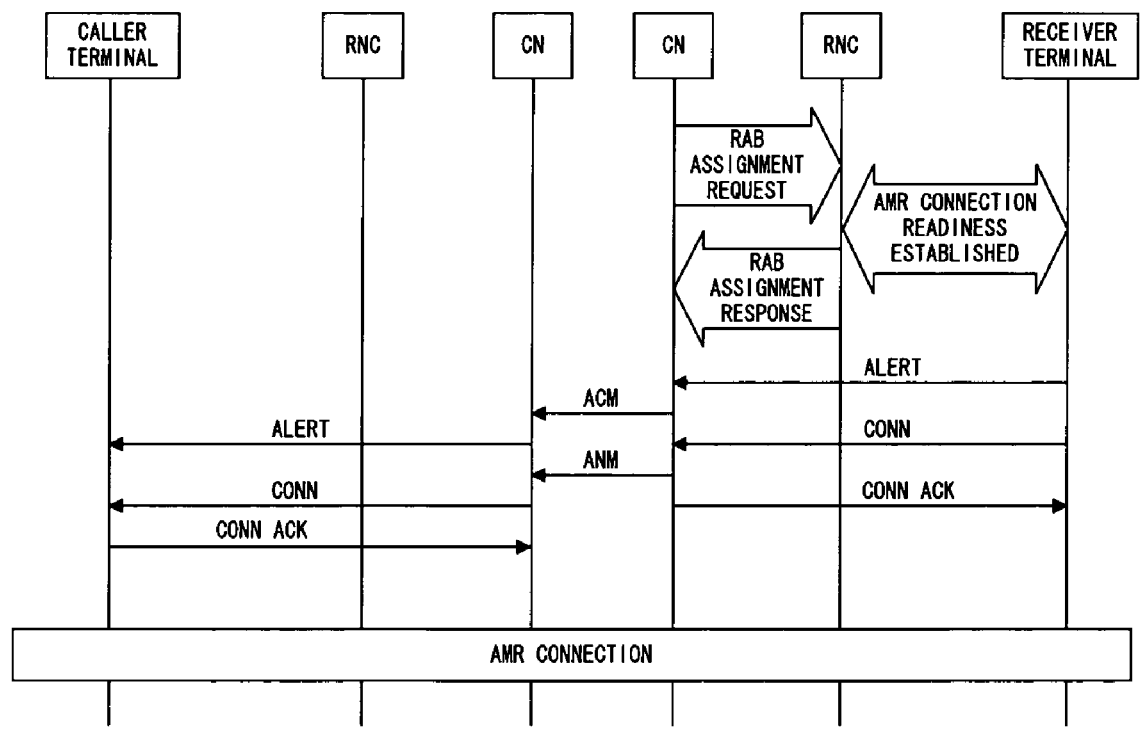
F I G. 5 1

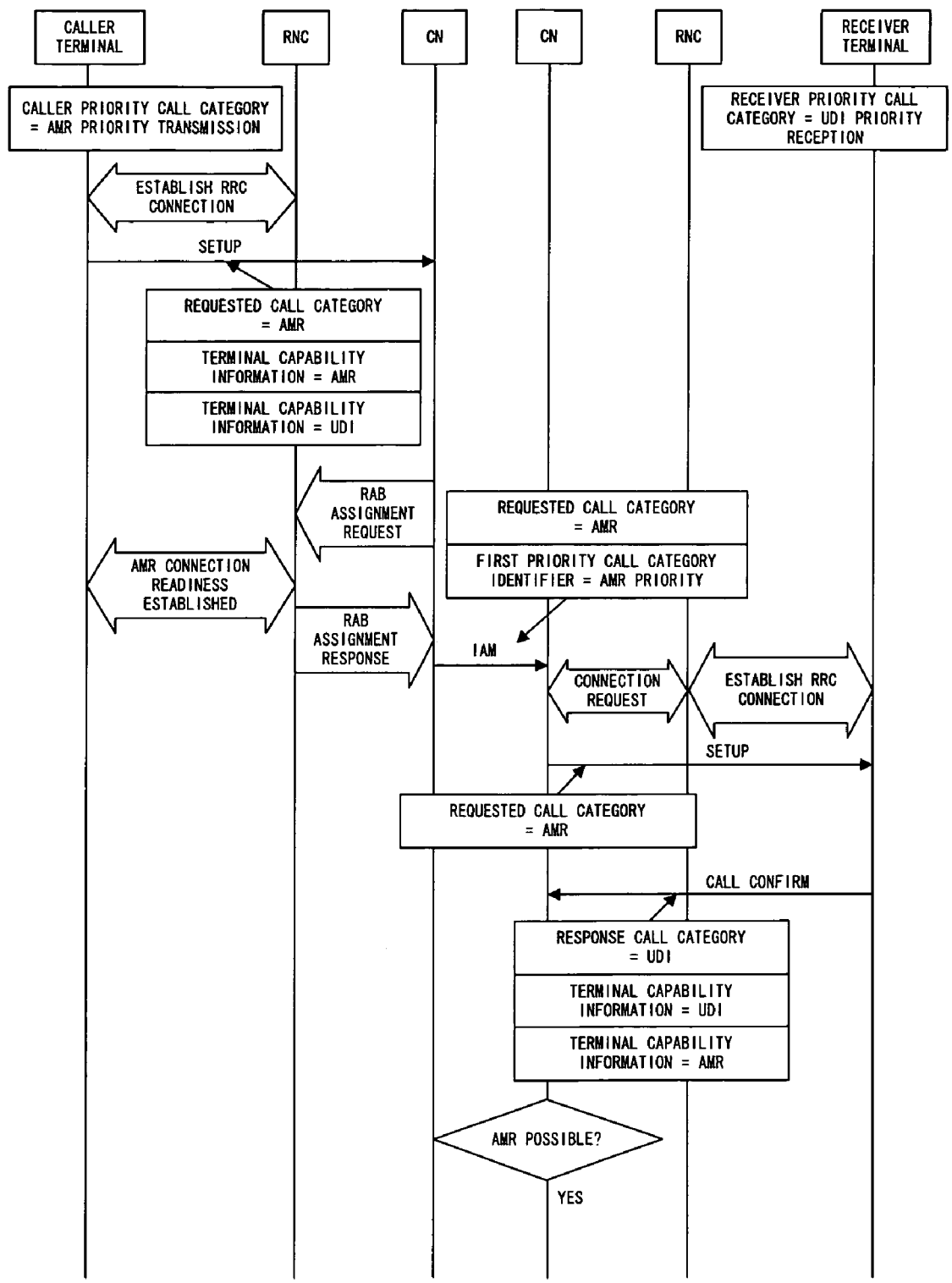
F I G. 54

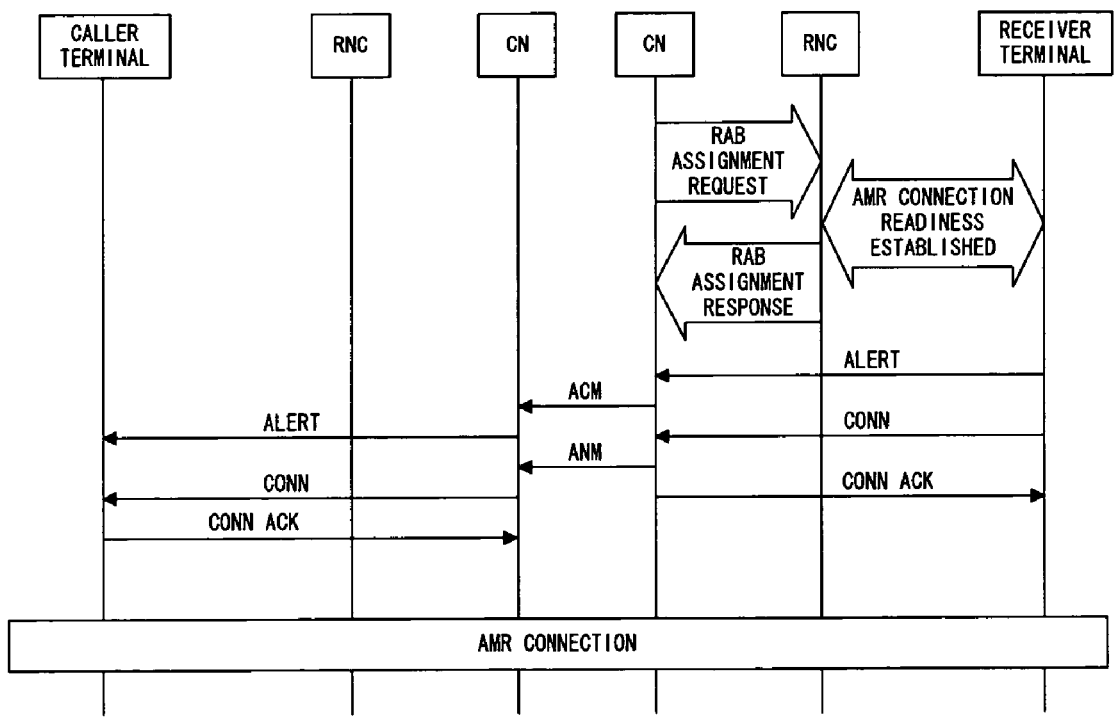
F I G. 5 5

TELECOMMUNICATION CONTROL SYSTEM

BACKGROUND OF THE INVENTION

1. Field of the Invention

The present invention relates to a telecommunication control system allowing a selection of AMR (Adaptive Multi-Rate) connection or UDI (Unrestricted Digital Information) connection on an as required basis in a mobile telecommunication system which carries out telecommunications between portable terminals.

2. Description of the Related Art

In a mobile telecommunication system, a general practice is for a caller to request for a call by selecting an AMR or a UDI at the time of a call. In this case, if a UDI call is transmitted to a terminal incompatible with the UDI, a connection is once interrupted, followed by calling again as an AMR connection (N.B.: there is a terminal with the function of automatically changing over to the AMR).

FIG. 1 exemplifies conventional telecommunication processing in the case of transmitting a UDI call to a portable terminal compatible with a UDI.

A caller terminal transmits a SETUP signal and also a SETUP setting (i.e., a call request category of "UDI", and terminal capability information of "UDI") (N.B.: the preposition "of" in front of word(s) in quotation, such as "UDI", "AMR", et cetera, is grammatically appositional throughout this specification) to an RNC (Radio Network Controller), and to a caller side CN (Core Network) after establishing an RNC and an RRC (Radio Resource Control) CONNECTION.

Meanwhile, having received a Setup setting, the caller side CN makes a UDI connection readiness established between the caller terminal and RNC, followed by transmitting an IAM signal and also a requested call category of "UDI" to a receiver side CN (i.e., a CN on a receiver side).

Having received the IAM signal, the receiver side CN establishes an RRC CONNECTION between the RNC and a receiver terminal, followed by notifying of a requested call category of "UDI" together with a SETUP signal.

Having received the SETUP signal, the receiver terminal checks the caller call category and transmits a CALL CONFIRM setting (i.e., a response call category of "UDI" and terminal capability information of "UDI") together with a CALL CONFIRM signal to the receiver side CN.

Having received the CALL CONFIRM setting, the receiver side CN makes a UDI connection readiness established between the RNC and receiver terminal.

As a connection readiness is established between the RNC and receiver terminal, the receiver terminal transmits an ALERT signal, a CONN signal, et cetera, to the receiver side CN and, as the caller terminal returns a CONNACK signal, a UDI connection is completed between the caller terminal and receiver terminal.

FIG. 2 exemplifies conventional telecommunication processing in the case of transmitting a UDI call to a portable terminal incompatible with a UDI.

Having received a SETUP signal, a receiver terminal transmits a CALL CONFIRM setting (i.e., a response call category of "AMR" and terminal capability information of "AMR") together with a CALL CONFIRM signal to the receiver side CN.

Having received the CALL CONFIRM setting, the receiver side CN checks compatibility between the requested call category and response call category, judges to be incompatible, transmits a request for disconnecting the telecommunication to the caller side CN and also disconnects the telecommunication between the RNC and receiver terminal.

As described above, if an incompatibility occurs between a requested call category and a response call category, a connection must be disconnected once, followed by connecting telecommunication again by a suitable connection configuration since a connection configuration (i.e., AMR or UDI) between an RNC and a receiver terminal is constrained by a requested call category of a caller terminal. As a result, there has been a problem of the load of a telecommunication control system which carries out call controls becoming large.

A Laid-Open Japanese Patent Application Publication No. 07-115634 has disclosed an image telecommunication terminal for facilitating a simple handling of operation keys for setting various operation modes and an easy visual identification of setup various operation modes, thereby attempting improvements of operability and serviceability.

A Laid-Open Japanese Patent Application Publication No. 2000-174839 has disclosed a wireless telecommunication system and a wireless portable terminal for easily changing to a different information transmission capability during communication, thereby performing flexible telecommunication in a wireless telecommunication system which carries out wireless transmissions by a plurality of information transmission capabilities between a base station and a mobile station.

A Laid-Open Japanese Patent Application Publication No. 2001-309086 has disclosed a multimedia telecommunication terminal which makes a receiver side select a telephone conversation either of a videophone channel or a voice-phone channel, thereby changing to a telecommunication channel.

A Laid-Open Japanese Patent Application Publication No. 2002-281175 has disclosed a telecommunication terminal apparatus and a telecommunication control program for implementing smooth telecommunication with a desired correspondent by selecting and/or changing a connection category and telecommunication method appropriately in a multiple telecommunication terminals equipped with a plurality of connection categories and also with one or more telecommunication configurations for each connection category.

A Laid-Open Japanese Patent Application Publication No. 2003-046676 has disclosed a telephone equipped with a videophone function enabling a voice-phone call even in the case of the telephone of an intended part not equipped with a video-phone function without a specific calling operation for the voice-phone call by automatically connecting a line for a voice call if a line connection for the video-phone call is not available.

SUMMARY OF THE INVENTION

In consideration of the above described problem, the challenge of the present invention is to provide a telecommunication control system for determining the most appropriate connection configuration according to a connection configuration required by a caller terminal and a receiver terminal.

In order to solve the above noted challenge, a telecommunication control system according to the present invention, in a telecommunication network having one, two or more telecommunication control systems for performing a call control between terminals and enabling telecommunication between a caller terminal and a receiver terminal by an intercommunication between a caller side telecommunication control system of the one for communicating with the caller terminal under management and a receiver side telecommunication control system of the one for communicating with the receiver terminal under management, comprises: a caller priority call category judgment unit for generating a first priority call category identifier by judging a priority call category from first connection configuration information notified by the caller terminal; a priority call category identifier notification unit for notifying the receiver side telecommunication control system of the first priority call category identifier; a requested call category judgment unit for judging a requested call category to be requested to the receiver terminal from a first priority call category identifier notified by the priority call category identifier notification unit; a requested call category notification unit for notifying the receiver terminal of the requested call category; a receiver priority call category judgment unit for generating a second priority call category identifier by judging a priority call category from second connection configuration information notified by the receiver terminal; a connection call category judgment unit for judging a connection call category from the first priority call category identifier and second priority call category identifier; and a telecommunication establishment unit for making telecommunication between the caller terminal and receiver terminal established by a connection call category judged by the connection call category judgment unit.

According to the present invention, the caller priority call category judgment unit generates the first priority call category identifier from the first connection configuration information notified by a caller terminal, and the receiver priority call category judgment unit generates the second priority call category identifier from the second connection configuration information notified by a receiver terminal.

Then, the connection call category judgment unit determines a connection call category (i.e., a connection configuration) between the caller terminal and receiver terminal from the first priority call category identifier and second priority call category identifier, thereby making it possible to determine the most appropriate connection configuration for connecting between the caller and receiver terminals from a connection configuration requested by the caller terminal and the one requested by the receiver terminal.

As described above, the present invention enables a provision of a telecommunication control system which determines the most appropriate connection configuration according to the connection configuration requested by the caller and receiver terminals.

BRIEF DESCRIPTION OF THE DRAWINGS

FIG. 1 exemplifies conventional telecommunication processing in the case of transmitting a UDI call to a portable terminal capable of a UDI connection;

FIG. 2 exemplifies conventional telecommunication processing in the case of transmitting a UDI call to a portable terminal incapable of a UDI connection;

FIG. 7 illustrates processing for telecommunication among a CN, an RNC and a portable terminal in a telecommunication system according to the present embodiment;

FIG. 11 exemplifies priority call category judgment information according to the present embodiment;

FIG. 12 exemplifies requested call category judgment information according to the present embodiment;

FIG. 23 exemplifies processing for telecommunication between a caller terminal and a receiver terminal in the case of setting up a "UDI transmission" for a caller priority call category and a "select for reception", followed by selecting a "UDI reception" for a receiver priority call category;

FIG. 24 exemplifies processing for telecommunication between a caller terminal and a receiver terminal in the case of setting up a "UDI transmission" for a caller priority call category and a "select for reception", followed by selecting a "UDI reception" for a receiver priority call category;

FIG. 25 exemplifies processing for telecommunication between a caller terminal and a receiver terminal in the case of setting up a "UDI transmission" for a caller priority call category and a "select for reception", followed by selecting an "AMR reception" for a receiver priority call category;

FIG. 31 exemplifies processing for telecommunication between a caller terminal and a receiver terminal in the case of setting up a "UDI priority transmission" for a caller priority call category and an "AMR reception" for a receiver priority call category;

FIG. 40 exemplifies processing for telecommunication between a caller terminal and a receiver terminal in the case of setting up an "AMR transmission" for a caller priority call category and an "AMR priority reception" for a receiver priority call category;

FIG. 41 exemplifies processing for telecommunication between a caller terminal and a receiver terminal in the case of setting up an "AMR transmission" for a caller priority call category and an "AMR priority reception" for a receiver priority call category;

FIG. 44 exemplifies processing for telecommunication between a caller terminal and a receiver terminal in the case of setting up an "AMR transmission" for a caller priority call category and a "UDI priority reception" for a receiver priority call category;

FIG. 45 exemplifies processing for telecommunication between a caller terminal and a receiver terminal in the case of setting up an "AMR transmission" for a caller priority call category and a "select for reception", followed by selecting an "AMR reception" for a receiver priority call category;

FIG. 46 exemplifies processing for telecommunication between a caller terminal and a receiver terminal in the case of setting up an "AMR transmission" for a caller priority call category and a "select for reception", followed by selecting an "AMR reception" for a receiver priority call category;

FIG. 51 exemplifies processing for telecommunication between a caller terminal and a receiver terminal in the case of setting up an "AMR priority transmission" for a caller priority call category and an "AMR priority reception" for a receiver priority call category;

FIG. 54 exemplifies processing for telecommunication between a caller terminal and a receiver terminal in the case of setting up an "AMR priority transmission" for a caller priority call category and a "UDI priority reception" for a receiver priority call category;

FIG. 55 exemplifies processing for telecommunication between a caller terminal and a receiver terminal in the case of setting up an "AMR priority transmission" for a caller priority call category and a "UDI priority reception" for a receiver priority call category;

DESCRIPTION OF THE PREFERRED EMBODIMENTS

Figure 3:
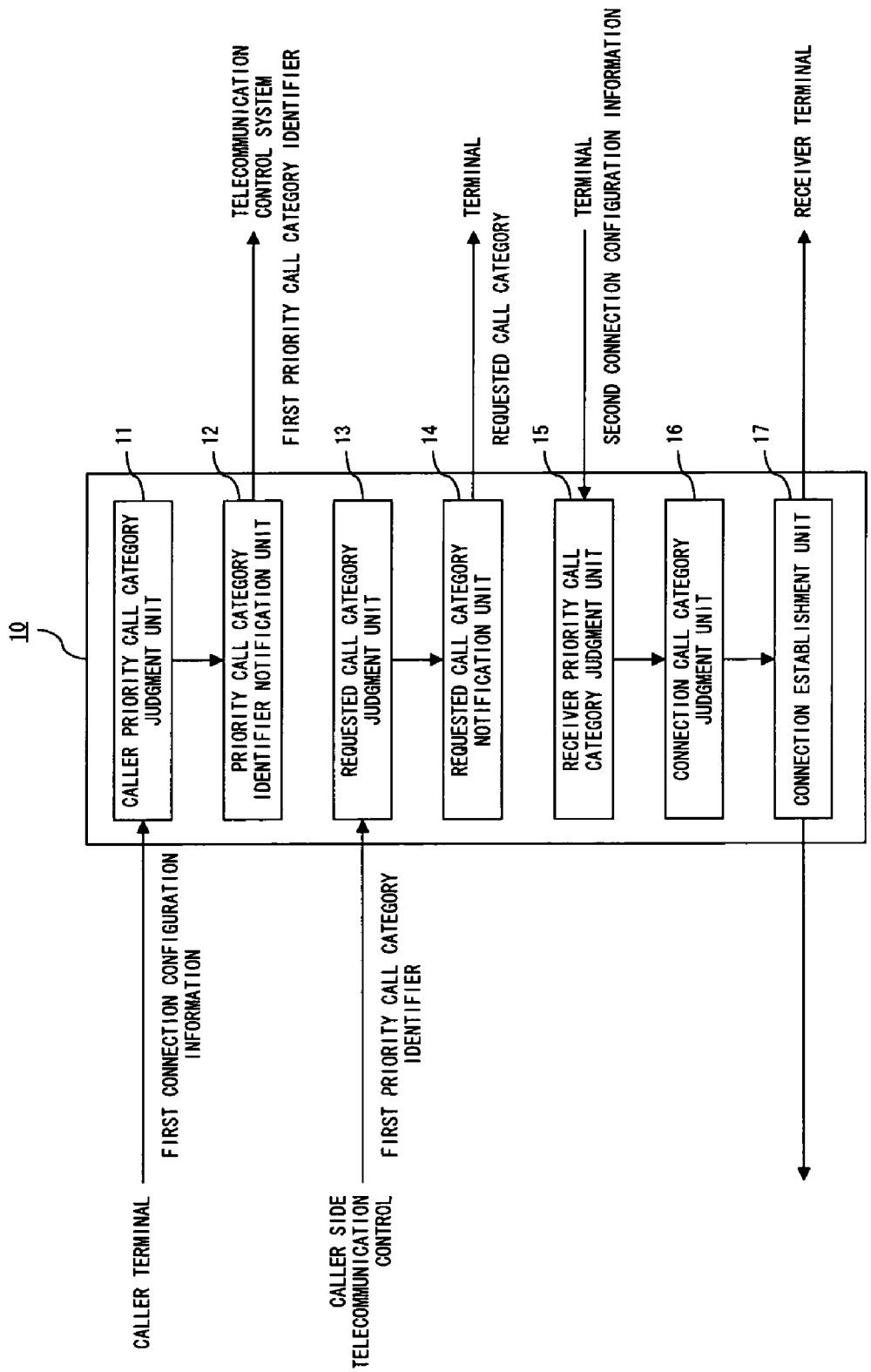
FIG. 3 shows the principle of the present invention.
Figure 59:
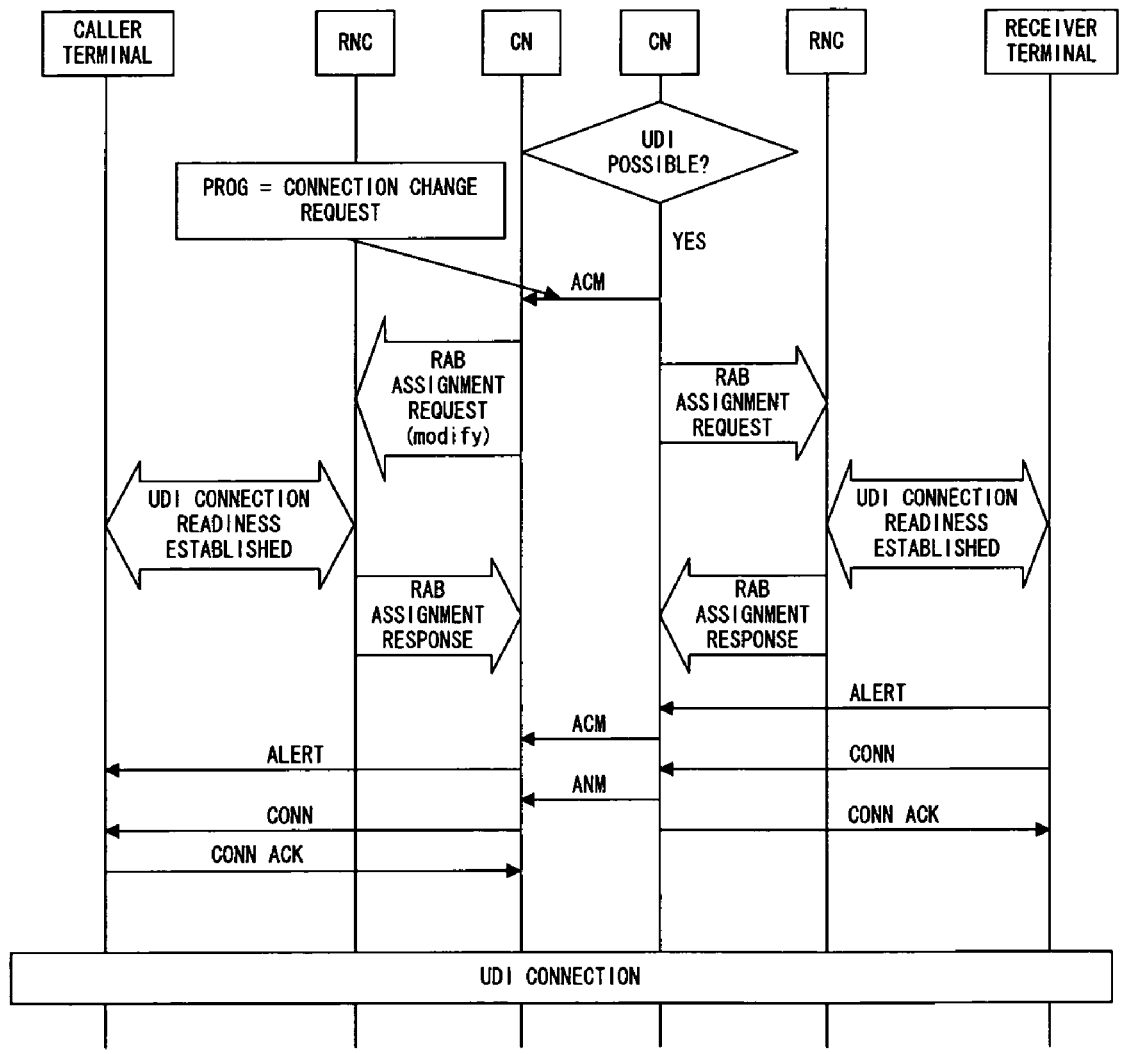
FIG. 59 exemplifies processing for telecommunication between a caller terminal and a receiver terminal in the case of setting up an "AMR priority transmission" for a caller priority call category and a "select for reception", followed by selecting a "UDI reception" for a receiver priority call category.

The following is a detailed description of the preferred embodiment of the present invention based on FIGS. 3 through 59.

FIG. 3 shows the principle of the present invention.

A telecommunication control system 10 shown by FIG. 3 at least comprises a caller priority call category judgment unit 11, a priority call category identifier notification unit 12, a requested call category judgment unit 13, a requested call category notification unit 14, a receiver priority call category judgment unit 15, a connection call category judgment unit 16 and a telecommunication establishment unit 17.

The caller priority call category judgment unit 11 generates a first priority call category identifier by judging a caller priority call category (i.e., a requested call category including priority information) from a first connection configuration information transmitted by a caller terminal. Note that a requested call category and terminal capability information for example are used for the first connection configuration information. The requested call category means a call category to be requested to a receiver terminal, and the terminal capability information means information relating to a call category, et cetera, accomplishable by a terminal.

The priority call category identifier notification unit 12 notifies a receiver side telecommunication control system of the first priority call category identifier generated by the caller priority call category judgment unit 11.

The requested call category judgment unit 13 judges a requested call category of the caller terminal from the first priority call category identifier notified by a caller side telecommunication control system. The requested call category notification unit 14 notifies the receiver terminal of the requested call category judged by the requested call category judgment unit 13.

The receiver priority call category judgment unit 15 generates a second priority call category identifier by judging a receiver priority call category (i.e., a response call category including priority information) from second connection configuration information transmitted by a receiver terminal. Note that a response call category and terminal capability information for example are used for the second connection configuration information. The response call category means a call category responded to the caller terminal.

The connection call category judgment unit 16 judges a connection call category (i.e., a call category of performing telecommunication between a caller terminal and a receiver terminal) from the first priority call category identifier and second priority call category identifier. The telecommunication establishment unit. 17 establishes telecommunication between the caller and receiver terminals by a connection call category judged by the connection call category judgment unit 16.

Here, the caller terminal means a terminal for calling, and the receiver terminal means a terminal of a call destination of the caller terminal. And the telecommunication control system means a system for controlling a call control between terminals and a position registration, managing user information, et cetera. And the caller side telecommunication control system means a telecommunication control system for communicating with a caller terminal, while the receiver side telecommunication control system means a telecommunication control system for communicating with a receiver terminal.

Meanwhile, the first priority call category identifier means an identifier for identifying a caller priority call category, while the second priority call category identifier means an identifier for identifying a receiver priority call category.

Figure 4:
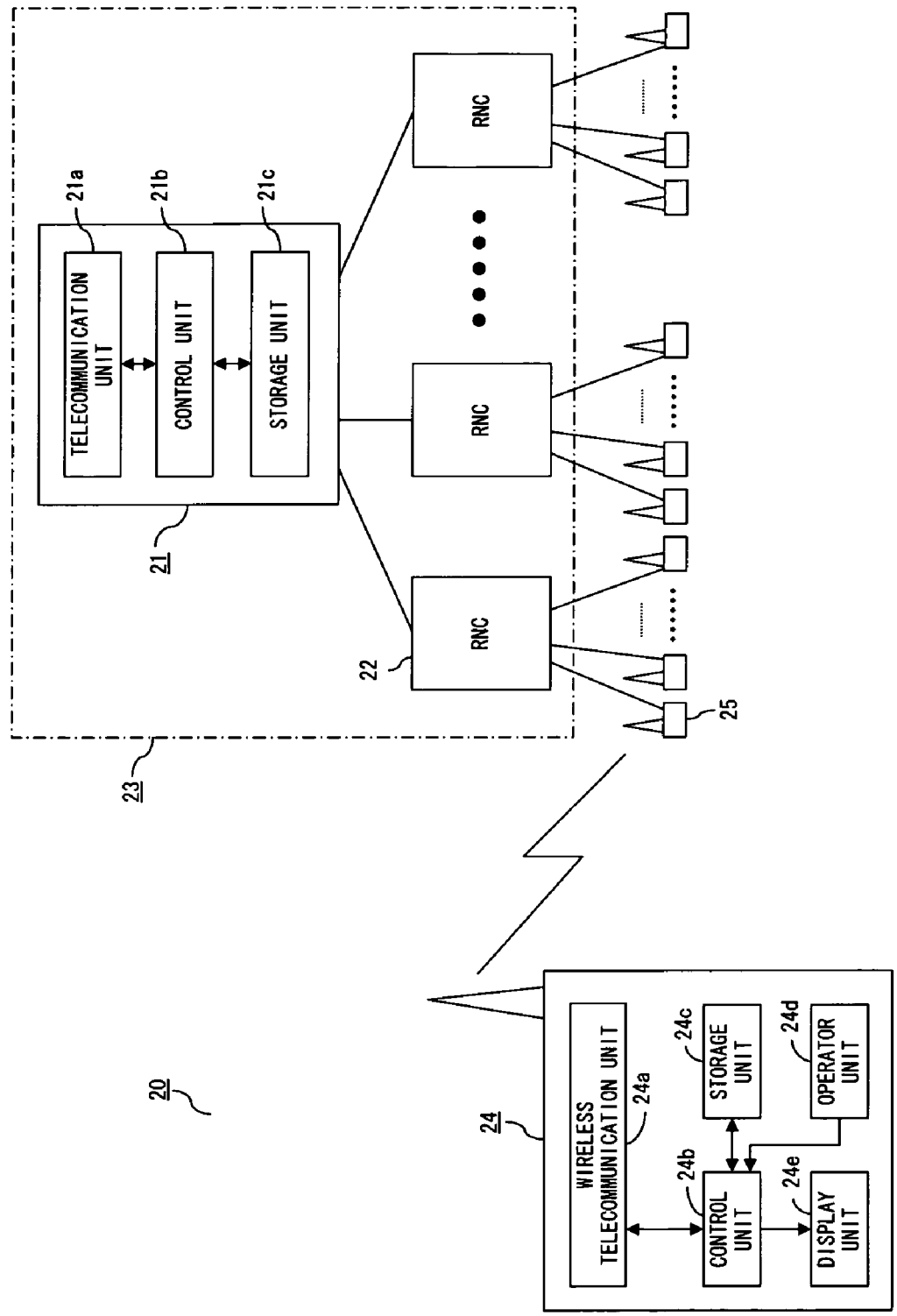
FIG. 4 exemplifies a configuration of a telecommunication system according to an embodiment of the present invention.
Figure 5:
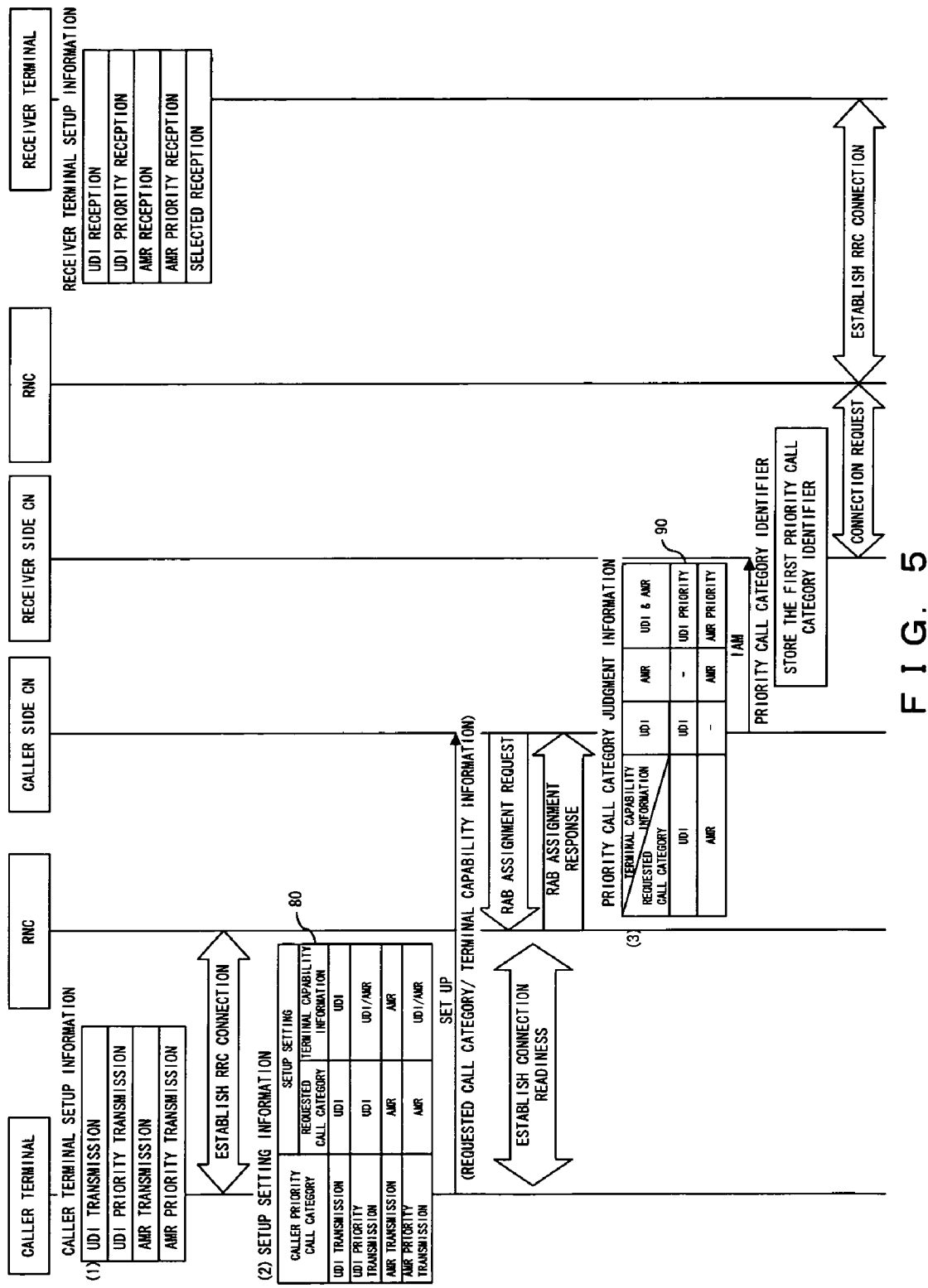
FIG. 5 illustrates processing for telecommunication among a CN, an RNC and a portable terminal in a telecommunication system according to the present embodiment.
Figure 6:
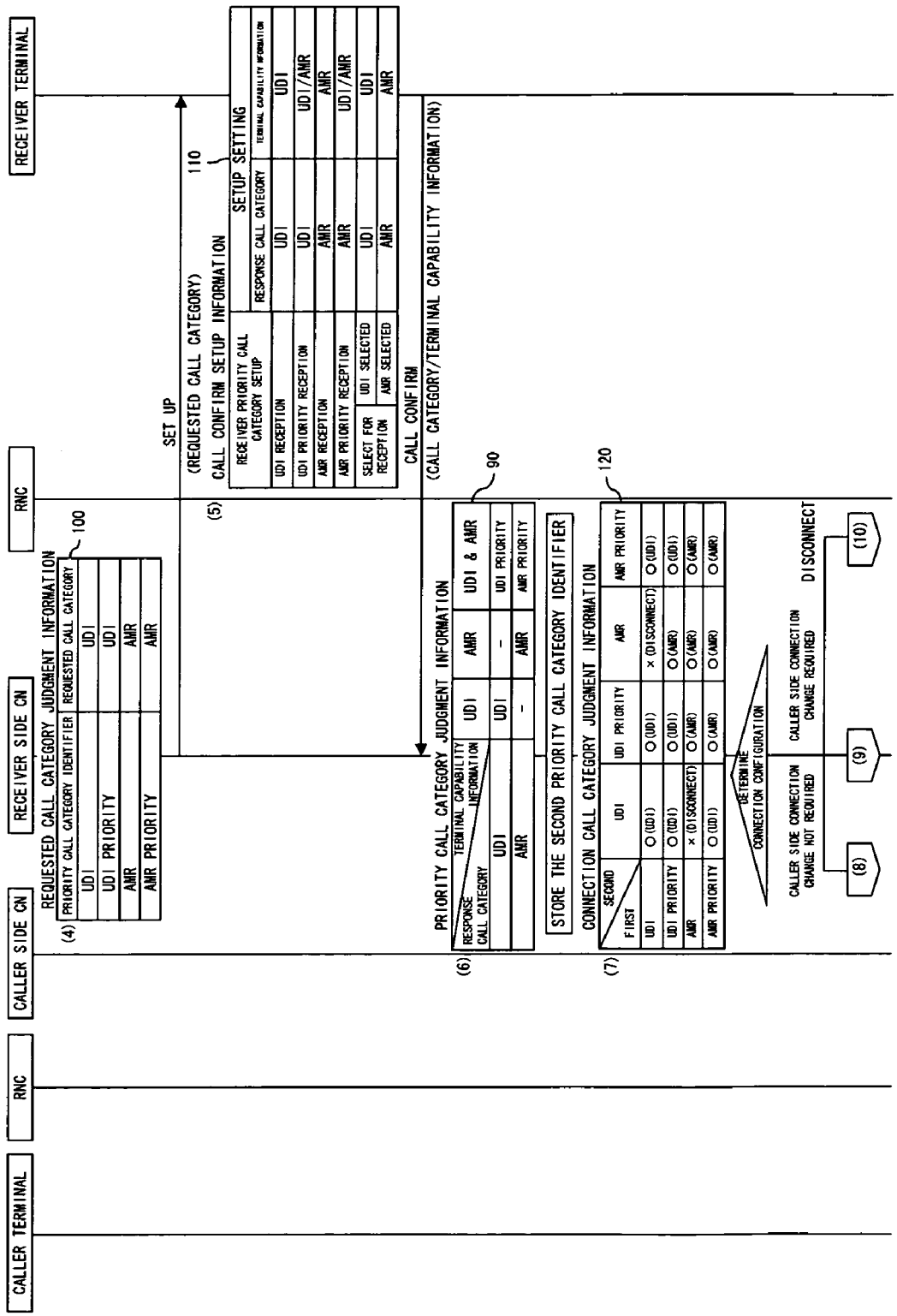
FIG. 6 illustrates processing for telecommunication among a CN, an RNC and a portable terminal in a telecommunication system according to the present embodiment.
Figure 8:
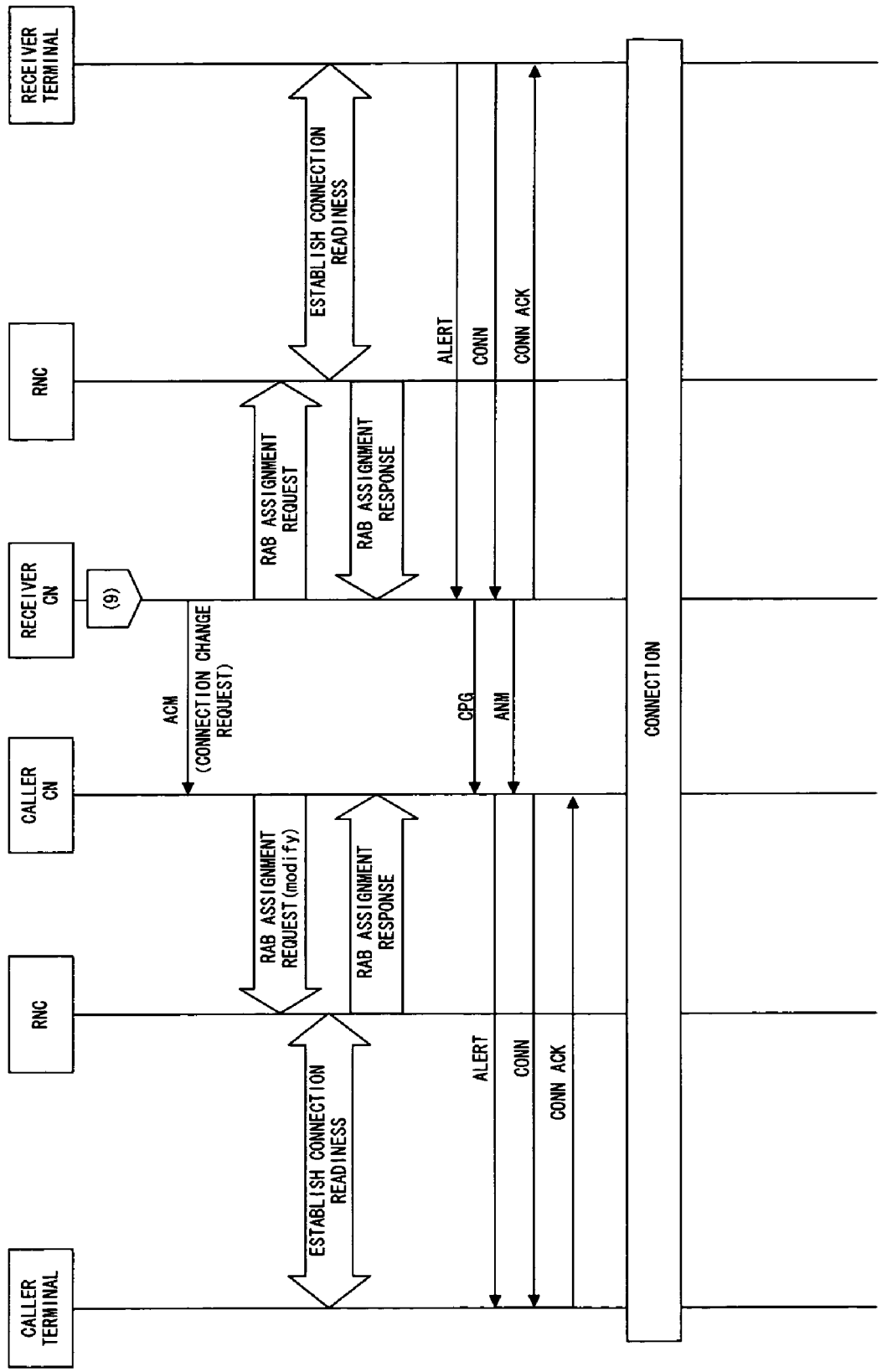
FIG. 8 illustrates processing for telecommunication among a CN, an RNC and a portable terminal in a telecommunication system according to the present embodiment.

FIG. 4 exemplifies a configuration for the purpose of embodying the present invention.

A telecommunication system 20 according to an embodiment of the present invention at least comprises a portable phone network 23 having a plurality of CNs (Core Network; i.e., telecommunication control systems) 21 and of RNCs (Radio Network Controllers) 22 and a plurality of portable terminals 24.

The CN 21 at least comprises a telecommunication unit 21a for telecommunicating with the RNCs 22 and with the portable terminals 24 by way thereof, a control unit 21b for controlling calls of the portable terminals 24 and managing user information, et cetera, and a storage unit 21c for storing data required for operating, and communicating with, the control unit 21b. An RNC 22 controls a plurality of portable phone base station apparatuses 25 under management.

A portable terminal 24 at least comprises a wireless telecommunication unit 24a for the purpose of telecommunicating with the RNC 22 and CN 21 by way of the portable phone base station apparatuses 25, a control unit 24b for controlling the portable terminals 24, et cetera, a storage unit 24c for storing data required for the operation, communication, et cetera, of the control unit 24b, an operator unit 24d for handling the portable phone 24 such as a call instruction and various setups and a display unit 24e for displaying an operator menus, et cetera.

In the configuration as described above, the caller priority call category judgment unit, priority call category identifier notification unit, requested call category judgment unit, requested call category notification unit, receiver priority call category judgment unit, connection call category judgment unit and telecommunication establishment unit according to the present invention are implemented by making the control unit 21b executing a prescribed program stored by the storage unit 21c.

Figure 13:
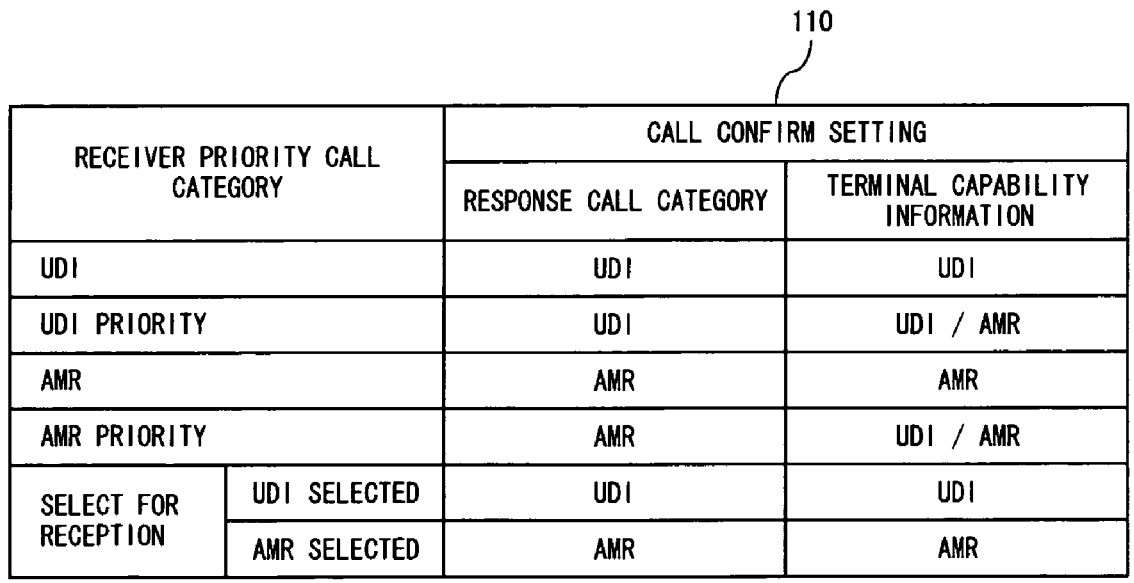
FIG. 13 exemplifies CALL CONFIRM setting information according to the present embodiment.
Figure 14:
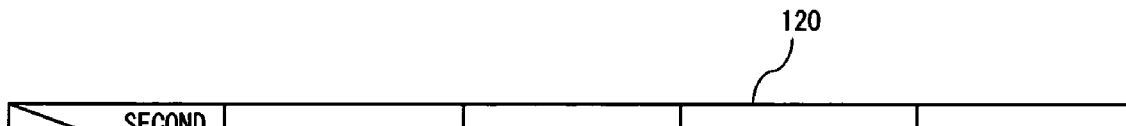
FIG. 14 exemplifies connection call category judgment information according to the present embodiment.

And, priority call category judgment information 90 shown by FIG. 11, requested call category judgment information 100 shown by FIG. 12, and connection call category judgment information 120 shown by FIG. 14 are stored by the storage unit 21c. SETUP setting information 80 shown by FIG. 10 and CALL CONFIRM setting information 110 shown by FIG. 13 are stored by the storage unit 24c.

Note that the configuration described above is noted by exemplifying a system configuration of the IMT (International Mobile Communications)-2000. Therefore, telecommunication between the CNs 21 and that among the CN 21, RNC 22 and portable terminal 24 are carried out by complying to standards specified by the ISUP (ISDN User Part), 3GPP (3rd Generation Partnership Project), et cetera. The details of which can be found in these standards for reference if appropriate.

The following illustrates processing of the telecommunication system 20 according to the present invention based on FIGS. 5 through 14.

FIGS. 5 through 9 illustrate processing for telecommunication among a CN 21, an RNC 22 and a portable terminal 24 in the telecommunication system 20 according to the present embodiment.

Note that a calling portable terminal 24 is named a caller terminal, a CN 21 which the caller terminal is under management is named a caller side CN, a portable terminal 24 of the call destination is named a receiver terminal and a CN 21 which the receiver terminal is under management is named a receiver side CN in the following description.

The following description of telecommunication processing is provided along the paragraphs (1) through (10) which are shown by FIGS. 5 through 9.

(1) A caller terminal is set up with a caller priority call category in advance by a user. For instance, the portable terminal 24 displays a plurality of caller priority call categories in the display unit 24e by a menu, et cetera, and stores in the storage unit 24c a caller priority call category specified by the user handling the operator unit 24d.

For the caller priority call categories, what are used are: "UDI transmission" for telecommunicating only by the UDI, "UDI priority transmission" for telecommunicating preferentially by the UDI from between the UDI and AMR, "AMR transmission" for communicating only by the AMR, and "AMR priority transmission" for telecommunicating preferentially by the AMR from between the UDI and AMR.

As the user instructs a call by handling the operator unit 24d, the caller terminal first establishes an RRC (Radio Resource Control) CONNECTION with an RNC.

(2) As the RRC CONNECTION is established between the caller terminal and RNC, the caller terminal refers to SETUP setting information 80 stored by the storage unit 24c, and obtains a SETUP setting (i.e., a requested call category and terminal capability information, i.e., first connection configuration information). Then, the caller terminal transmits a SETUP setting together with the SETUP signal to the caller side CN by way of an RNC.

Figure 10:
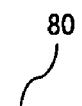
FIG. 10 exemplifies SETUP setting information according to the present embodiment.

Here, FIG. 10 exemplifies SETUP setting information 80. The SETUP setting information 80 according to the present embodiment uses: "UDI" for the requested call category and terminal capability information in the case of a caller priority call category being "UDI transmission", "UDI" for the requested call category and "UDI/AMR" for the terminal capability information in the case of a caller priority call category being "UDI priority transmission", "AMR" for the requested call category and terminal capability information in the case of a caller priority call category being "AMR transmission", and "AMR transmission" for the requested call category and "UDI/AMR" for the terminal capability information in the case of a caller priority call category being "AMR priority transmission".

Note that a use of "UDI/AMR" for a terminal capability information means that both of the "UDI" and "AMR" are notified as terminal capability information to the caller side CN for example.

Having received a SETUP signal, the caller side CN requests the RNC for an RAB (Radio Access Bearer) ASSIGNMENT REQUEST, thereby making a connection readiness between the caller terminal and RNC established. As the connection readiness between the caller terminal and RNC is established, the RNC transmits a RAB ASSIGNMENT RESPONSE to the caller side CN.

(3) Having received the RAB ASSIGNMENT RESPONSE from the RNC, the caller side CN refers to the priority call category judgment information 90 stored by the storage unit 21c, and determines a priority call category identifier corresponding to the SETUP setting received together with the SETUP signal (N.B.: the priority call category identifier in this event is called a "first priority call category identifier"). Then it transmits an IAM signal and also notifies the receiver side CN of the first priority call category identifier.

Here, FIG. 11 exemplifies priority call category judgment information 90. The priority call category judgment information 90 according to the present embodiment defines the first priority call category identifier as "UDI" in the case of a requested call category and terminal capability information which are transmitted together with a SETUP signal being "UDI" respectively, while the first priority call category identifier as "UDI priority" in the case of a requested call category being "UDI" and terminal capability information being "UDI/AMR".

And it defines the first priority call category identifier as "AMR" in the case of a requested call category and terminal capability information which are transmitted together with a SETUP signal being "AMR" respectively, while the first priority call category identifier as "AMR priority" in the case of a requested call category being "AMR" and terminal capability information being "UDI/AMR".

Having received a notification of the first priority call category identifier together with an IAM signal from the caller side CN, the receiver side CN stores the first priority call category identifier in the storage unit 21c. Then the receiver side CN requests the RNC for a connection. Having received the connection request, the RNC establishes an RRC CONNECTION with the receiver terminal.

Here, the receiver terminal is set up with a receiver priority call category in advance by the user as in the case of the caller terminal. For instance, the portable terminal 24 displays a plurality of receiver priority call categories in the display unit 24e by a menu, et cetera, and stores a receiver priority call category set up by the user handling the operator unit 24d.

The receiver priority call category uses a "UDI reception" for communicating only by the UDI, "UDI priority reception" for communicating preferentially by the UDI from between the UDI and AMR, an "AMR reception" for communicating only by the AMR, an "AMR priority reception" for communicating preferentially by the AMR from between the UDI and AMR and "select for reception" for communicating by the UDI or AMR selected by the user at reception.

(4) As an RRC CONNECTION is established between the RNC and receiver terminal, the receiver side CN refers to the requested call category judgment information 100 stored by the storage unit 21c and obtains a requested call category corresponding to the first priority call category identifier, followed by transmitting the requested call category together with the SETUP signal to the receiver terminal by way of the RNC.

Here, FIG. 12 exemplifies the requested call category judgment information 100. The requested call category judgment information 100 according to the present embodiment uses "UDI" for the requested call category in the case of the first priority call category identifier being "UDI" or "UDI priority", while uses "AMR" for the requested call category in the case of the first priority call category identifier being "AMR" or "AMR priority".

(5) Having received the SETUP signal, the receiver terminal refers to CALL CONFIRM setting information 110 stored by the storage unit 24c and obtains a CALL CONFIRM setting (i.e., a response call category and terminal capability information; i.e., the second connection configuration information) corresponding to a receiver priority call category set up in advance.

Note that in the case of a receiver priority call category being set up with "select for reception", the receiver terminal displays a menu, et cetera, in the display unit 24e to prompt the user to select "UDI reception" or "AMR reception". Then it obtains, from the CALL CONFIRM setting information 110, a response call category and terminal capability information corresponding to a call category (i.e., "UDI reception" or "AMR reception") specified by the user handling the operator unit 24d.

Then the receiver terminal transmits the CALL CONFIRM setting together with a CALL CONFIRM signal to the receiver side CN by way of the RNC.

Here, FIG. 13 exemplifies CALL CONFIRM setting information 110. The CALL CONFIRM setting information 110 according to the present embodiment uses: "UDI" for the response call category and terminal capability information in the case of the receiver call priority category being "UDI reception"; "UDI" for the response call category and "UDI/AMR" for the terminal capability information in the case of the receiver call priority category being "UDI priority transmission; "AMR" for the for the response call category and terminal capability information in the case of the receiver call priority category being "AMR reception"; "AMR" for the response call category and "UDI/AMR" for the terminal capability information in the case of the receiver call priority category being "AMR priority reception"; "UDI" for the response call category and terminal capability information in the case of the receiver call priority category being "select for reception" followed by the user selecting the UDI; and "AMR for the response call category and terminal capability information in the case of the receiver call priority category being "select for reception" followed by the user selecting the AMR.

(6) Having received the CALL CONFIRM signal, the receiver side CN refers to the priority call category judgment information 90 stored by the storage unit 21c and determines a priority call category identifier responding to the CALL CONFIRM setting (N.B.: the priority call category identifier in this event is called a "second priority call category identifier"). And it stores the second priority call category identifier in the storage unit 21c.

(7) The receiver side CN obtains the first priority call category identifier and second priority call category identifier from the storage unit 21c, also refers to the connection call category judgment information 120 and determines a connection call category between the caller terminal and receiver terminal. Then the receiver side CN carries out the processing of the paragraphs (8) through (10) according to the determination.

That is, if the connection for the caller side (i.e., among the caller terminal, RNC and caller side CN) is not required to be changed, the processing of paragraph (8) is carried out, while if the connection thereof is required to be changed, then that of paragraph (9) is carried out. Meanwhile, if there is an incompatibility between the call category of the caller terminal and that of the receiver terminal, then the processing of paragraph (10) is carried out.

Here, FIG. 14 exemplifies connection call category judgment information 120. The connection call category judgment information 120 according to the present embodiment defines: a connection call category as "UDI" in the case of the first priority call category identifier being "UDI" or "UDI priority" and also the second priority call category identifier being "UDI", "UDI priority" or "AMR priority"; and a connection call category as "AMR" in the case of the first priority call category identifier being "AMR" or "AMR priority" and also the second priority call category identifier being "UDI priority", "AMR" or "AMR priority".

And it defines: a connection call category as "AMR" in the case of the first priority call category identifier being "UDI priority" and also the second priority call category identifier being "AMR"; and a connection call category as "UDI" in the case of the first priority call category identifier being "AMR priority" and also the second priority call category identifier being "UDI".

And it defines as a telecommunication shutoff in the case of the first priority call category identifier being "UDI" and also the second priority call category identifier being "AMR", or in the case of first priority call category identifier being "AMR" and also the second priority call category identifier being "UDI".

(8) As the processing of paragraph (7) determines a connection call category, the receiver side CN instructs the receiver terminal for connection according the relevant connection call category.

First, the receiver side CN requests the RNC for a RAB ASSIGNMENT REQUEST to make a connection readiness between the RNC and receiver terminal established. Once the connection readiness is established, the RNC returns a RAB ASSIGNMENT RESPONSE to the receiver side CN.

When the connection readiness is established between the RNC and receiver terminal, the receiver terminal transmits an ALERT signal to the receiver side CN and also outputs from the speaker a ring alert for notifying of an incoming call. In the meantime, having received the ALERT signal, the caller terminal outputs a dial tone a lá "prrrr" from the conversation-use speaker.

As the user presses a talk button, et cetera, comprised by the operator unit 24d, the receiver terminal transmits a CONN signal to the caller terminal. When a CONN ACK signal is transmitted from the caller terminal to receiver terminal, the connection between the caller terminal and receiver terminal is complete.

(9) Once a connection call category is determined by the processing of the above described in (7), the receiver side CN transmits an ACM signal to the caller side CN for a connection change request and also transmits a RAB ASSIGNMENT REQUEST signal to the RNC to make a connection readiness established between the RNC and receiver terminal.

Meanwhile, having received the connection change request, the caller side CN transmits, to the RNC, a RAB ASSIGNMENT REQUEST signal, with a connection change request-use parameter (i.e., modify) attached, to establish a connection readiness of the connection call category determined by the processing of the above described paragraph (7).

And, as the connection readiness is established between the RNC and receiver terminal, the receiver terminal transmits an ALERT signal to the receiver side CN and also outputs from the speaker a ring alert for notifying of an incoming call. In the meantime, having received the ALERT signal, the caller terminal outputs a dial tone a lá "prrrr" from the conversation-use speaker.

When the user presses a talk button, et cetera, comprised by the operator unit 24d, the receiver terminal transmits a CONN signal to the caller terminal. When a CONN ACK signal is transmitted from the caller terminal to receiver terminal, the connection between the caller terminal and receiver terminal is complete.

(10) Once a disconnection of telecommunication is determined by the processing of the above described paragraph (7), the receiver side CN transmits an ACM signal to the caller side CN for a disconnect request and also makes a request to RNC for a disconnection and carries out disconnect processing between the caller terminal and receiver terminal.

As described above, the telecommunication processing of the telecommunication system according to the present embodiment is differed by caller priority call categories setup for a caller terminal and receiver priority call categories set up for a receiver terminal.

Figure 15:
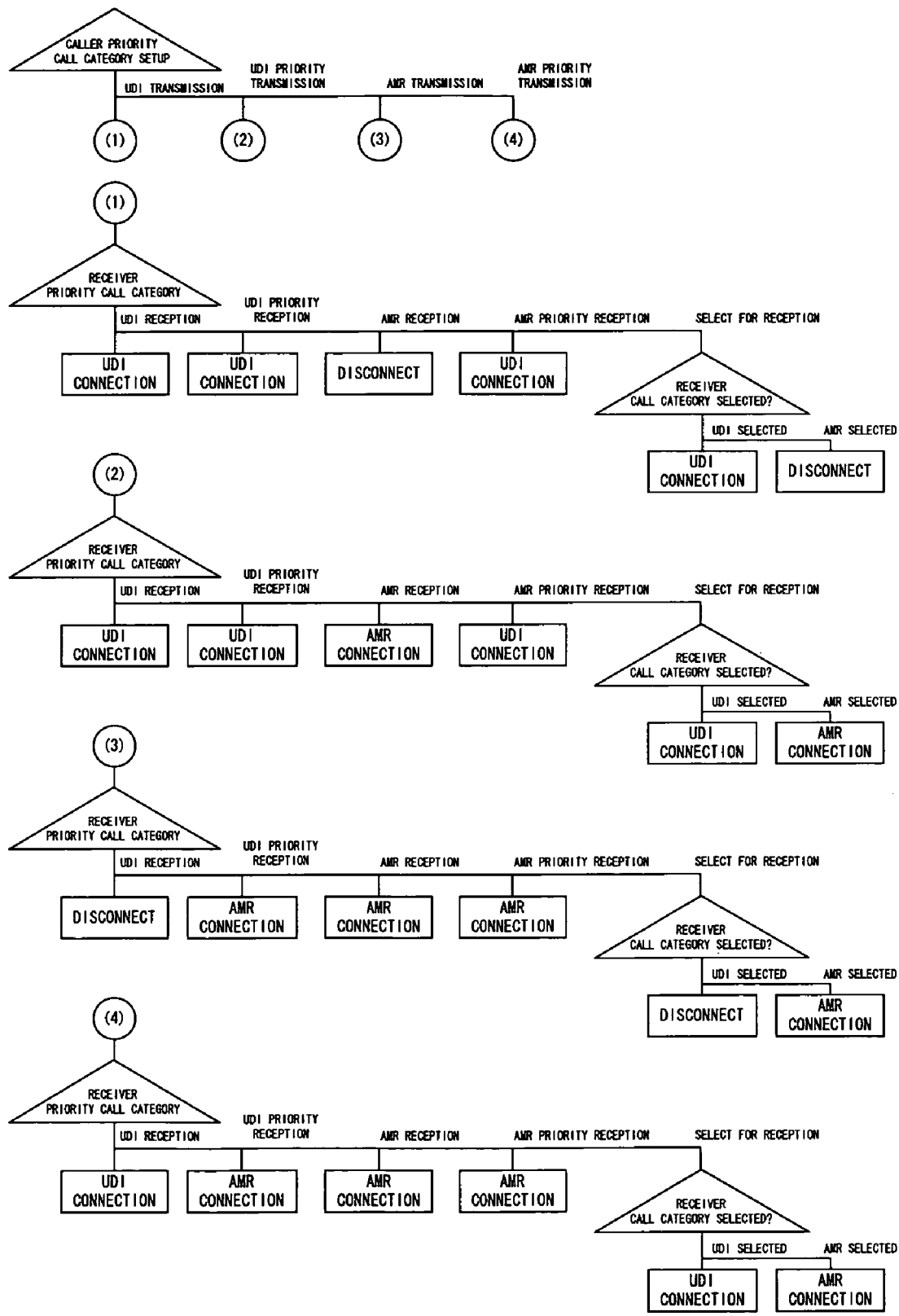
FIG. 15 describes a connection configuration between a caller terminal and a receiver terminal according to a combination of caller priority call categories and receiver priority call categories in a telecommunication system according to the present embodiment.

FIG. 15 describes a connection configuration between a caller terminal and a receiver terminal according to a combination of caller priority call categories and receiver priority call categories in a telecommunication system according to the present embodiment.

Four ways are set up for caller priority call categories, i.e., "UDI transmission", "UDI priority transmission", "AMR transmission" and "AMR priority transmission". Meanwhile, six ways are set up for receiver priority call categories, i.e., "UDI reception", "UDI priority reception", "AMR reception", "AMR priority reception", "select for reception (followed by a UDI reception being selected)" and "select for reception (followed by an AMR reception being selected)".

The paragraph (1) shows connection configurations between the caller terminal and receiver terminal for each receiver priority call category set up for the receiver terminal in the case of calling by a caller terminal set up with "UDI transmission" for the caller priority call category.

A UDI connection is carried out between the caller terminal and receiver terminal if the receiver priority call category set up for the receiver terminal is "UDI reception", "UDI priority reception", "AMR priority reception", or "select for reception" followed by selecting "UDI reception".

Telecommunication between the caller terminal and receiver terminal is disconnected if the receiver priority call category set up for the receiver terminal is "AMR reception", or "select for reception" followed by selecting "AMR reception".

The paragraph (2) shows connection configurations between the caller terminal and receiver terminal for each receiver priority call category set up for the receiver terminal in the case of calling by a caller terminal set up with "UDI priority transmission" for the caller priority call category.

A UDI connection is carried out between the caller terminal and receiver terminal if the receiver priority call category setup for the receiver terminal is "UDI reception", "UDI priority reception", "AMR priority reception", or "select for reception" followed by selecting "UDI reception".

An AMR connection is carried out between the caller terminal and receiver terminal if the receiver priority call category set up for the receiver terminal is "AMR reception", or "select for reception" followed by selecting "AMR reception".

The paragraph (3) shows connection configurations between the caller terminal and receiver terminal for each receiver priority call category set up for the receiver terminal in the case of calling by a caller terminal set up with "AMR transmission" for the caller priority call category.

An AMR connection is carried out between the caller terminal and receiver terminal if the receiver priority call category set up for the receiver terminal is "UDI priority reception", "AMR reception", or "select for reception" followed by selecting "AMR reception".

Telecommunication between the caller terminal and receiver terminal is disconnected if the receiver priority call category set up for the receiver terminal is "UDI reception", or "select for reception" followed by selecting "UDI reception".

The paragraph (4) shows connection configurations between the caller terminal and receiver terminal for each receiver priority call category set up for the receiver terminal in the case of calling by a caller terminal set up with "AMR priority transmission" for the caller priority call category.

An AMR connection is carried out between the caller terminal and receiver terminal if the receiver priority call category set up for the receiver terminal is "UDI priority reception", "AMR reception", or "select for reception" followed by selecting "AMR reception".

A UDI connection is carried out between the caller terminal and receiver terminal if the receiver priority call category set up for the receiver terminal is "UDI reception", or "select for reception" followed by selecting "UDI reception".

As described above, twenty four ways of telecommunication processing are respectively carried out by combinations of the caller priority call categories set up for a caller terminal (i.e., "UDI transmission", "UDI priority transmission", "AMR transmission" or "AMR priority transmission") and the receiver priority call categories set up for a receiver terminal (i.e., "UDI reception", "UDI priority reception", "AMR reception", "AMR priority reception", "select for reception (in the case of selecting a UDI reception)" or "select for reception (in the case of selecting an AMR reception)".

The following is a description of telecommunication processing between a caller terminal and a receiver terminal for each of the combinations of the caller priority call categories set up for a caller terminal and the receiver priority call categories set up for a receiver terminal.

Figure 16:
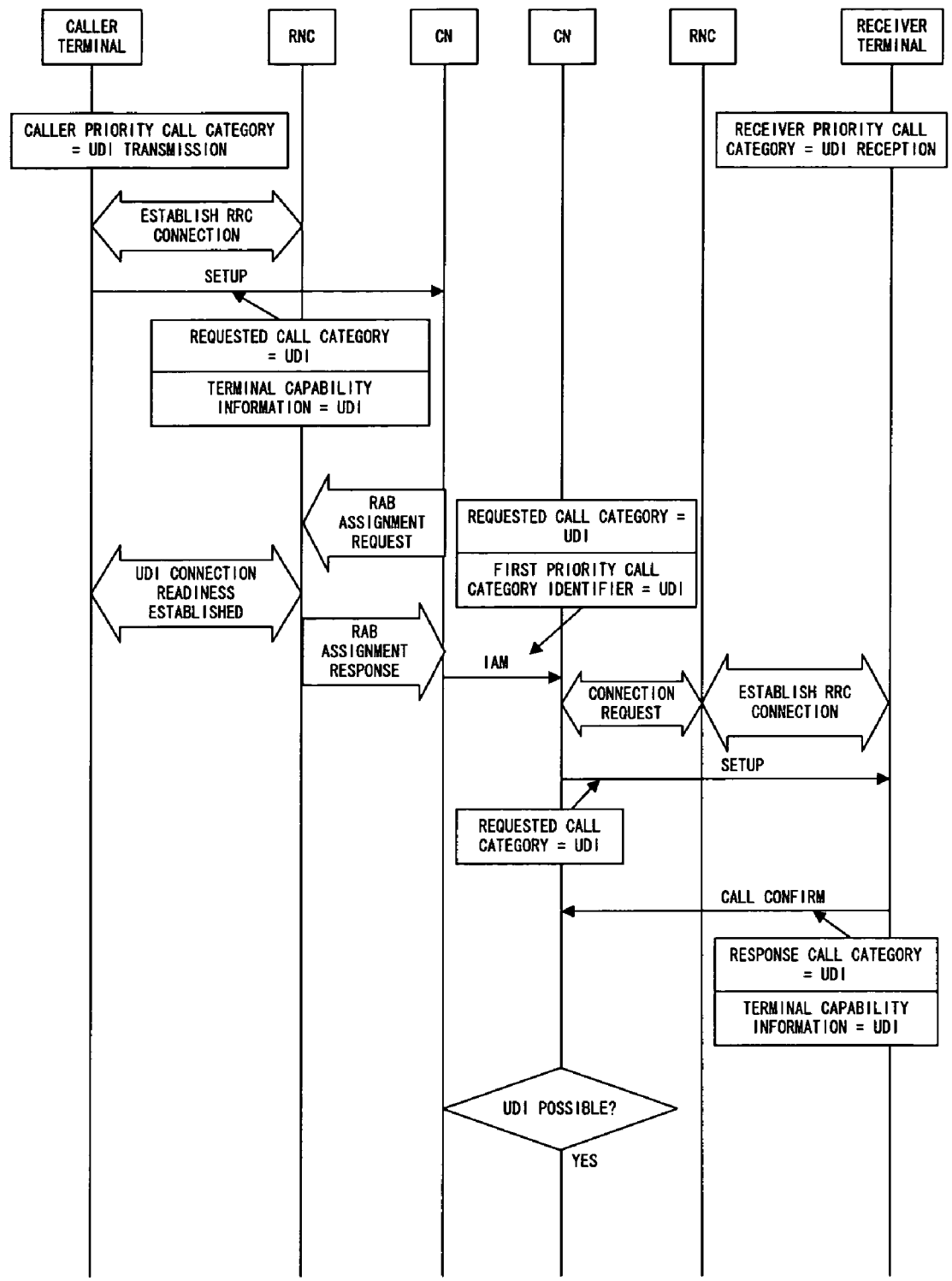
FIG. 16 exemplifies processing for telecommunication between a caller terminal and a receiver terminal in the case of setting up a "UDI transmission" for a caller priority call category and a "UDI reception" for a receiver priority call category.
Figure 17:
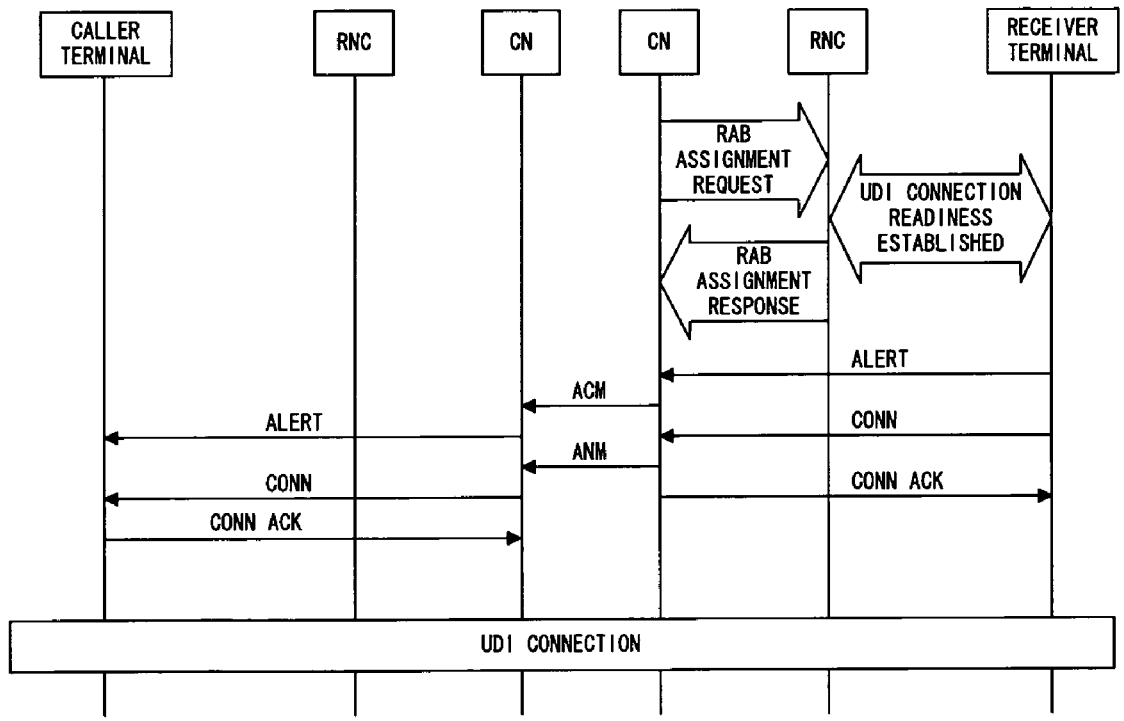
FIG. 17 exemplifies processing for telecommunication between a caller terminal and a receiver terminal in the case of setting up a "UDI transmission" for a caller priority call category and a "UDI reception" for a receiver priority call category.

FIGS. 16 and 17 exemplify processing for telecommunication between a caller terminal and a receiver terminal in the case of setting up a "UDI transmission" for a caller priority call category and a "UDI reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90 and obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI" can be connected to the receiver terminal by the UDI.

Then, the processing of the paragraph (8) shown by FIG. 7 establishes the UDI connection.

Figure 18:
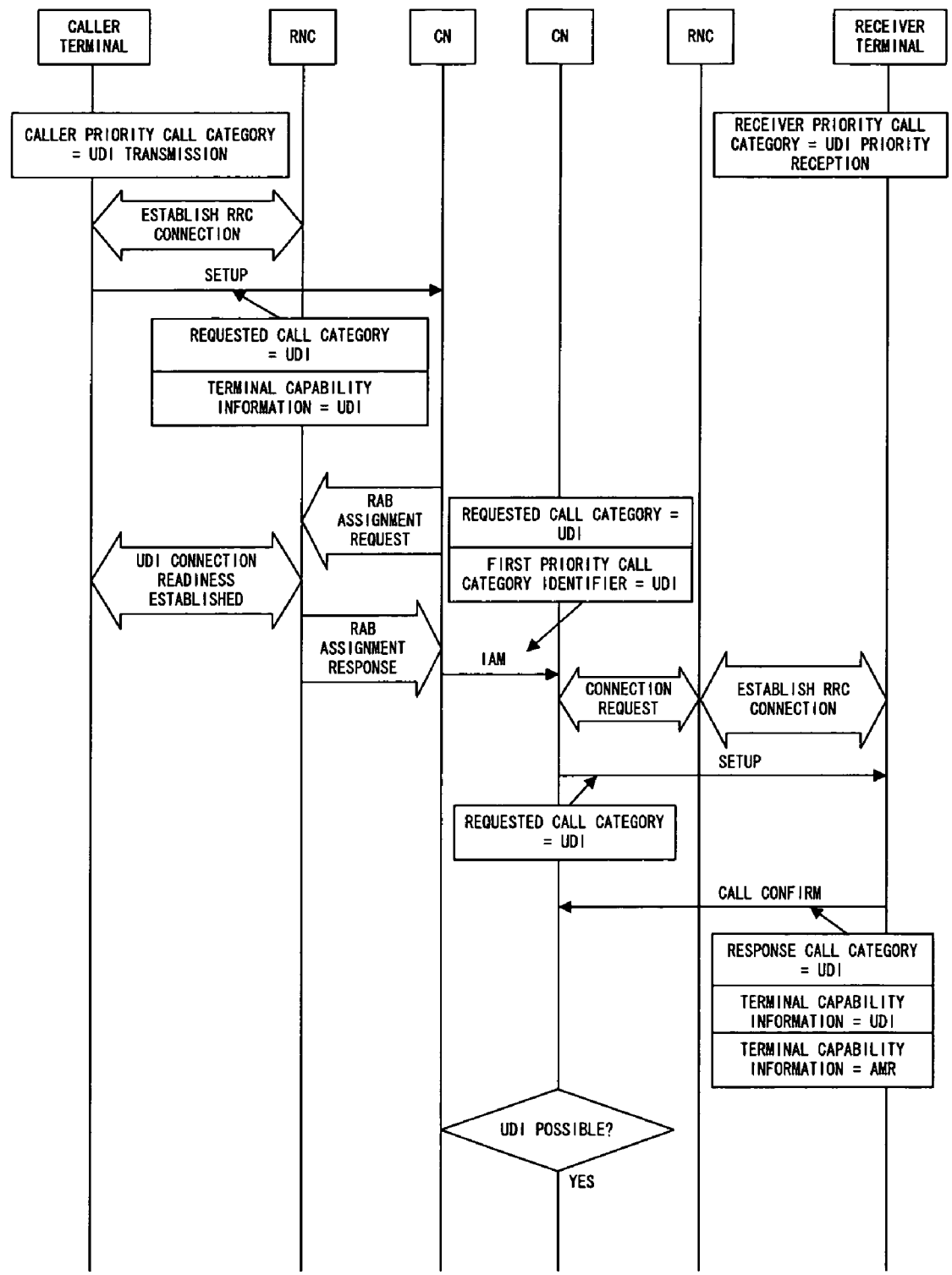
FIG. 18 exemplifies processing for telecommunication between a caller terminal and a receiver terminal in the case of setting up a "UDI transmission" for a caller priority call category and a "UDI priority reception" for a receiver priority call category.
Figure 19:
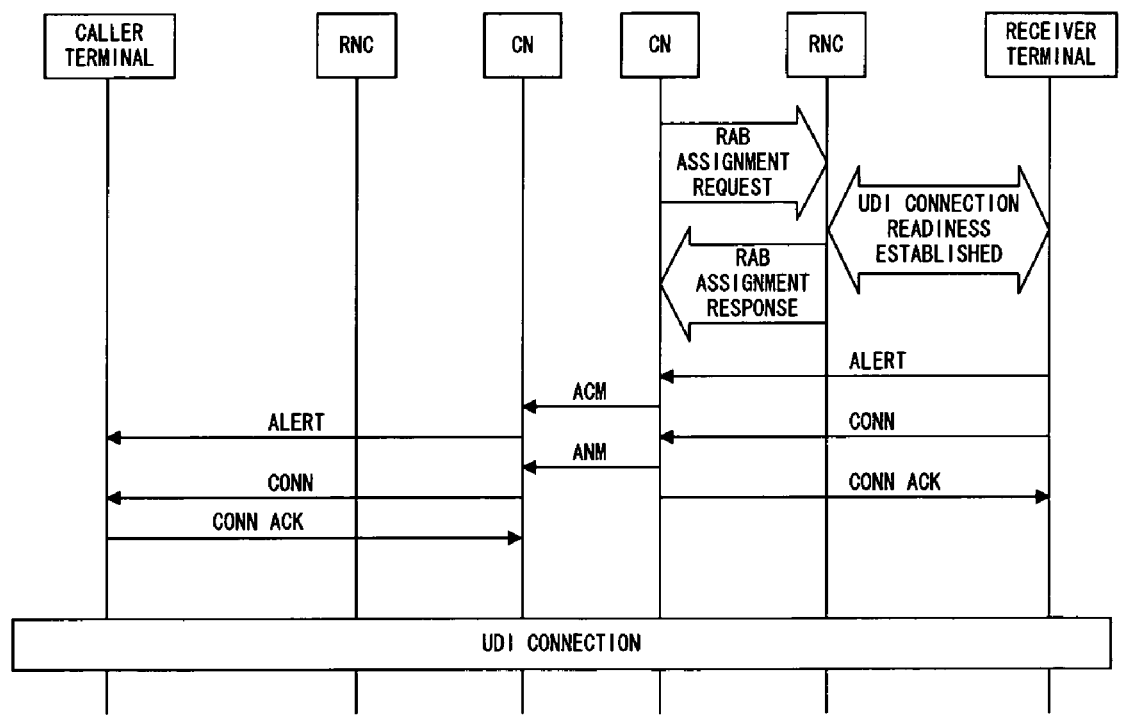
FIG. 19 exemplifies processing for telecommunication between a caller terminal and a receiver terminal in the case of setting up a "UDI transmission" for a caller priority call category and a "UDI priority reception" for a receiver priority call category.

FIGS. 18 and 19 exemplify processing for telecommunication between a caller terminal and a receiver terminal in the case of setting up a "UDI transmission" for a caller priority call category and a "UDI priority reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI/AMR") corresponding to the receiver priority call category of "UDI priority transmission", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI priority" corresponding to the CALL CONFIRM setting (i.e., a response call category "UDI" and terminal capability information "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI" can be connected to the receiver terminal by the UDI.

Then, the processing of the paragraph (8) shown by FIG. 7 establishes the UDI connection.

Figure 20:
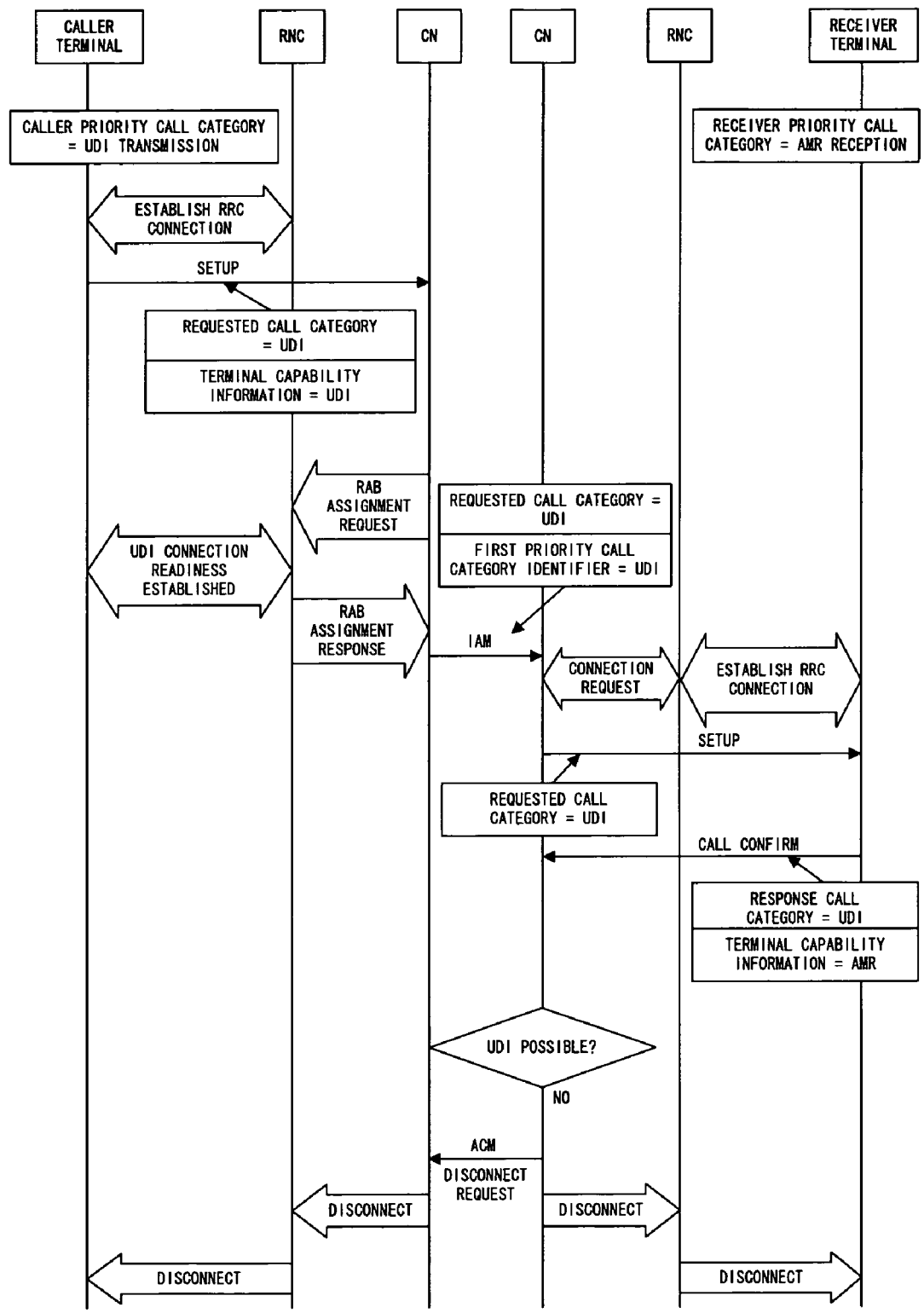
FIG. 20 exemplifies processing for telecommunication between a caller terminal and a receiver terminal in the case of setting up a "UDI transmission" for a caller priority call category and an "AMR reception" for a receiver priority call category.

FIG. 20 exemplifies processing for telecommunication between a caller terminal and a receiver terminal in the case of setting up a "UDI transmission" for a caller priority call category and an "AMR reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90 and obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtains the first priority call category identifier and second priority call category identifier, and also refers to the connection call category judgment information 120 to judge a "disconnect" of the telecommunication, that is, to judge that the caller terminal transmitting by the caller priority call category of "UDI transmission" cannot be connected to the receiver terminal responding by the receiver priority call category of "AMR reception".

Figure 9:
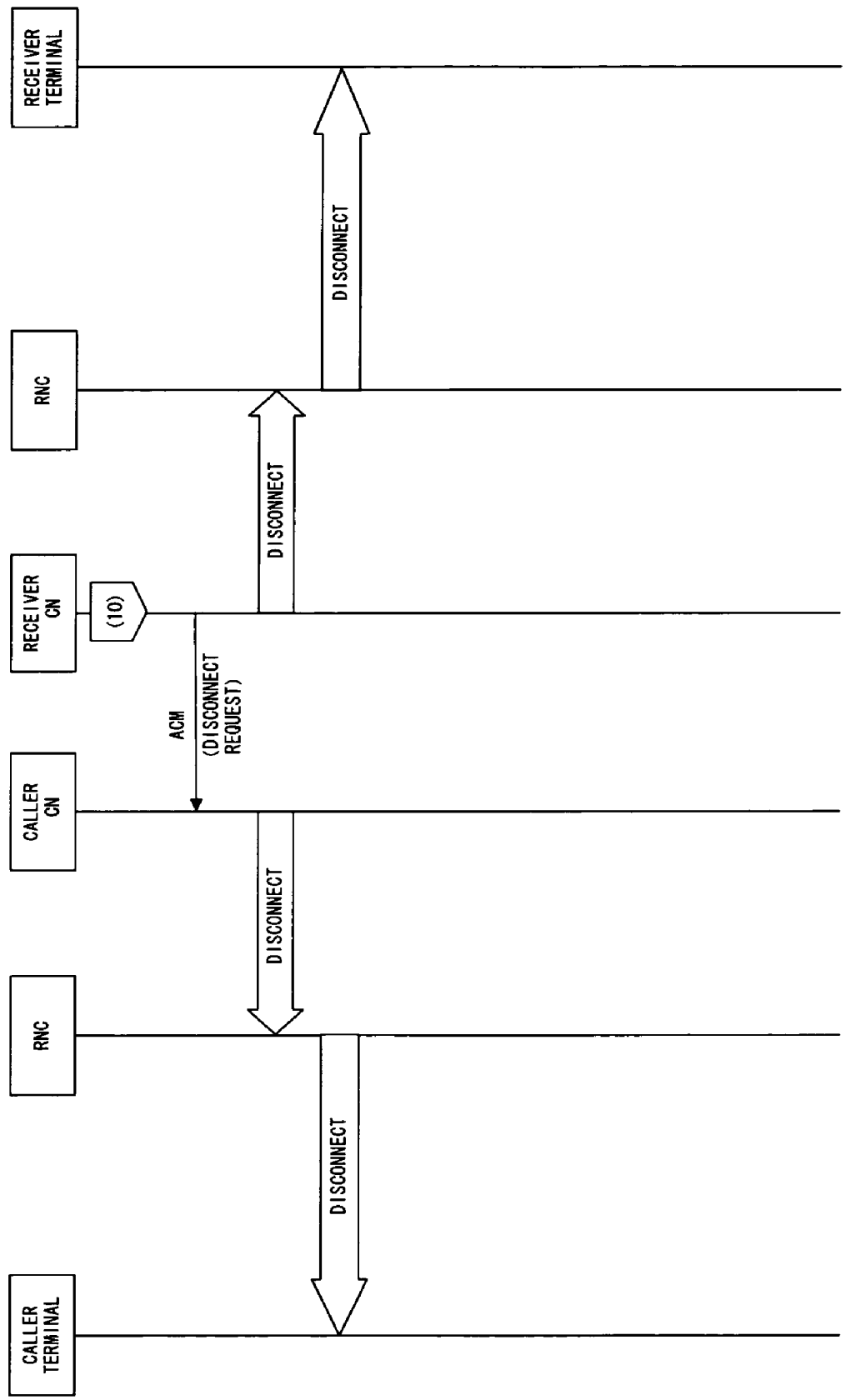
FIG. 9 illustrates processing for telecommunication among a CN, an RNC and a portable terminal in a telecommunication system according to the present embodiment.

Then the processing of the paragraph (10) shown by FIG. 9 disconnects the telecommunication.

Figure 21:
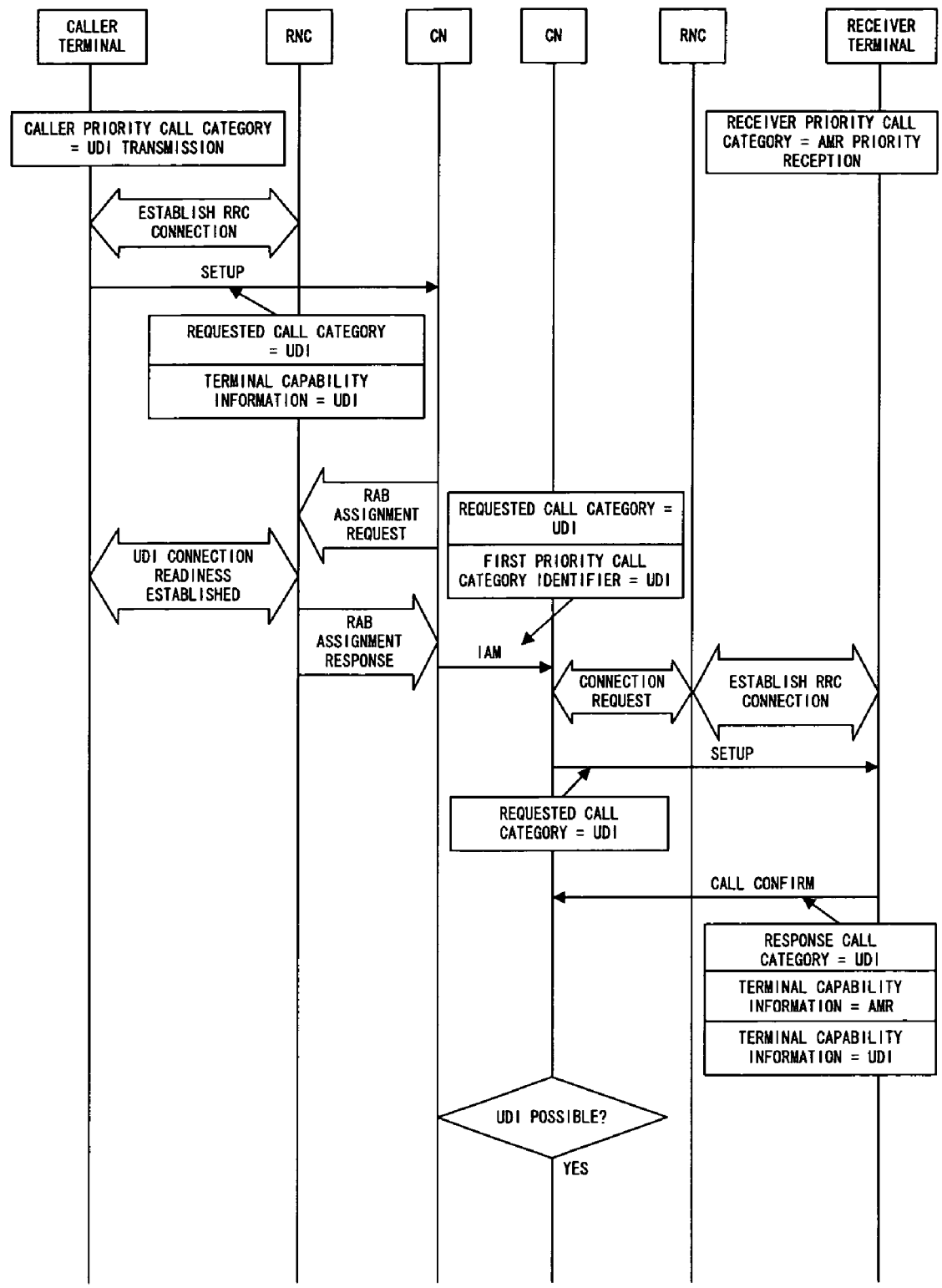
FIG. 21 exemplifies processing for telecommunication between a caller terminal and a receiver terminal in the case of setting up a "UDI transmission" for a caller priority call category and an "AMR priority reception" for a receiver priority call category.
Figure 22:
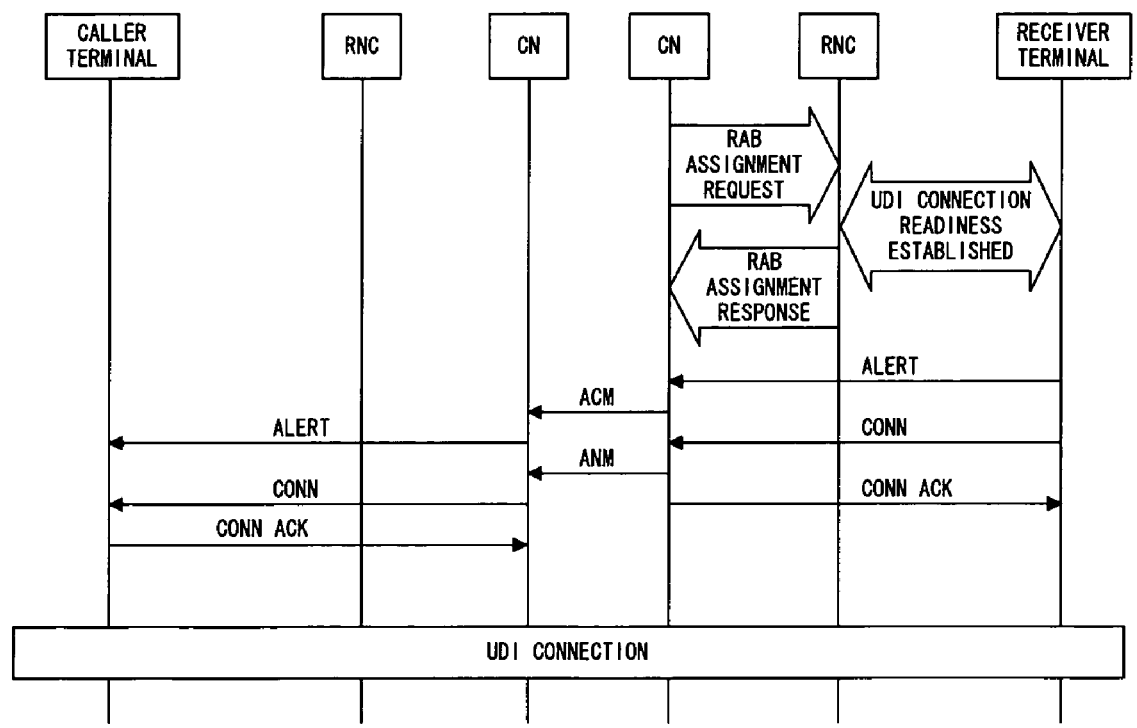
FIG. 22 exemplifies processing for telecommunication between a caller terminal and a receiver terminal in the case of setting up a "UDI transmission" for a caller priority call category and an "AMR priority reception" for a receiver priority call category.

FIGS. 21 and 22 exemplify processing for telecommunication between a caller terminal and a receiver terminal in the case of setting up a "UDI transmission" for a caller priority call category and an "AMR priority reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "UDI/AMR") corresponding to the receiver priority call category of "AMR priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR priority" corresponding to the CALL CONFIRM setting (i.e., a response call category of "AMR" and terminal capability information of "UDI/AMR") and stores it in the storage unit 21c.

The receiver side CN further refers to the storage unit 21c to obtain the first priority call category identifier and the second priority call category identifier, and also refers to the connection call category judgment information 120 to judge a connection call category to be "UDI", that is, to judge that the caller terminal transmitting by the caller priority call category of "UDI transmission" can be connected to the receiver terminal by the UDI.

Then the processing of the paragraph (8) shown by FIG. 7 establishes the UDI connection.

FIGS. 23 and 24 exemplify processing for telecommunication between a caller terminal and a receiver terminal in the case of setting up a "UDI transmission" for a caller priority call category and a "select for reception", followed by selecting a "UDI reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception" (note that this judgment processing is carried out in all cases shown by FIGS. 16 through 58, a description of the processing, however, is omitted herein for simplicity because a specific processing is not carried out in the case of a receiver priority call category being not "select for reception").

Then, if a receiver priority call category is "select for reception", the display unit 24e displays a selection menu of "UDI reception" or "AMR reception" to prompt a user selection.

If the user selects "UDI reception" by handling the operator unit 24d, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to a receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the CALL CONFIRM setting (i.e., a response call category "UDI" and terminal capability information "UDI") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI transmission" can be connected to the receiver terminal by the UDI.

Then the processing shown by the paragraph (8) of FIG. 7 establishes the UDI connection.

FIG. 25 exemplifies processing for telecommunication between a caller terminal and a receiver terminal in the case of setting up a "UDI transmission" for a caller priority call category and a "select for reception", followed by selecting an "AMR reception" for a receiver priority call category.

A caller terminal refers to the SETUP setting information 80 at the time of a transmission and obtains a SETUP setting (i.e., a requested call category of "UDI" and terminal capability information of "UDI") corresponding to the caller priority call category of "UDI transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI" corresponding to the SETUP setting (i.e., a requested call category of "UDI" and terminal capability information of "UDI"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to a receiver priority call category and judges whether or not the aforementioned receiver priority call category is a "select for reception". If the receiver priority call category is a "select for reception", the display unit 24e displays a selection menu of "UDI reception" or "AMR reception" to prompt a user selection.

If the user selects the "AMR reception" by handling the operator unit 24d, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a "disconnect" of the telecommunication. That is, to judge that the caller terminal transmitting by the caller priority call category of "UDI transmission" cannot be connected to the receiver terminal responding by the receiver priority call category of "AMR reception".

Then the telecommunication is disconnected by the processing of the paragraph (10) shown by FIG. 9.

Figure 26:
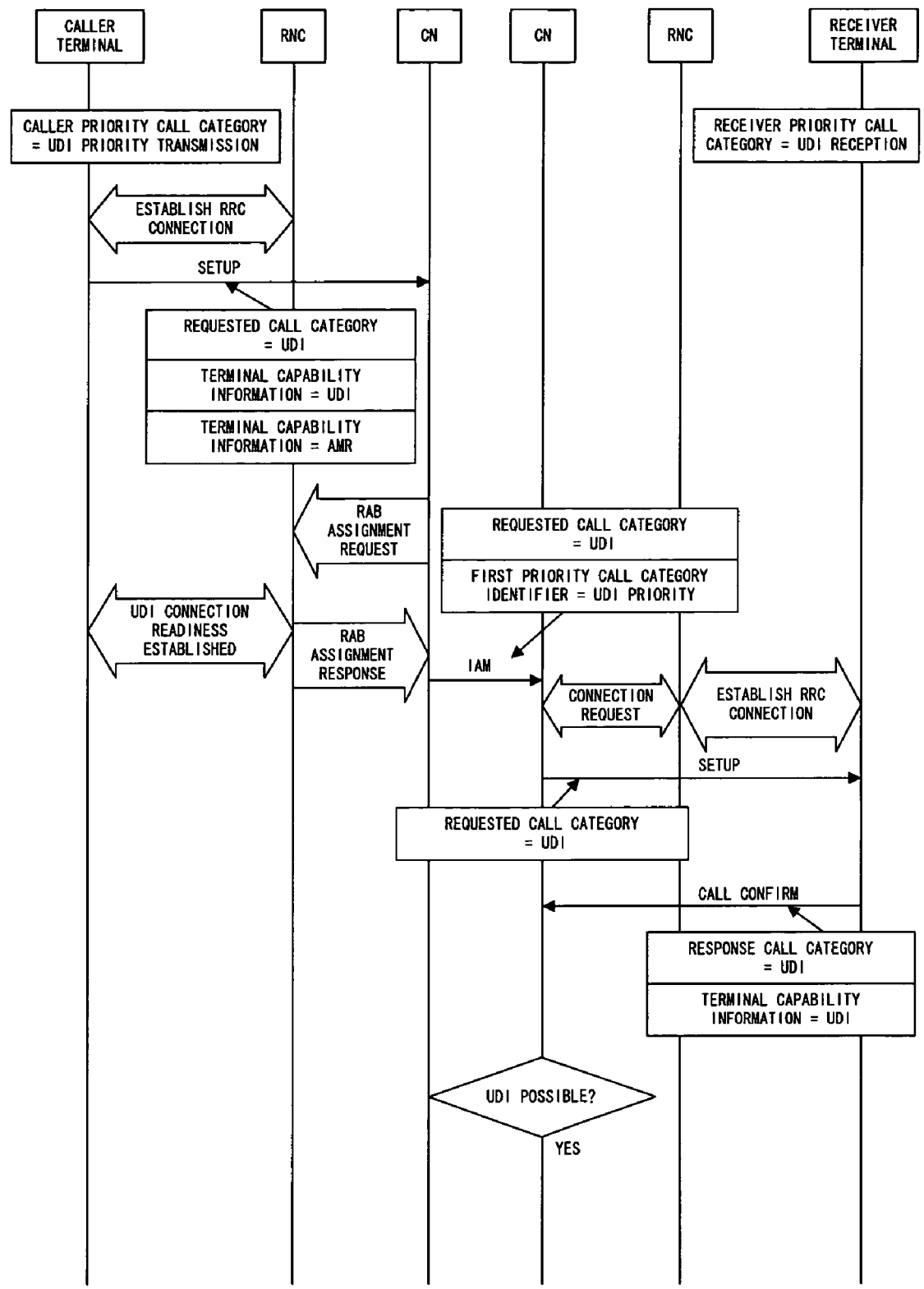
FIG. 26 exemplifies processing for telecommunication between a caller terminal and a receiver terminal in the case of setting up a "UDI priority transmission" for a caller priority call category and a "UDI reception" for a receiver priority call category.
Figure 27:
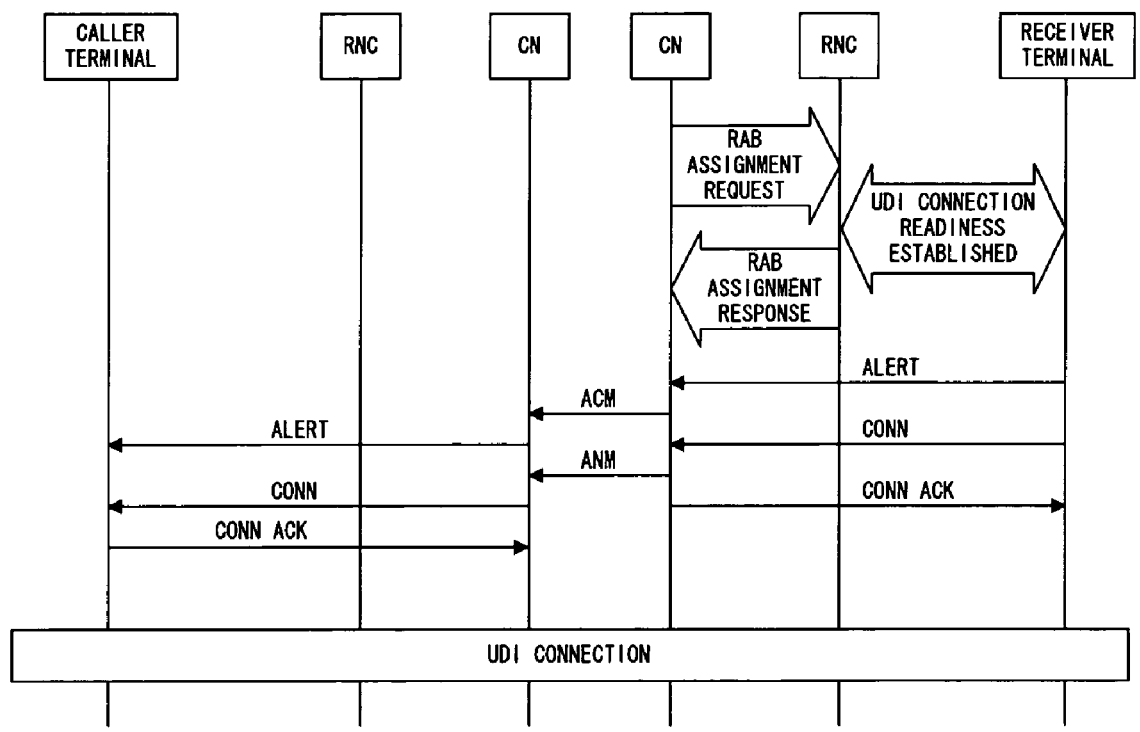
FIG. 27 exemplifies processing for telecommunication between a caller terminal and a receiver terminal in the case of setting up a "UDI priority transmission" for a caller priority call category and a "UDI reception" for a receiver priority call category.

FIGS. 26 and 27 exemplify processing for telecommunication between a caller terminal and a receiver terminal in the case of setting up a "UDI priority transmission" for a caller priority call category and a "UDI reception" for a receiver priority call category.

A caller terminal refers to the SETUP setting information 80 at the time of a transmission and obtains a SETUP setting (i.e., a requested call category of "UDI" and terminal capability information of "UDI/AMR") corresponding to the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested call category of "UDI" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a requested call category of "UDI" and terminal capability information of "UDI") corresponding to the receiver priority call category of "UDI transmission", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI priority transmission" can be connected to the receiver terminal by the UDI.

Then the processing shown by the number (8) of FIG. 7 establishes the UDI connection.

Figure 28:
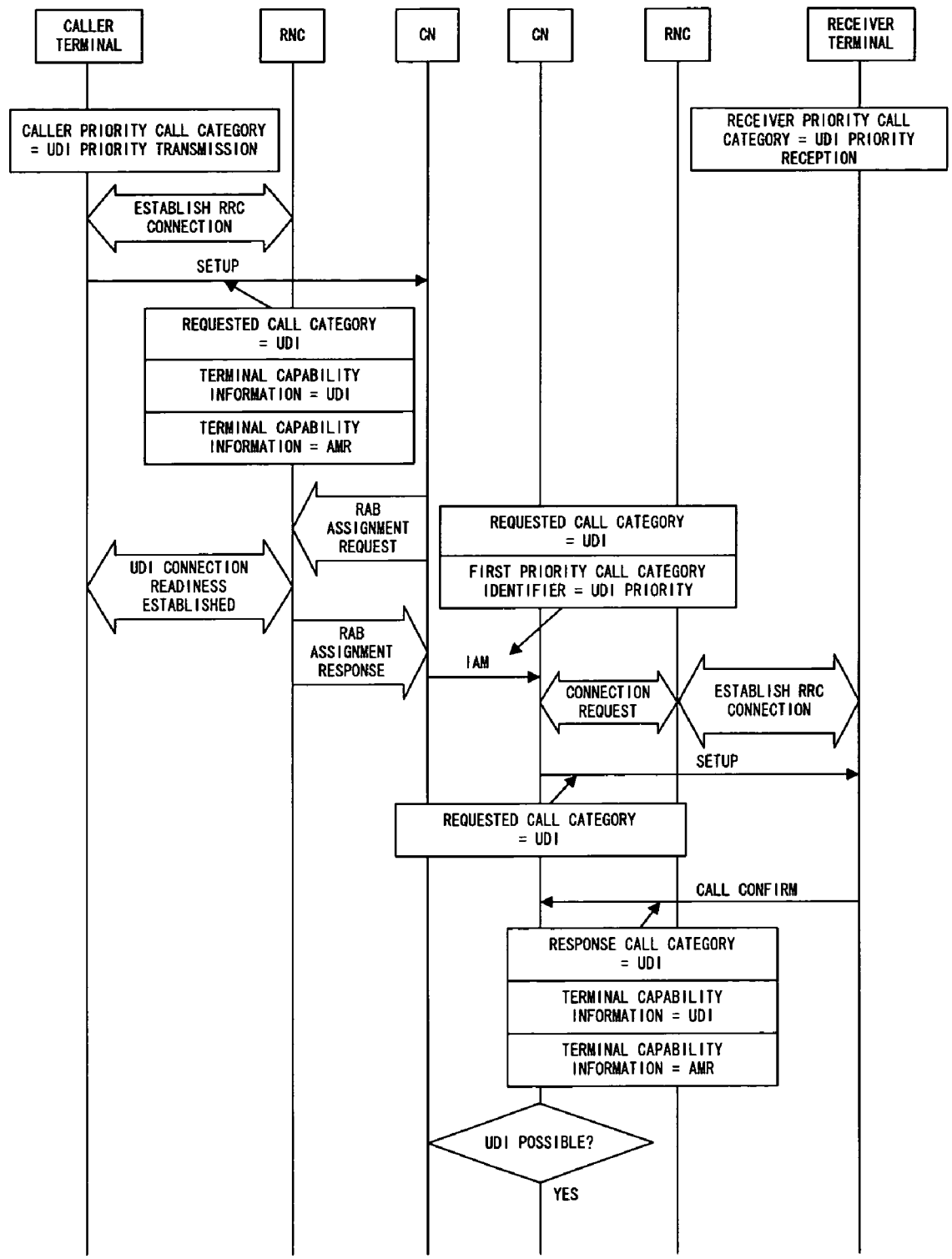
FIG. 28 exemplifies processing for telecommunication between a caller terminal and a receiver terminal in the case of setting up a "UDI priority transmission" for a caller priority call category and a "UDI priority reception" for a receiver priority call category.
Figure 29:
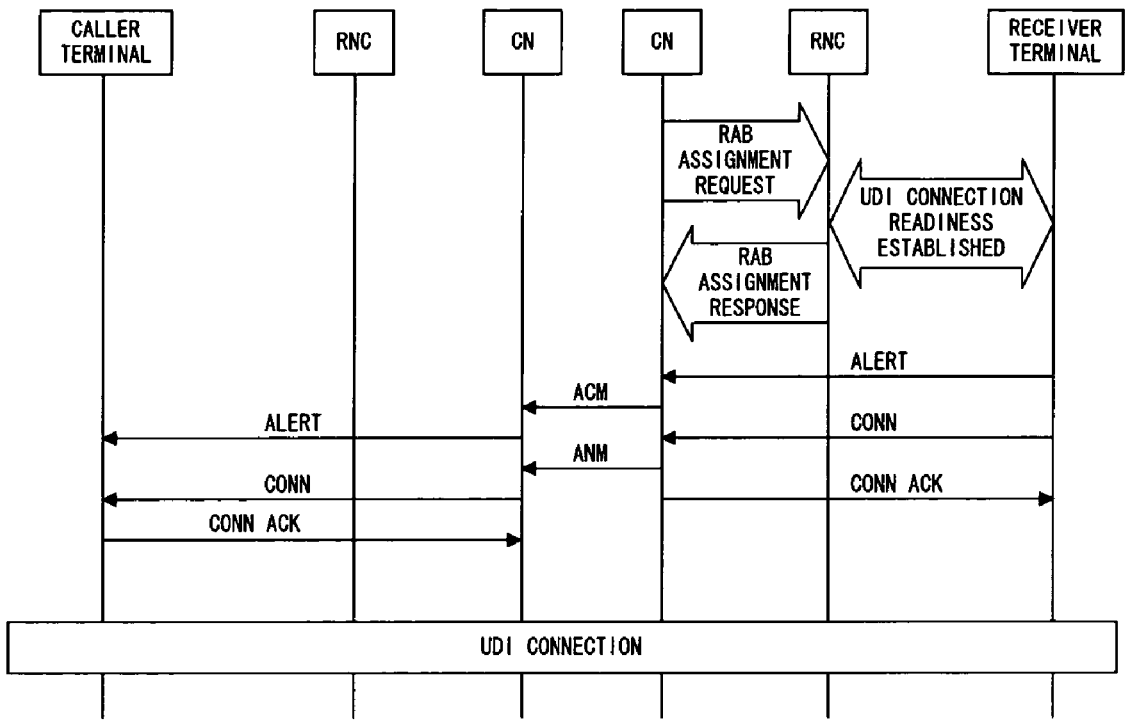
FIG. 29 exemplifies processing for telecommunication between a caller terminal and a receiver terminal in the case of setting up a "UDI priority transmission" for a caller priority call category and a "UDI priority reception" for a receiver priority call category.

FIGS. 28 and 29 exemplify processing for telecommunication between a caller terminal and a receiver terminal in the case of setting up a "UDI priority transmission" for a caller priority call category and a "UDI priority reception" for a receiver priority call category.

A caller terminal refers to the SETUP setting information 80 at the time of a transmission and obtains a SETUP setting (i.e., a requested call category of "UDI" and terminal capability information of "UDI/AMR") corresponding the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested call category of "UDI" and terminal capability information of "UDI/AMR"), followed by transmitting the priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiving terminal.

Having received the SETUP signal from the receiver side CN, the receiving terminal refers to the CALL CONFIRM setting information 110 and obtains a CALL CONFIRM setting (i.e., a response call category of "UDI" and terminal capability information of "UDI/AMR"), followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI priority" corresponding to the CALL CONFIRM setting (i.e., a response call category of "UDI" and terminal capability information of "UDI/AMR"), and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI transmission" can be connected to the receiver terminal by the UDI.

Then the processing shown by the paragraph (8) of FIG. 7 establishes the UDI connection.

Figure 30:
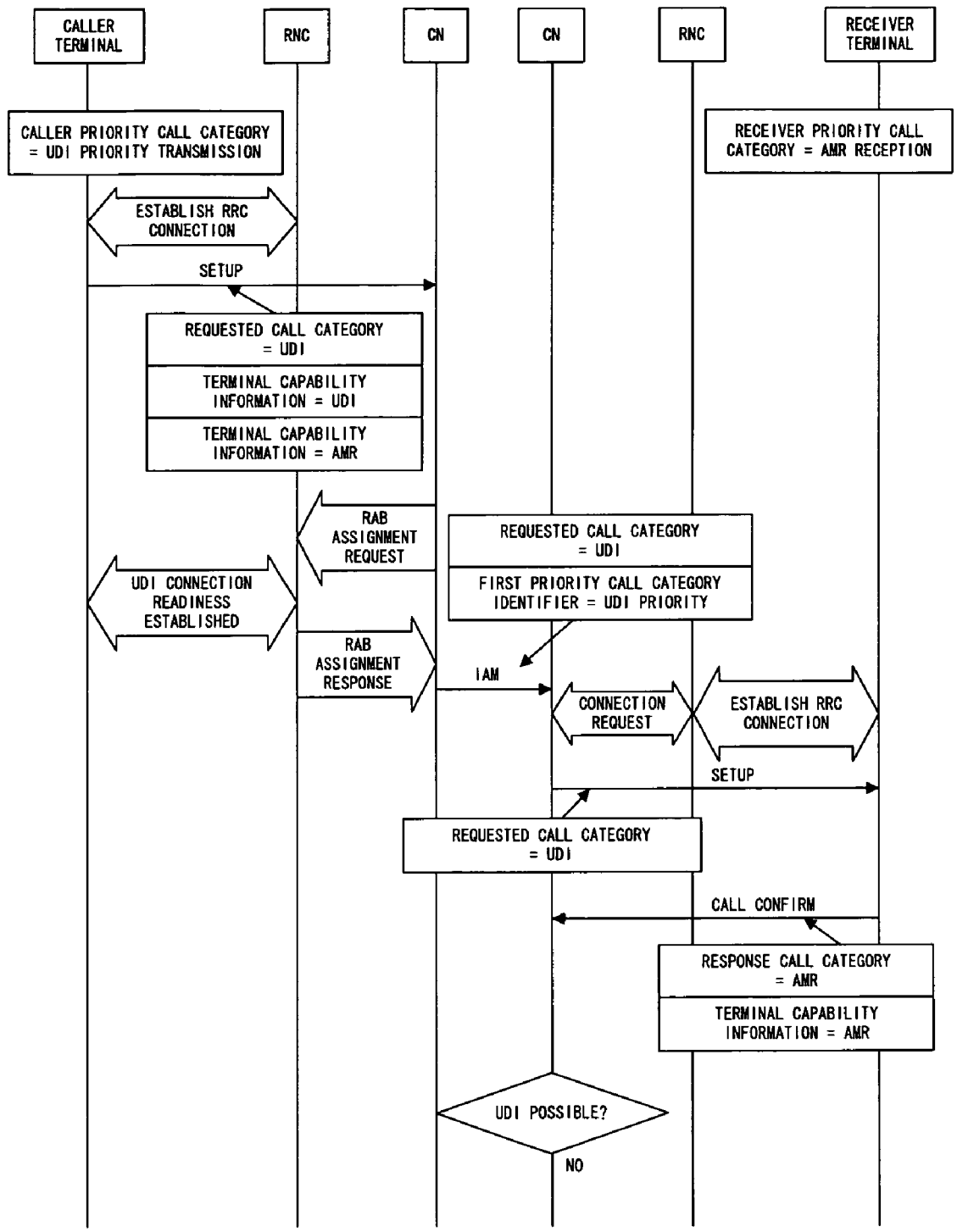
FIG. 30 exemplifies processing for telecommunication between a caller terminal and a receiver terminal in the case of setting up a "UDI priority transmission" for a caller priority call category and an "AMR reception" for a receiver priority call category.

FIGS. 30 and 31 exemplify processing for telecommunication between a caller terminal and a receiver terminal in the case of setting up a "UDI priority transmission" for a caller priority call category and an "AMR reception" for a receiver priority call category.

A caller terminal refers to the SETUP setting information 80 at the time of a transmission and obtains a SETUP setting (i.e., a requested call category of "UDI" and terminal capability information of "UDI/AMR") corresponding to the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested call category of "UDI" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge the caller terminal transmitting by the caller priority call category of "UDI priority transmission" can be connected to the receiver terminal responding by the receiver priority call category of "AMR reception" by the AMR.

Then the processing shown by the paragraph (9) of FIG. 7 establishes the AMR connection.

Figure 32:
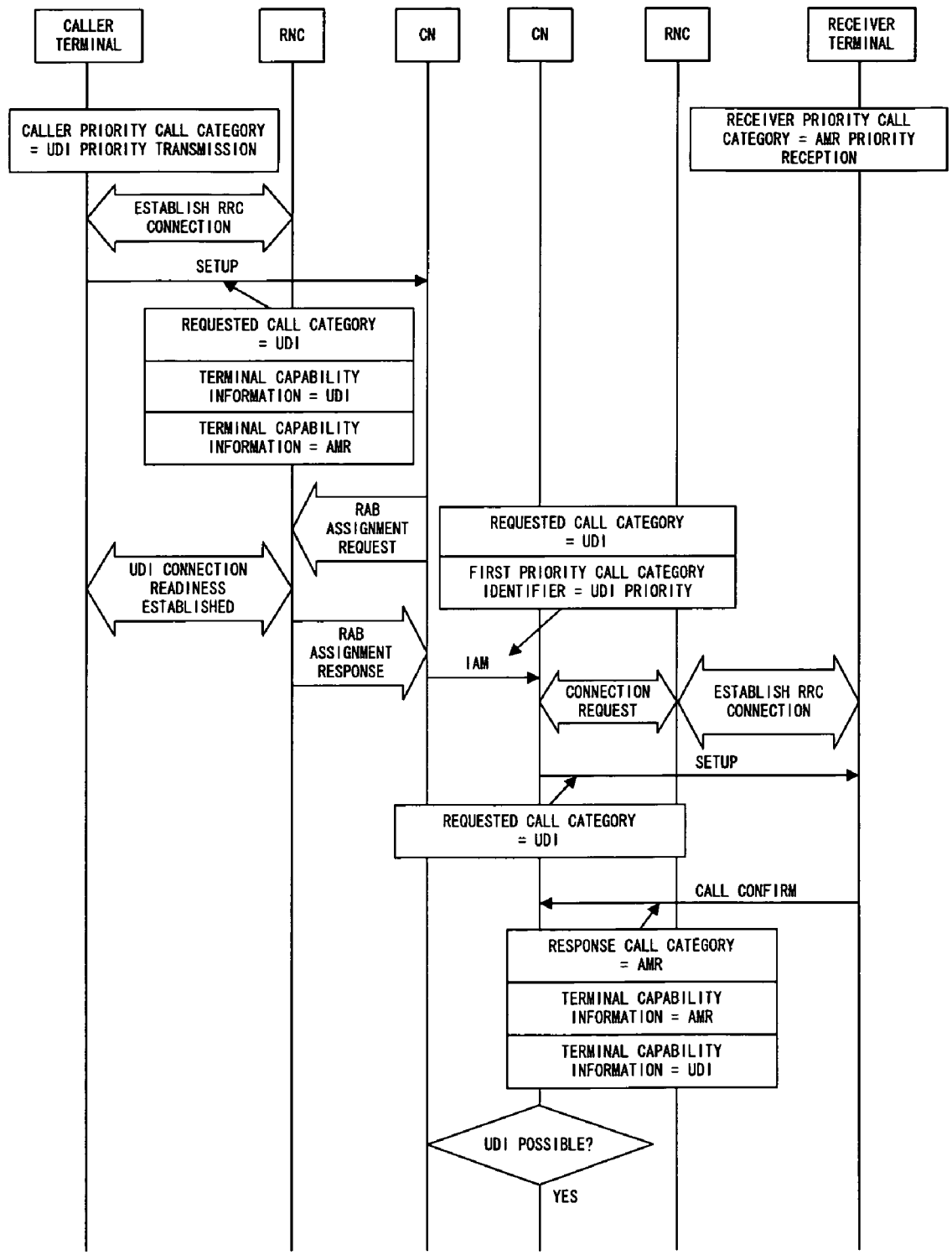
FIG. 32 exemplifies processing for telecommunication between a caller terminal and a receiver terminal in the case of setting up a "UDI priority transmission" for a caller priority call category and an "AMR priority reception" for a receiver priority call category.
Figure 33:
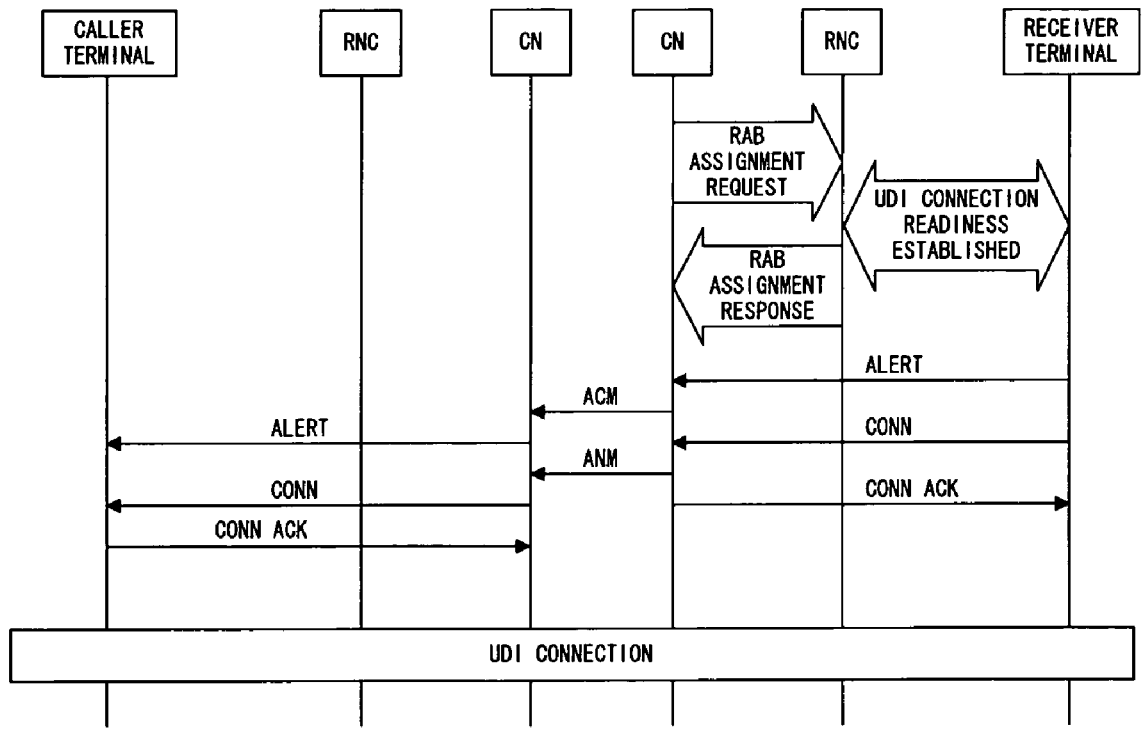
FIG. 33 exemplifies processing for telecommunication between a caller terminal and a receiver terminal in the case of setting up a "UDI priority transmission" for a caller priority call category and an "AMR priority reception" for a receiver priority call category.

FIGS. 32 and 33 exemplify processing for telecommunication between a caller terminal and a receiver terminal in the case of setting up a "UDI priority transmission" for a caller priority call category and an "AMR priority reception" for a receiver priority call category.

A caller terminal refers to the SETUP setting information 80 at the time of a transmission and obtains a SETUP setting (i.e., a requested call category of "UDI" and terminal capability information of "UDI/AMR") corresponding to the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested call category of "UDI" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with a SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "UDI/AMR") corresponding to the receiver priority call category of "AMR priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR priority" corresponding to the CALL CONFIRM setting (i.e., a response call category of "AMR" and terminal capability information of "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI priority transmission" can be connected to the receiver terminal by the UDI.

Then the processing shown by the paragraph (8) of FIG. 7 establishes the UDI connection.

Figure 34:
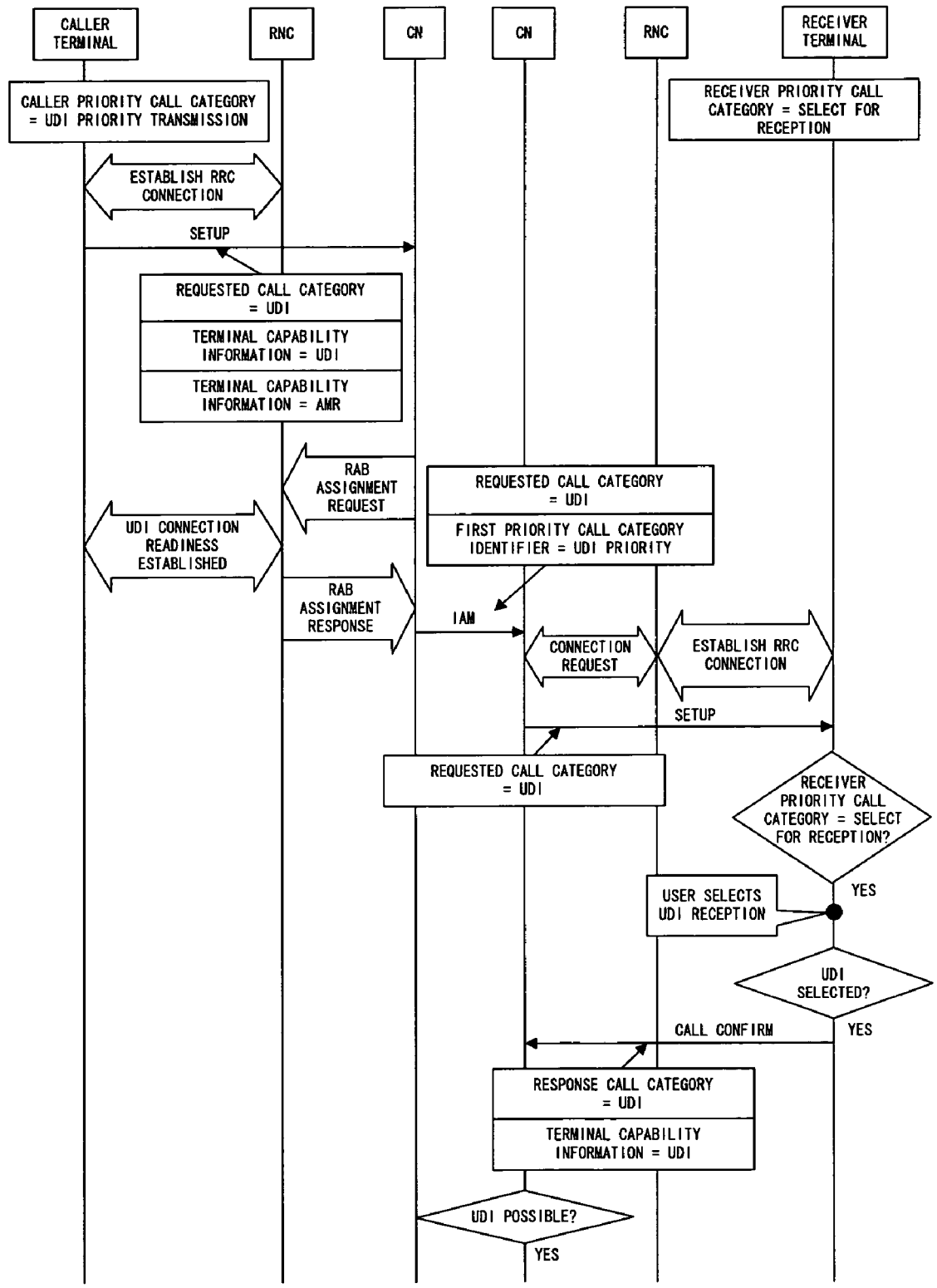
FIG. 34 exemplifies processing for telecommunication between a caller terminal and a receiver terminal in the case of setting up a "UDI priority transmission" for a caller priority call category and a "select for reception", followed by selecting a "UDI reception" for a receiver priority call category.
Figure 35:
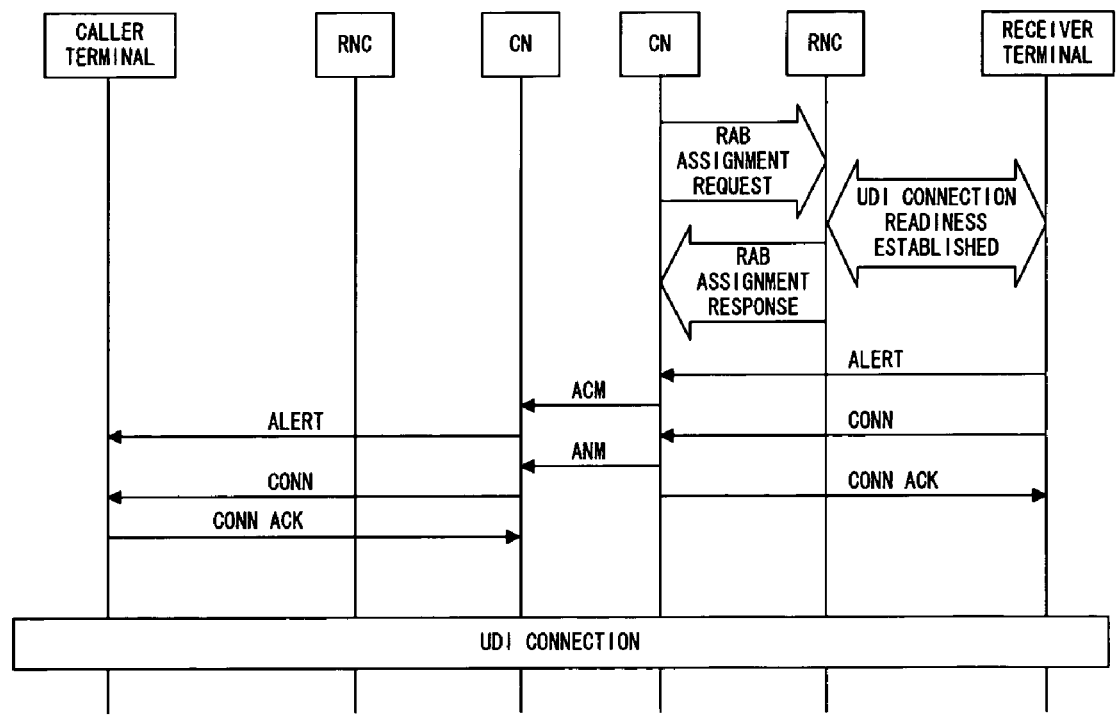
FIG. 35 exemplifies processing for telecommunication between a caller terminal and a receiver terminal in the case of setting up a "UDI priority transmission" for a caller priority call category and a "select for reception", followed by selecting a "UDI reception" for a receiver priority call category.

FIGS. 34 and 35 exemplify processing for telecommunication between a caller terminal and a receiver terminal in the case of setting up a "UDI priority transmission" for a caller priority call category and a "select for reception", followed by selecting a "UDI reception" for a receiver priority call category.

A caller terminal refers to the SETUP setting information 80 at the time of a transmission and obtains a SETUP setting (i.e., a requested call category of "UDI" and terminal capability information of "UDI/AMR") corresponding to the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested call category of "UDI" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI" corresponding to the first priority call category identifier, followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception". If the receiver priority call category is "select for reception", the display unit 24e displays a selection menu of "UDI reception" or "AMR reception" to prompt a user selection.

If the user selects "UDI reception" by handling the operator unit 24d, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "UDI priority transmission" can be connected to the receiver terminal by the UDI.

Then the processing of the paragraph (8) shown by FIG. 7 establishes the UDI connection.

Figure 36:
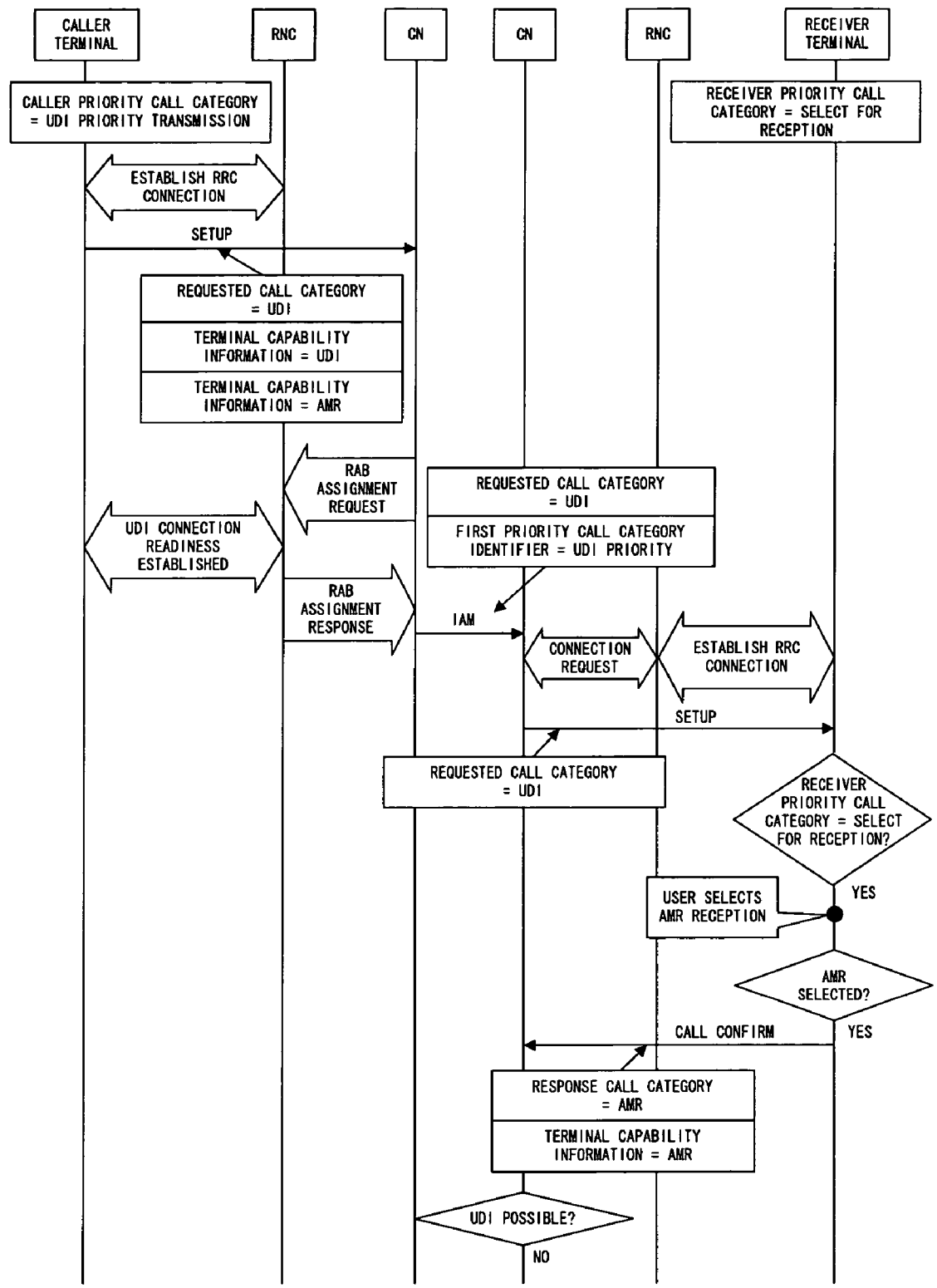
FIG. 36 exemplifies processing for telecommunication between a caller terminal and a receiver terminal in the case of setting up a "UDI priority transmission" for a caller priority call category and a "select for reception", followed by selecting an "AMR reception" for a receiver priority call category.
Figure 37:
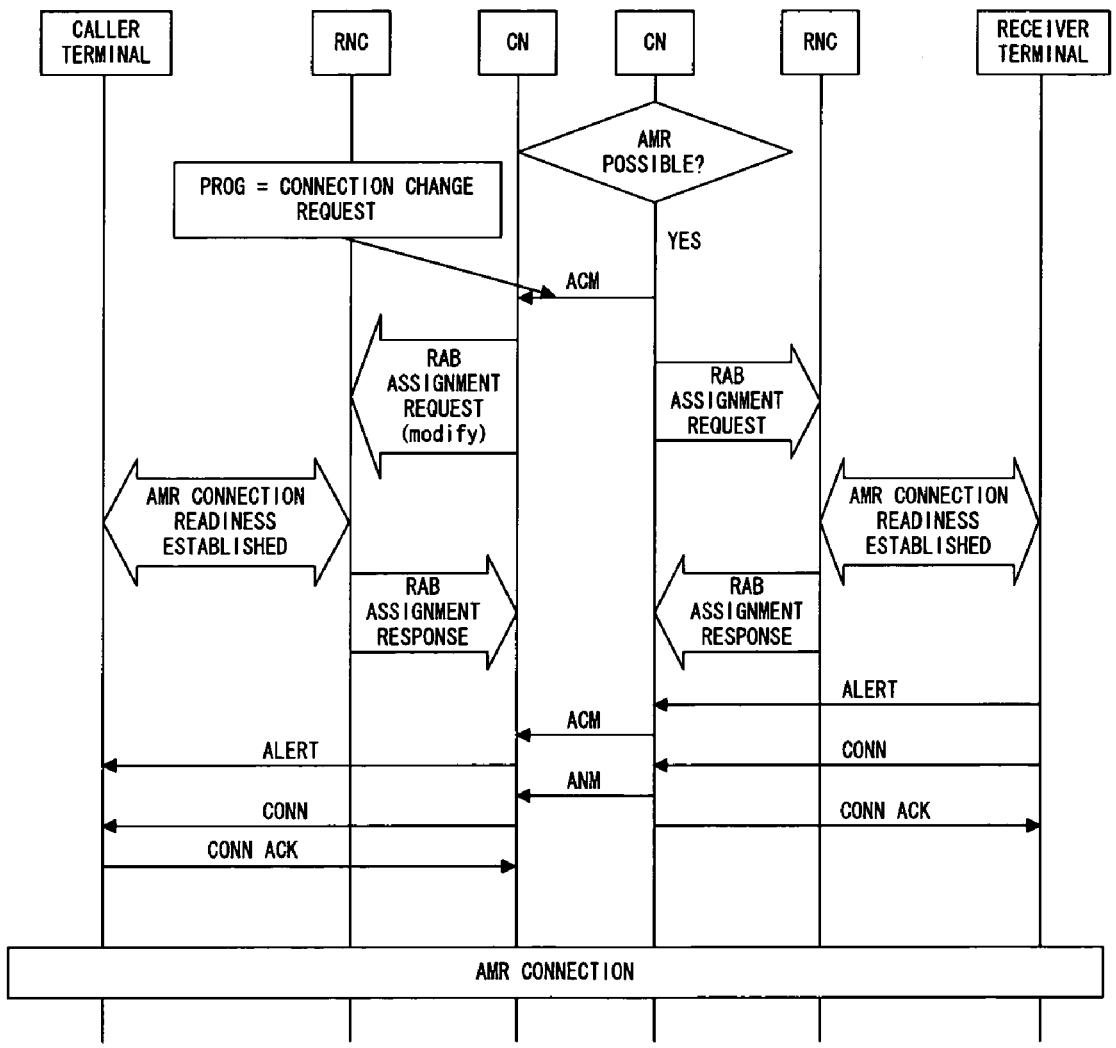
FIG. 37 exemplifies processing for telecommunication between a caller terminal and a receiver terminal in the case of setting up a "UDI priority transmission" for a caller priority call category and a "select for reception", followed by selecting an "AMR reception" for a receiver priority call category.

FIGS. 36 and 37 exemplify processing for telecommunication between a caller terminal and a receiver terminal in the case of setting up a "UDI priority transmission" for a caller priority call category and a "select for reception", followed by selecting an "AMR reception" for a receiver priority call category.

A caller terminal refers to the SETUP setting information 80 at the time of a transmission and obtains a SETUP setting (i.e., a requested priority call category of "UDI" and terminal capability information of "UDI/AMR") corresponding to the caller priority call category of "UDI priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "UDI priority" corresponding to the SETUP setting (i.e., a requested priority call category of "UDI" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "UDI", followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception". If the receiver priority call category is "select for reception", the display unit 24e displays a selection menu of "UDI reception" or "AMR reception" to prompt a user selection.

If the user selects "AMR reception" by handling the operator unit 24d, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "UDI priority transmission" can be connected to the receiver terminal responding by the receiver priority call category of "AMR reception" by the AMR.

Then, the processing of the paragraph (9) shown by FIG. 7 establishes the AMR connection.

Figure 38:
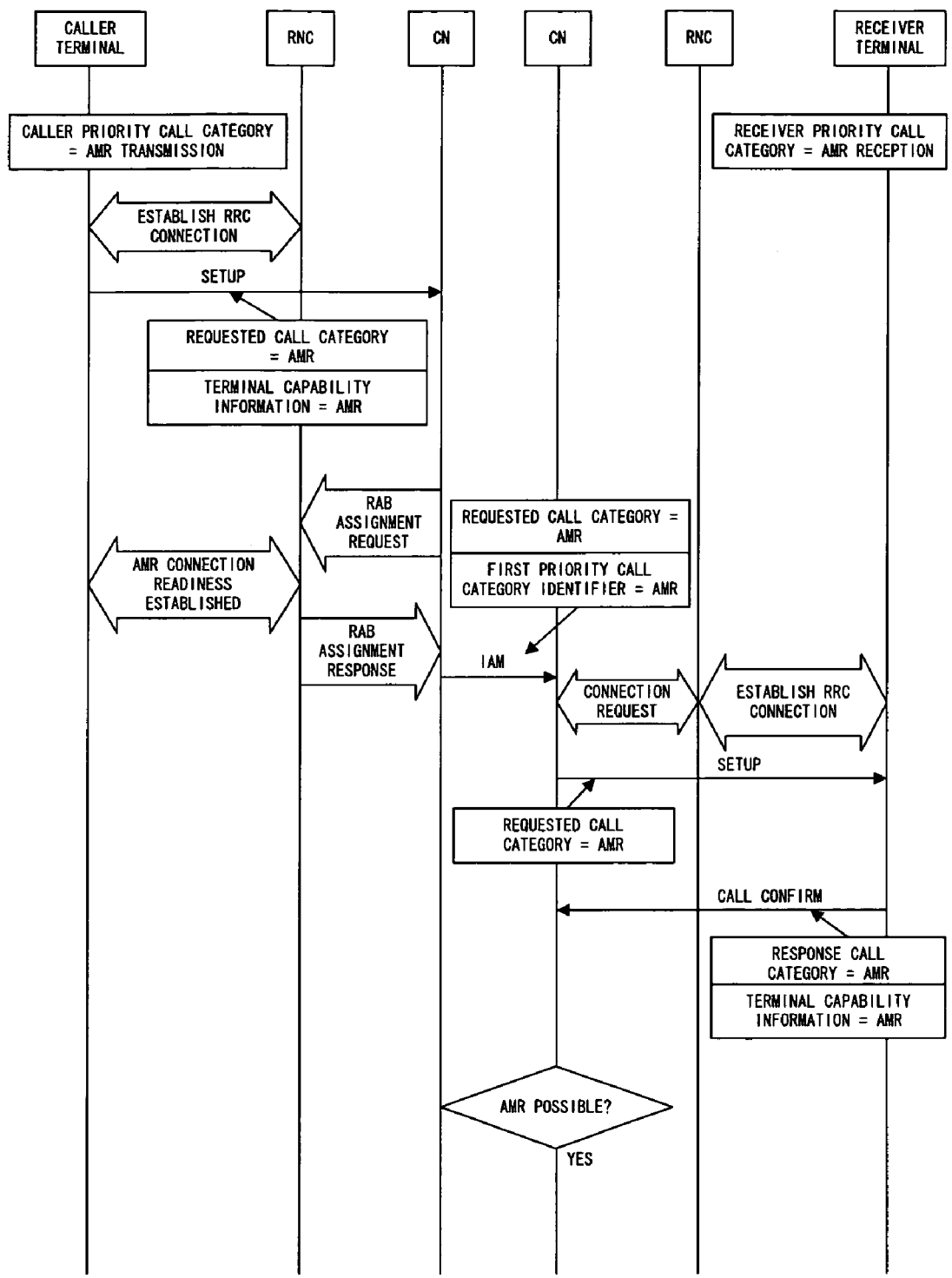
FIG. 38 exemplifies processing for telecommunication between a caller terminal and a receiver terminal in the case of setting up an "AMR transmission" for a caller priority call category and an "AMR reception" for a receiver priority call category.
Figure 39:
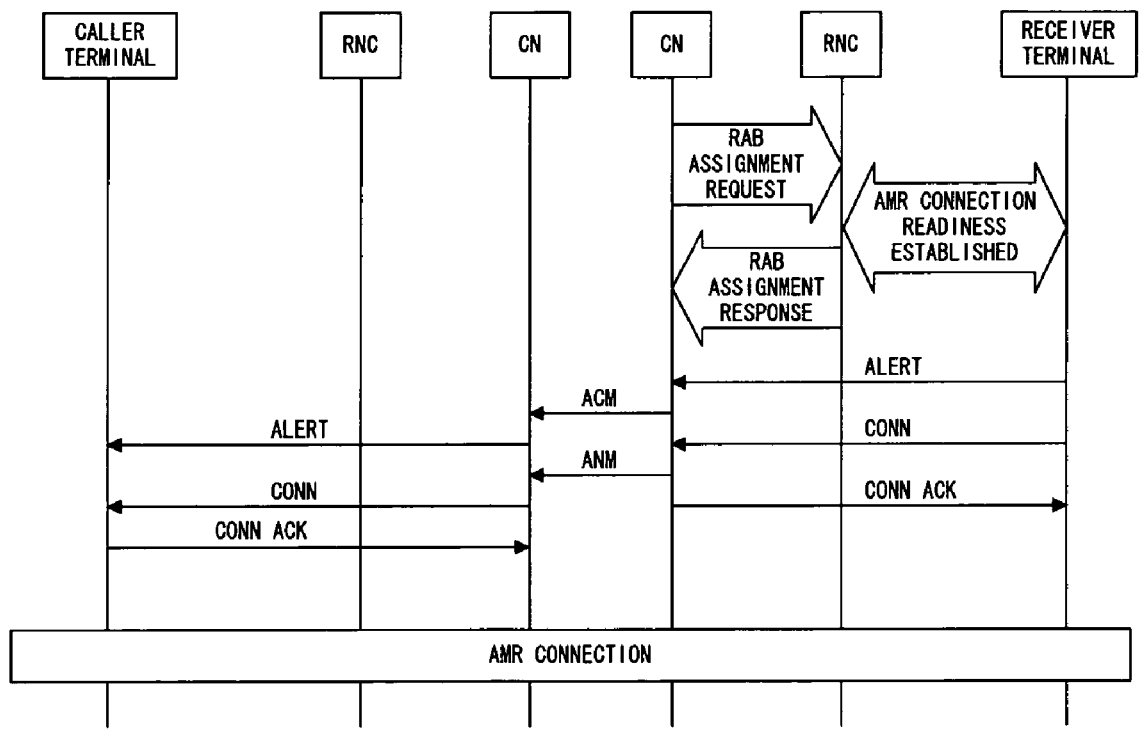
FIG. 39 exemplifies processing for telecommunication between a caller terminal and a receiver terminal in the case of setting up an "AMR transmission" for a caller priority call category and an "AMR reception" for a receiver priority call category.

FIGS. 38 and 39 exemplify processing for telecommunication between a caller terminal and a receiver terminal in the case of setting up an "AMR transmission" for a caller priority call category and an "AMR reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority call category of "AMR transmission", followed by transmitting the SETUP setting together with a SETUP signal to a caller side CN.

Having received the SETUP setting, the caller side CN refers to the priority call category judgment information 90 and obtains a priority call category identifier (i.e., a first priority call category identifier) of "AMR" corresponding to the SETUP setting (i.e., a requested priority call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "AMR") corresponding to the caller priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "AMR transmission" can be connected to the receiver terminal by the AMR.

Then, the processing of the paragraph (8) shown by FIG. 7 establishes the AMR connection.

FIGS. 40 and 41 exemplify processing for telecommunication between a caller terminal and a receiver terminal in the case of setting up an "AMR transmission" for a caller priority call category and an "AMR priority reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority call category of "AMR transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR" corresponding to the SETUP setting (i.e., a requested call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "UDI/AMR") corresponding to the receiver priority call category of "AMR priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR priority" corresponding to the CALL CONFIRM setting (i.e., a response call category of "AMR" and terminal capability information of "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR". The caller terminal transmitting by the caller priority call category of "AMR transmission" is judged to be connected to the receiver terminal by the AMR.

Then, the processing of the paragraph (8) shown by FIG. 7 establishes the AMR connection.

Figure 42:
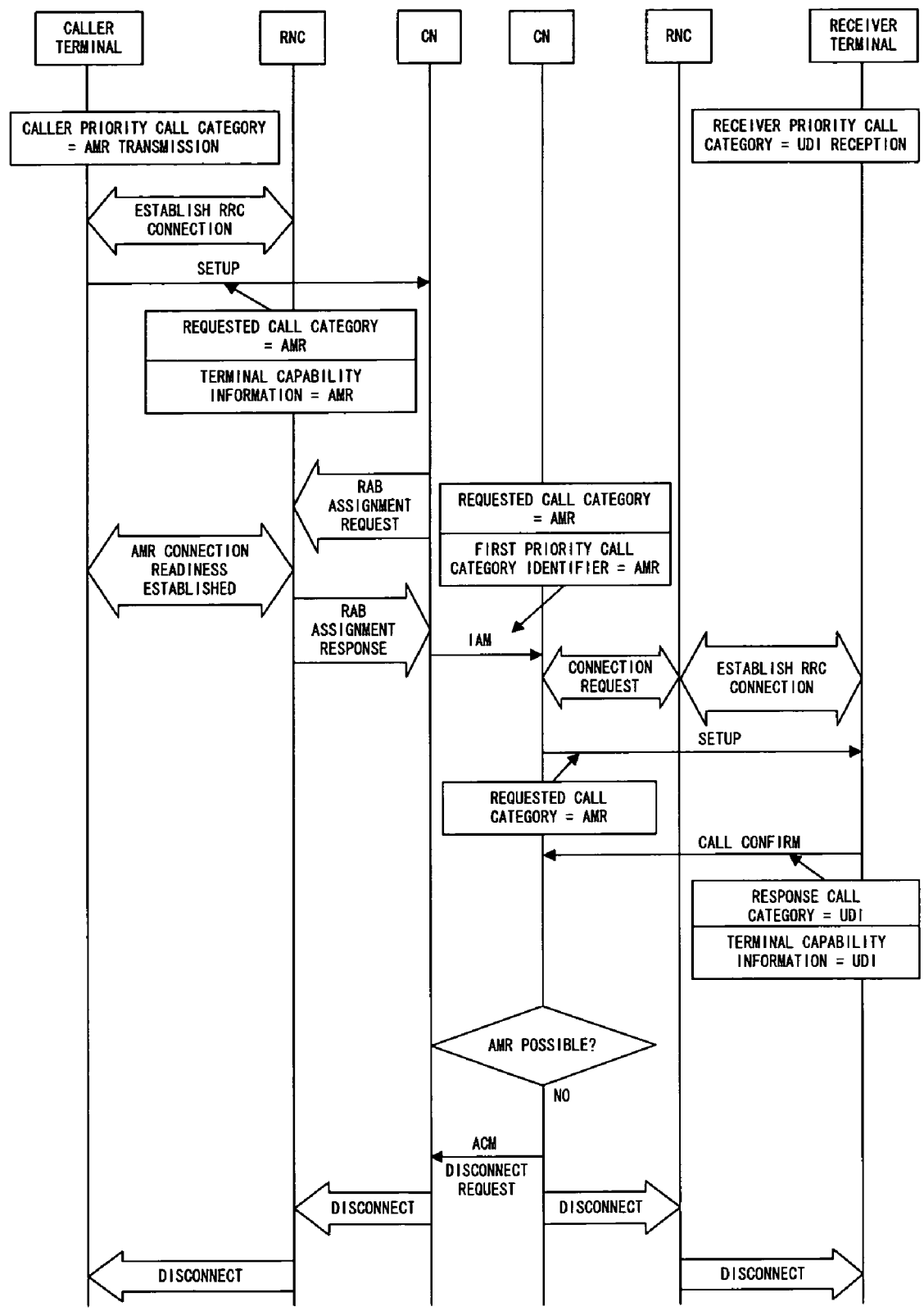
FIG. 42 exemplifies processing for telecommunication between a caller terminal and a receiver terminal in the case of setting up an "AMR transmission" for a caller priority call category and a "UDI reception" for a receiver priority call category.

FIG. 42 exemplifies processing for telecommunication between a caller terminal and a receiver terminal in the case of setting up an "AMR transmission" for a caller priority call category and a "UDI reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority category of "AMR transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR" corresponding to the SETUP setting (i.e., a requested call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the caller terminal, the receiver side CN refers to the priority call category judgment information 90, obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a "disconnect" of the telecommunication, that is, to judge that the caller terminal transmitting by the caller priority call category of "AMR transmission" cannot be connected to the receiver terminal responding by the receiver priority call category of "UDI reception".

Then the processing of the paragraph (10) shown by FIG. 9 disconnects the telecommunication.

Figure 43:
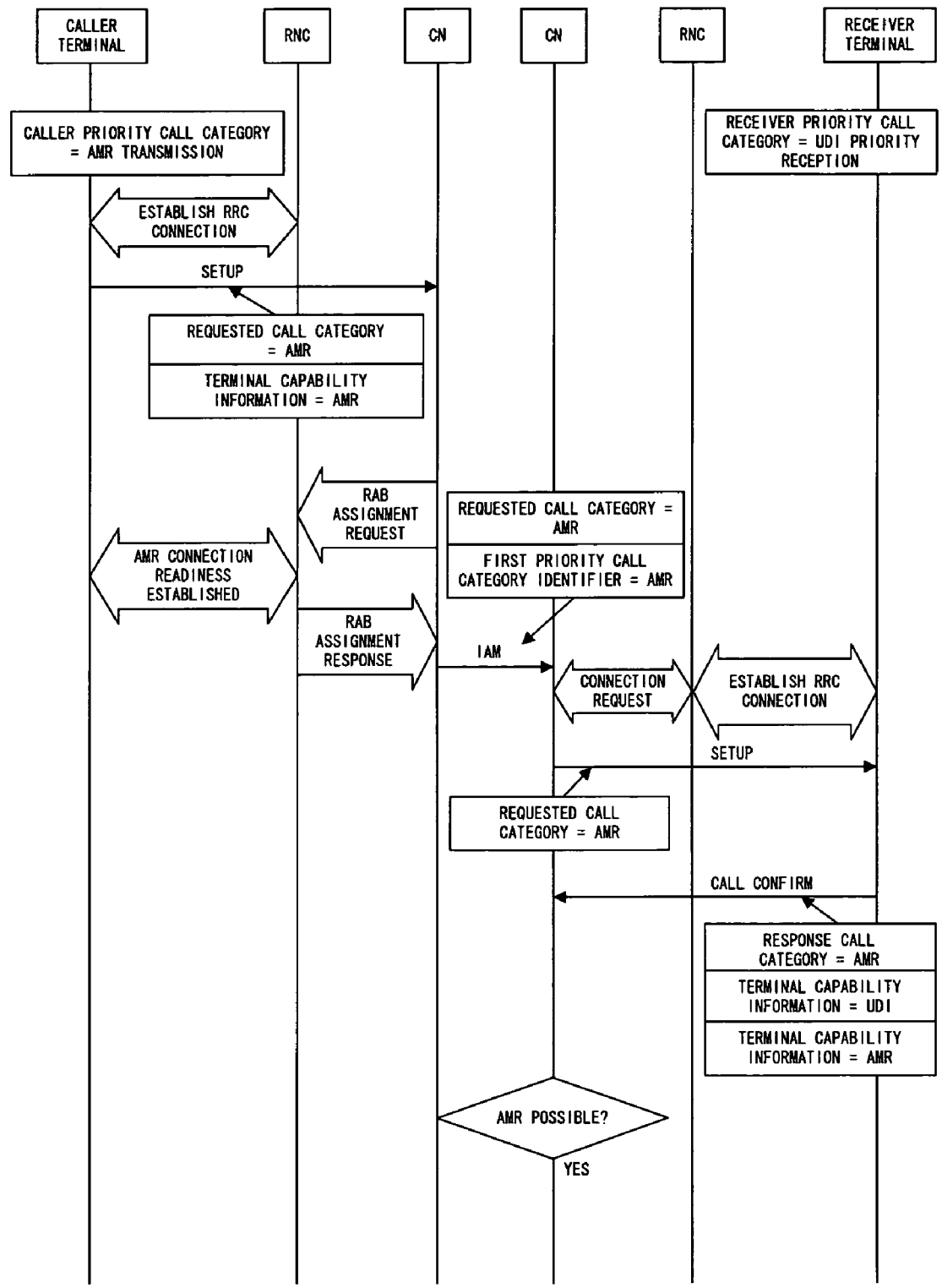
FIG. 43 exemplifies processing for telecommunication between a caller terminal and a receiver terminal in the case of setting up an "AMR transmission" for a caller priority call category and a "UDI priority reception" for a receiver priority call category.

FIGS. 43 and 44 exemplify processing for telecommunication between a caller terminal and a receiver terminal in the case of setting up an "AMR transmission" for a caller priority call category and a "UDI priority reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority category of "AMR transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR" corresponding to the SETUP setting (i.e., a requested call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI/AMR") corresponding to the receiver priority call category of "UDI priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI priority" corresponding to the CALL CONFIRM setting (i.e., a response call category of "UDI" and terminal capability information of "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "AMR transmission" can be connected to the receiver terminal by the AMR.

Then, the processing of the paragraph (8) shown by FIG. 7 establishes the AMR connection.

FIGS. 45 and 46 exemplify processing for telecommunication between a caller terminal and a receiver terminal in the case of setting up an "AMR transmission" for a caller priority call category and a "select for reception", followed by selecting an "AMR reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority category of "AMR transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR" corresponding to the SETUP setting (i.e., a requested call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception". If the receiver priority call category is "select for reception", the display unit 24e displays a menu of "UDI reception" or "AMR reception" to prompt a user selection.

If the user selects "AMR reception" by handling the operator unit 24d, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the and CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "AMR transmission" can be connected to the receiver terminal by the AMR.

Then, the processing of the paragraph (8) shown by FIG. 7 establishes the AMR connection.

Figure 47:
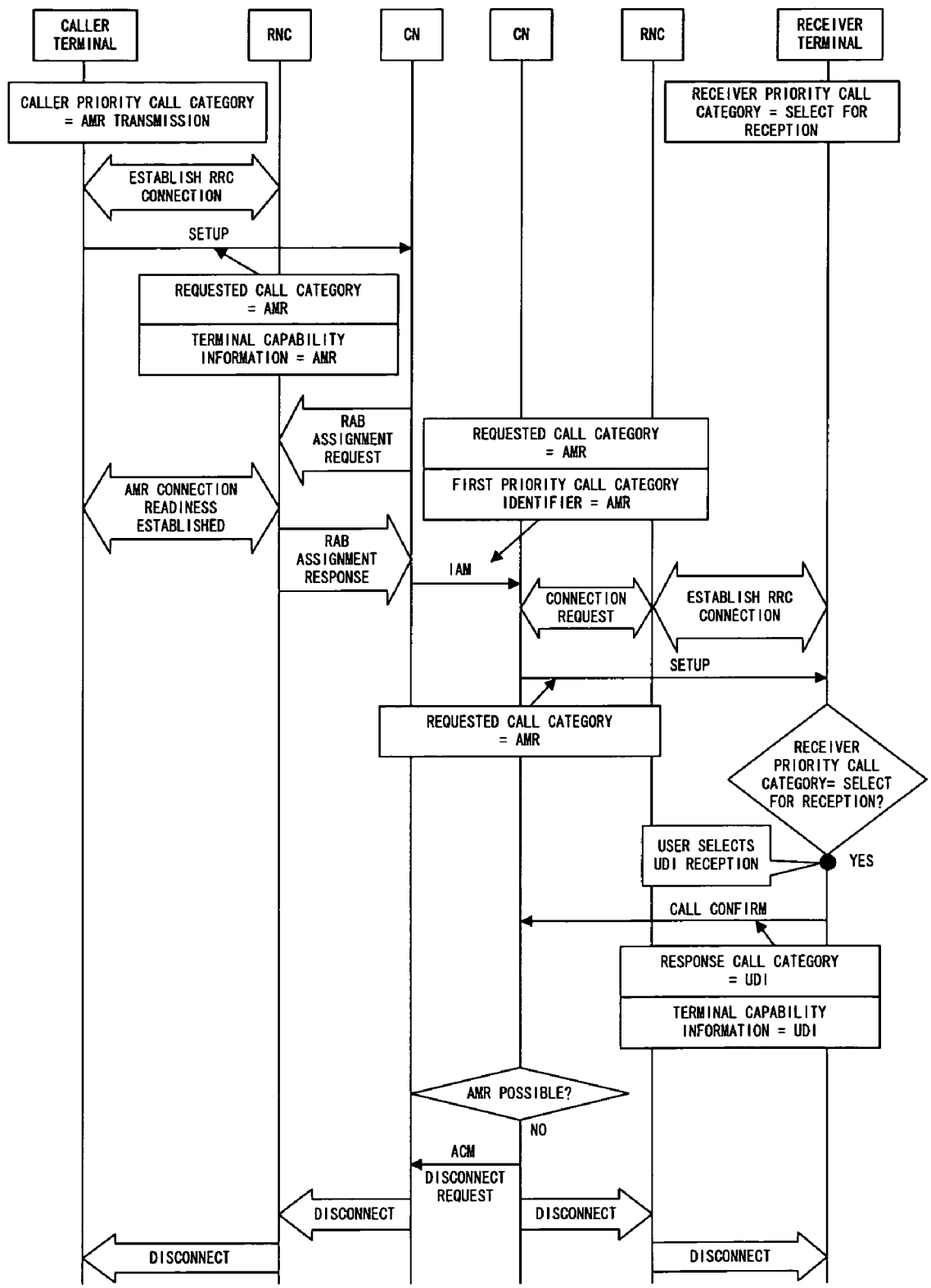
FIG. 47 exemplifies processing for telecommunication between a caller terminal and a receiver terminal in the case of setting up an "AMR transmission" for a caller priority call category and a "select for reception", followed by selecting a "UDI reception" for a receiver priority call category.

FIG. 47 exemplifies processing for telecommunication between a caller terminal and a receiver terminal in the case of setting up an "AMR transmission" for a caller priority call category and a "select for reception", followed by selecting a "UDI reception" for a receiver priority call category.

A caller terminal refers to the SETUP setting information 80 at the time of a transmission and obtains a SETUP setting (i.e., a requested call category of "AMR" and terminal capability information of "AMR") corresponding to the caller priority category of "AMR transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR" corresponding to the SETUP setting (i.e., a requested call category of "AMR" and terminal capability information of "AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category "AMR" corresponding to the first priority call category identifier, followed by transmitting the requested call category together with the SETUP signal to a receiver terminal.

Having received the SETUP signal from the receiver side CN, the receiver terminal refers to a receiver priority call category stored in the storage unit 24c for example and judges whether or not the aforementioned receiver priority call category is "select for reception". If the receiver priority call category is "select for reception", the display unit 24e displays a selection menu of "UDI reception" or "AMR reception" to prompt a user selection.

If the user selects "UDI reception" by handling the operator unit 24d, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a "disconnect" of the telecommunication, that is, to judge that the caller terminal transmitting by the caller priority call category of "AMR transmission" cannot be connected to the receiver terminal responding the receiver priority call category of "UDI reception" by the UDI.

Then, the processing of the paragraph (10) shown by FIG. 9 disconnects the telecommunication.

Figure 48:
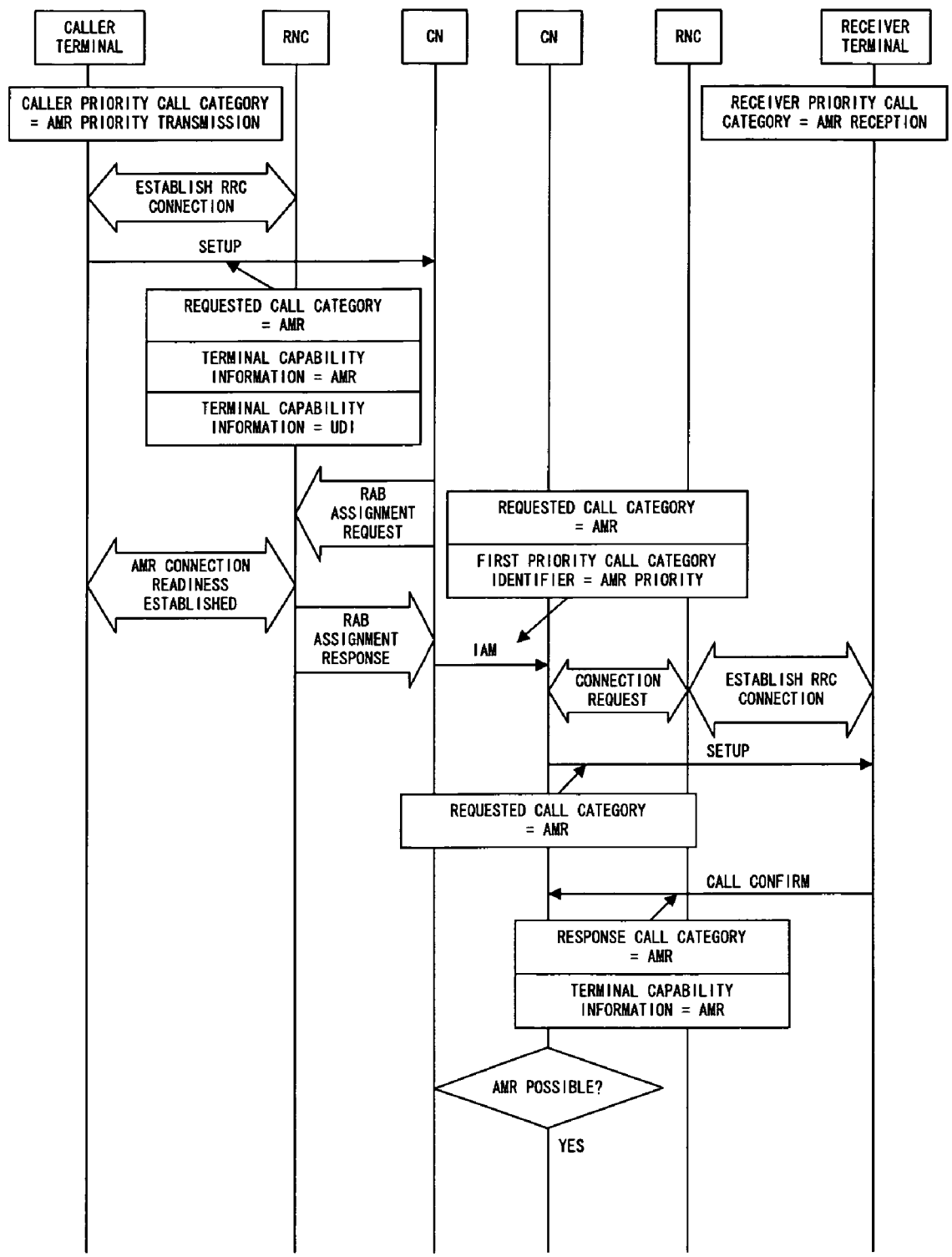
FIG. 48 exemplifies processing for telecommunication between a caller terminal and a receiver terminal in the case of setting up an "AMR priority transmission" for a caller priority call category and an "AMR reception" for a receiver priority call category.
Figure 49:
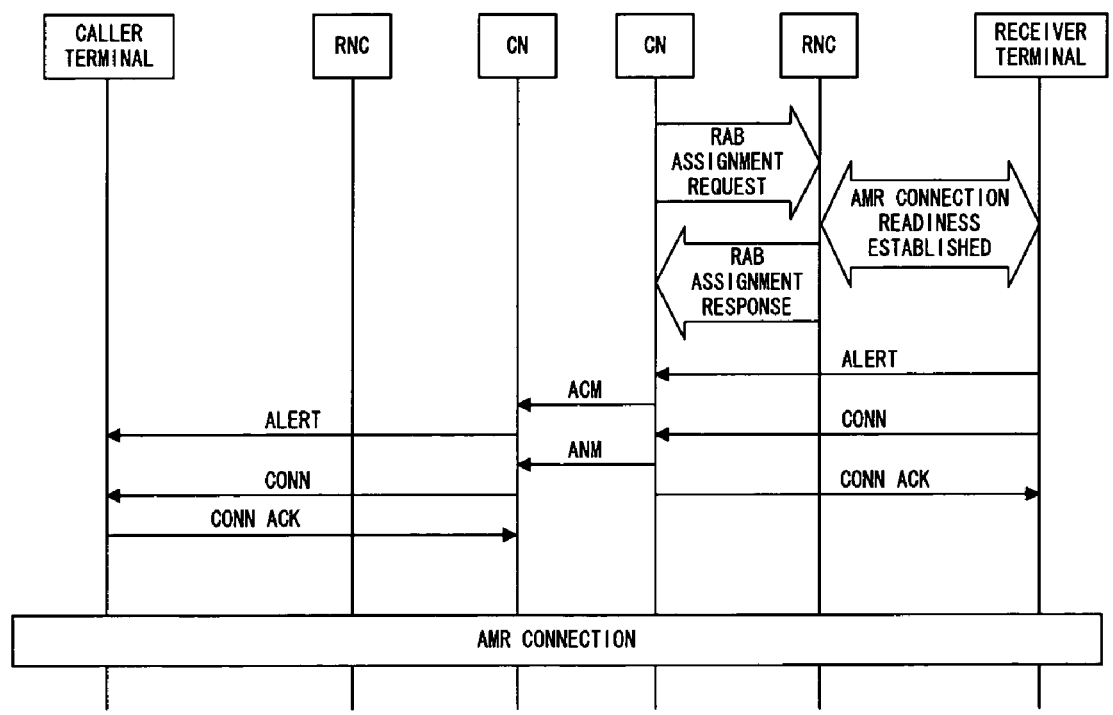
FIG. 49 exemplifies processing for telecommunication between a caller terminal and a receiver terminal in the case of setting up an "AMR priority transmission" for a caller priority call category and an "AMR reception" for a receiver priority call category.

FIGS. 48 and 49 exemplify processing for telecommunication between a caller terminal and a receiver terminal in the case of setting up an "AMR priority transmission" for a caller priority call category and an "AMR reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "AMR priority transmission" can be connected to the receiver terminal responding by the receiver priority call category of "AMR reception" by the AMR.

Then, the processing of the paragraph (8) shown by FIG. 7 establishes the AMR connection.

Figure 50:
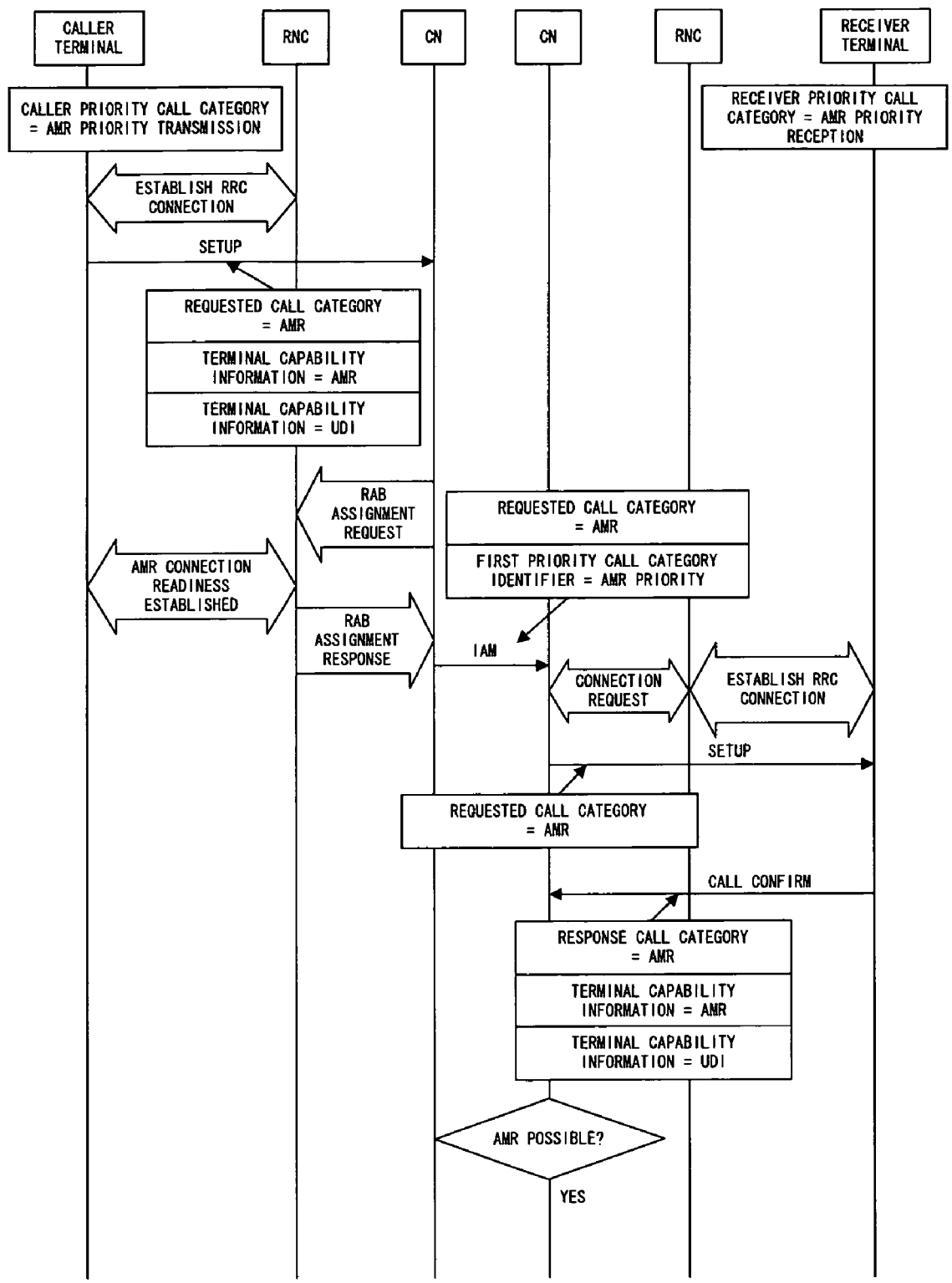
FIG. 50 exemplifies processing for telecommunication between a caller terminal and a receiver terminal in the case of setting up an "AMR priority transmission" for a caller priority call category and an "AMR priority reception" for a receiver priority call category.

FIGS. 50 and 51 exemplify processing for telecommunication between a caller terminal and a receiver terminal in the case of setting up an "AMR priority transmission" for a caller priority call category and an "AMR priority reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "AMR" and terminal capability information of "UDI/AMR") corresponding to the receiver priority call category of "AMR priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR priority" corresponding to the CALL CONFIRM setting (i.e., a response call category of "AMR" and terminal capability information of "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority category of "AMR priority transmission" can be connected to the receiver terminal by the AMR.

Then, the processing of the paragraph (8) shown by FIG. 7 establishes the AMR connection.

Figure 52:
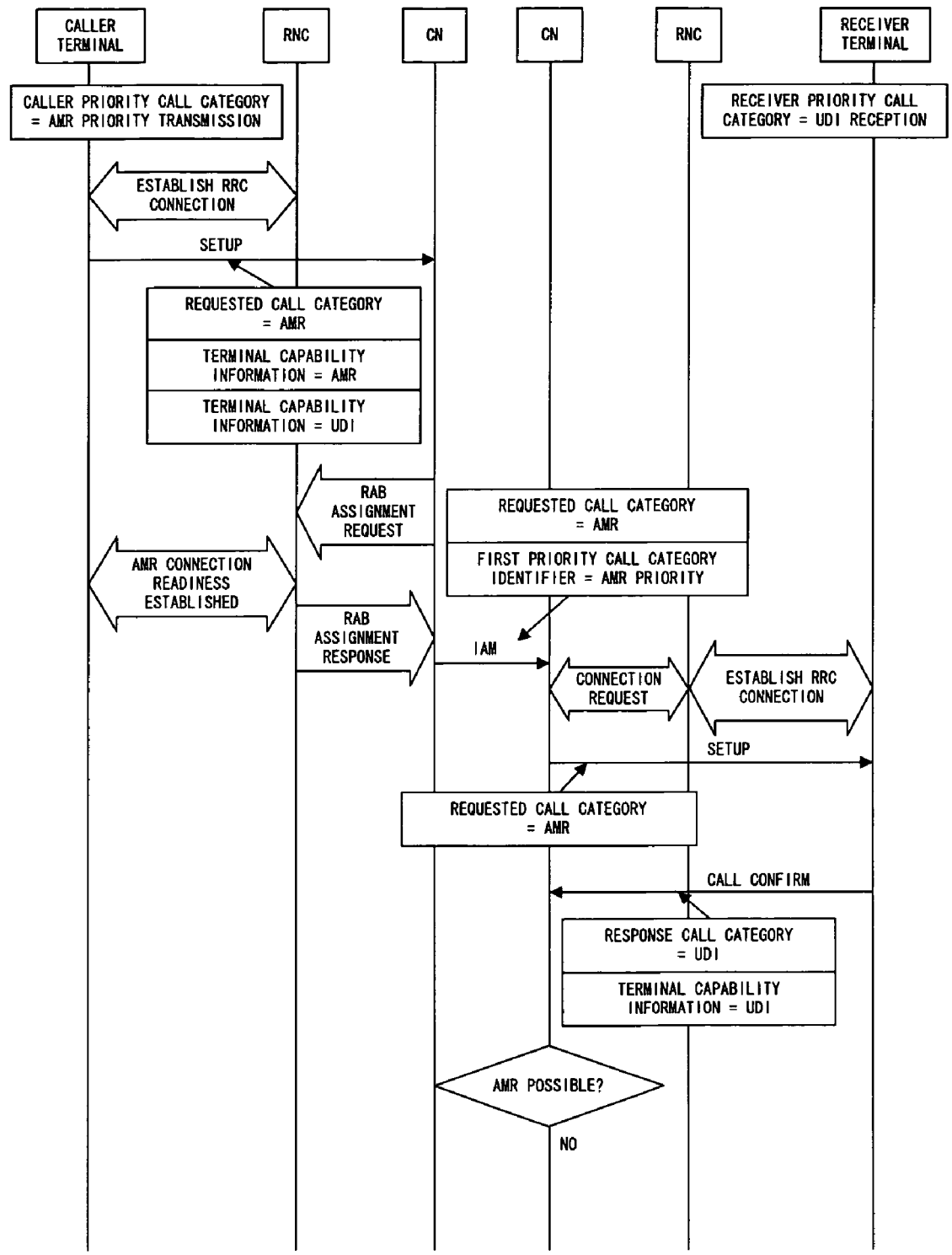
FIG. 52 exemplifies processing for telecommunication between a caller terminal and a receiver terminal in the case of setting up an "AMR priority transmission" for a caller priority call category and a "UDI reception" for a receiver priority call category.
Figure 53:
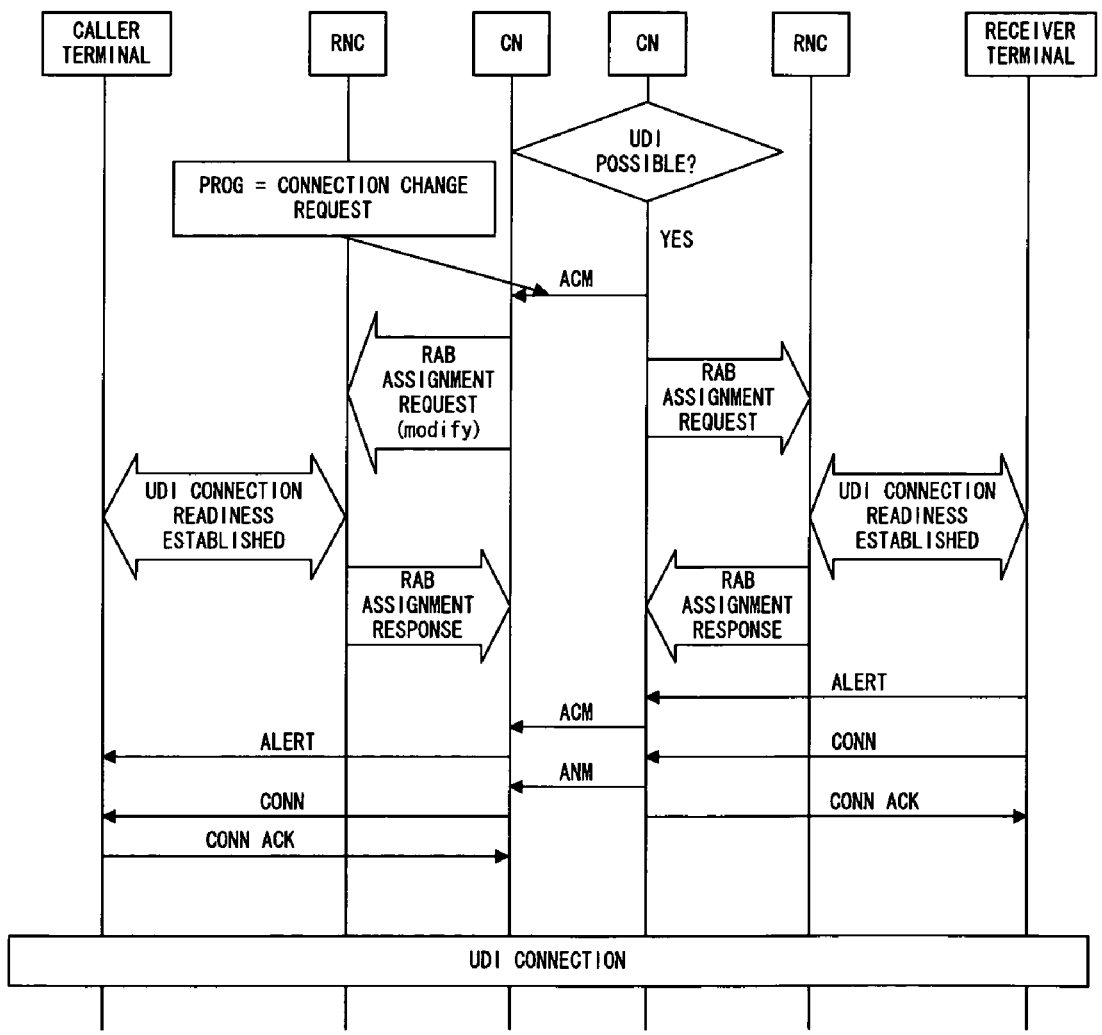
FIG. 53 exemplifies processing for telecommunication between a caller terminal and a receiver terminal in the case of setting up an "AMR priority transmission" for a caller priority call category and a "UDI reception" for a receiver priority call category.

FIGS. 52 and 53 exemplify processing for telecommunication between a caller terminal and a receiver terminal in the case of setting up an "AMR priority transmission" for a caller priority call category and a "UDI reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority category of "AMR priority transmission" can be connected to the receiver terminal responding by the receiver priority call category of "UDI reception" by the UDI.

Then, the processing of the paragraph (9) shown by FIG. 7 establishes the UDI connection.

FIGS. 54 and 55 exemplify processing for telecommunication between a caller terminal and a receiver terminal in the case of setting up an "AMR priority transmission" for a caller priority call category and a "UDI priority reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to the CALL CONFIRM setting information 110 and obtains a CALL CONFIRM setting (i.e., a response call category of "UDI" and terminal capability information of "UDI/AMR") corresponding to the receiver priority call category of "UDI priority reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI priority" corresponding to the CALL CONFIRM setting (i.e., a response call category of "UDI" and terminal capability information of "UDI/AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority category of "AMR priority transmission" can be connected to the receiver terminal by the AMR.

Then, the processing of the number (8) shown by FIG. 7 establishes the AMR connection.

Figure 56:
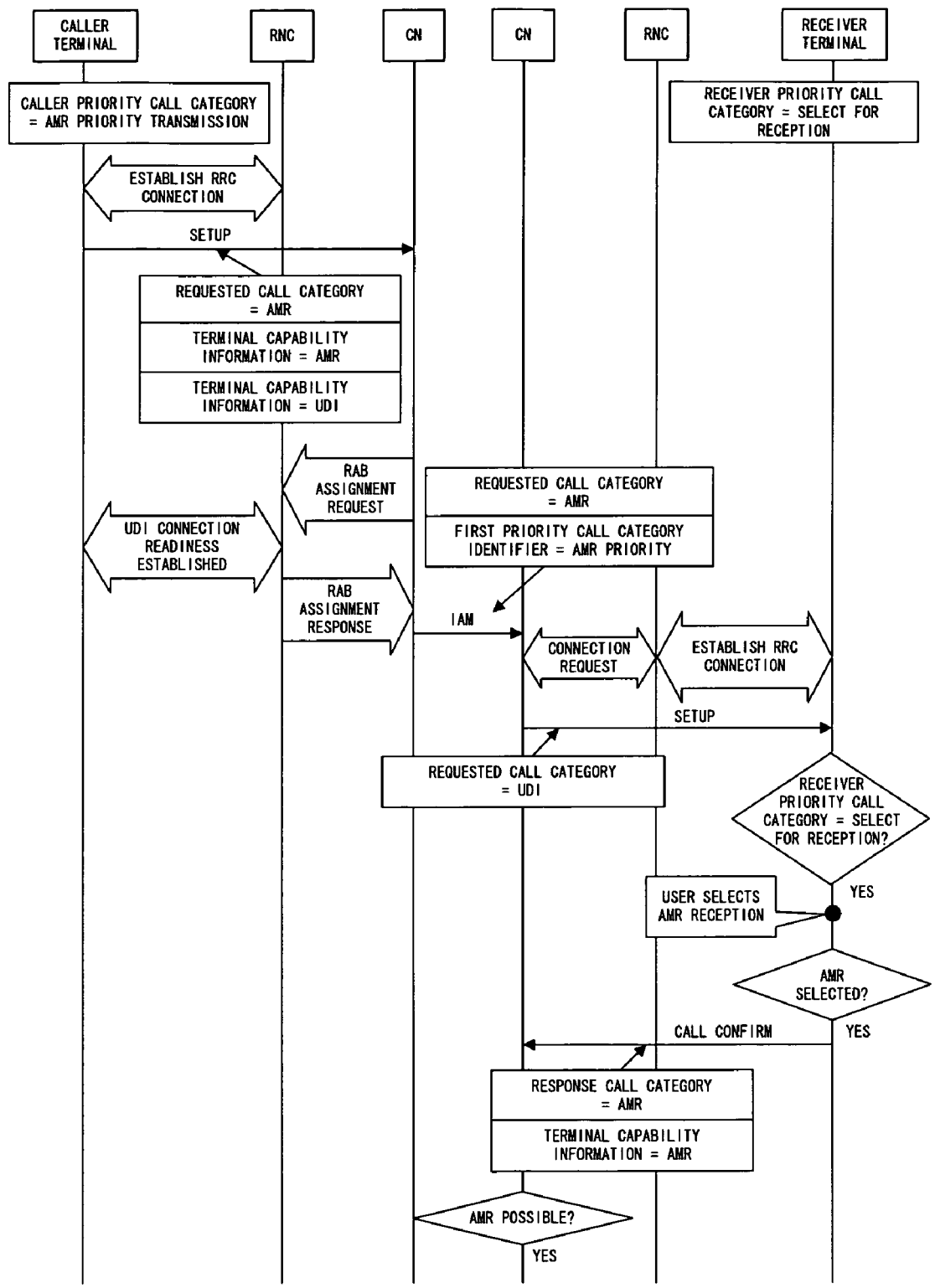
FIG. 56 exemplifies processing for telecommunication between a caller terminal and a receiver terminal in the case of setting up an "AMR priority transmission" for a caller priority call category and a "select for reception", followed by selecting an "AMR reception" for a receiver priority call category.
Figure 57:
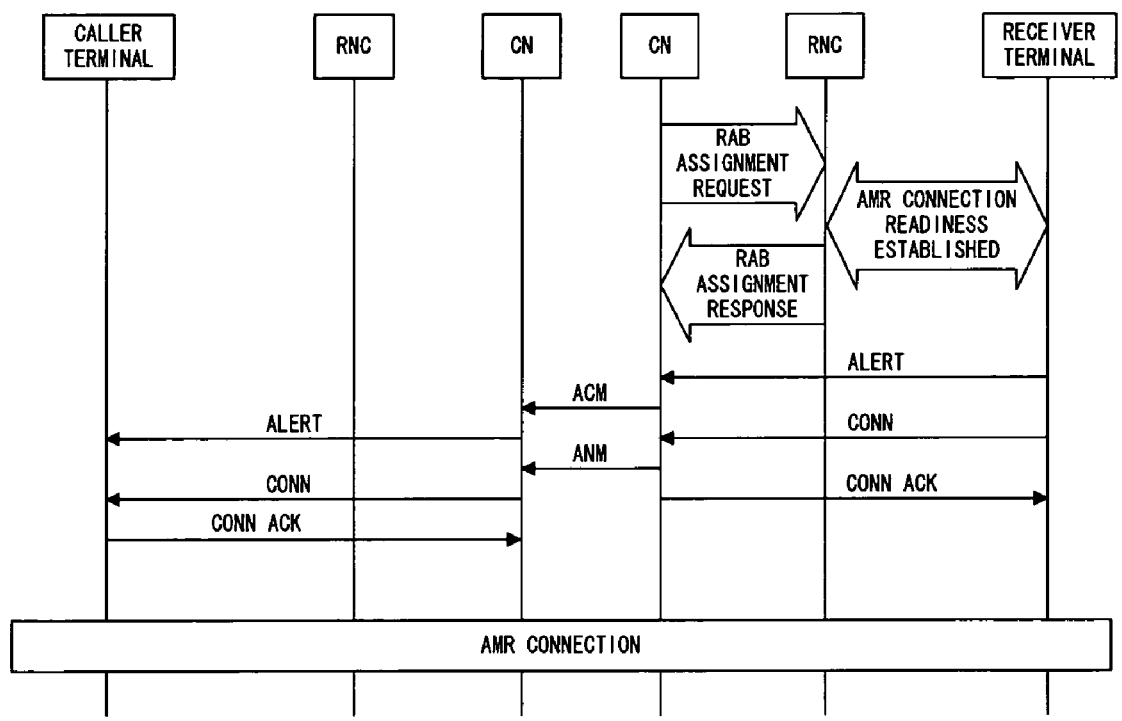
FIG. 57 exemplifies processing for telecommunication between a caller terminal and a receiver terminal in the case of setting up an "AMR priority transmission" for a caller priority call category and a "select for reception", followed by selecting an "AMR reception" for a receiver priority call category.

FIGS. 56 and 57 exemplify processing for telecommunication between a caller terminal and a receiver terminal in the case of setting up an "AMR priority transmission" for a caller priority call category and a "select for reception", followed by selecting an "AMR reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception". If the receiver priority call category is "select for reception", the display unit 24e displays a menu of "UDI reception" or "AMR reception" to prompt a user selection.

If the user selects "AMR reception" by handling the operator unit 24d, the receiver terminal refers to the CALL CONFIRM setting information 110 and obtains a CALL CONFIRM setting (i.e., a response call category of "AMR" and terminal capability information of "AMR") corresponding to the receiver priority call category of "AMR reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "AMR" corresponding to the and CALL CONFIRM setting (i.e., a response call category of "AMR" and terminal capability information of "AMR") and stores it in the storage unit 21c.

The receiver side CN further refers to the storage unit 21c to obtain the first priority call category identifier and second priority call category identifier, and also refers to the connection call category judgment information 120 to judge a connection call category to be "AMR", that is, to judge that the caller terminal transmitting by the caller priority call category of "AMR priority transmission" can be connected to the receiver terminal by the AMR.

Then, the processing of the paragraph (8) shown by FIG. 7 establishes the AMR connection.

Figure 58:
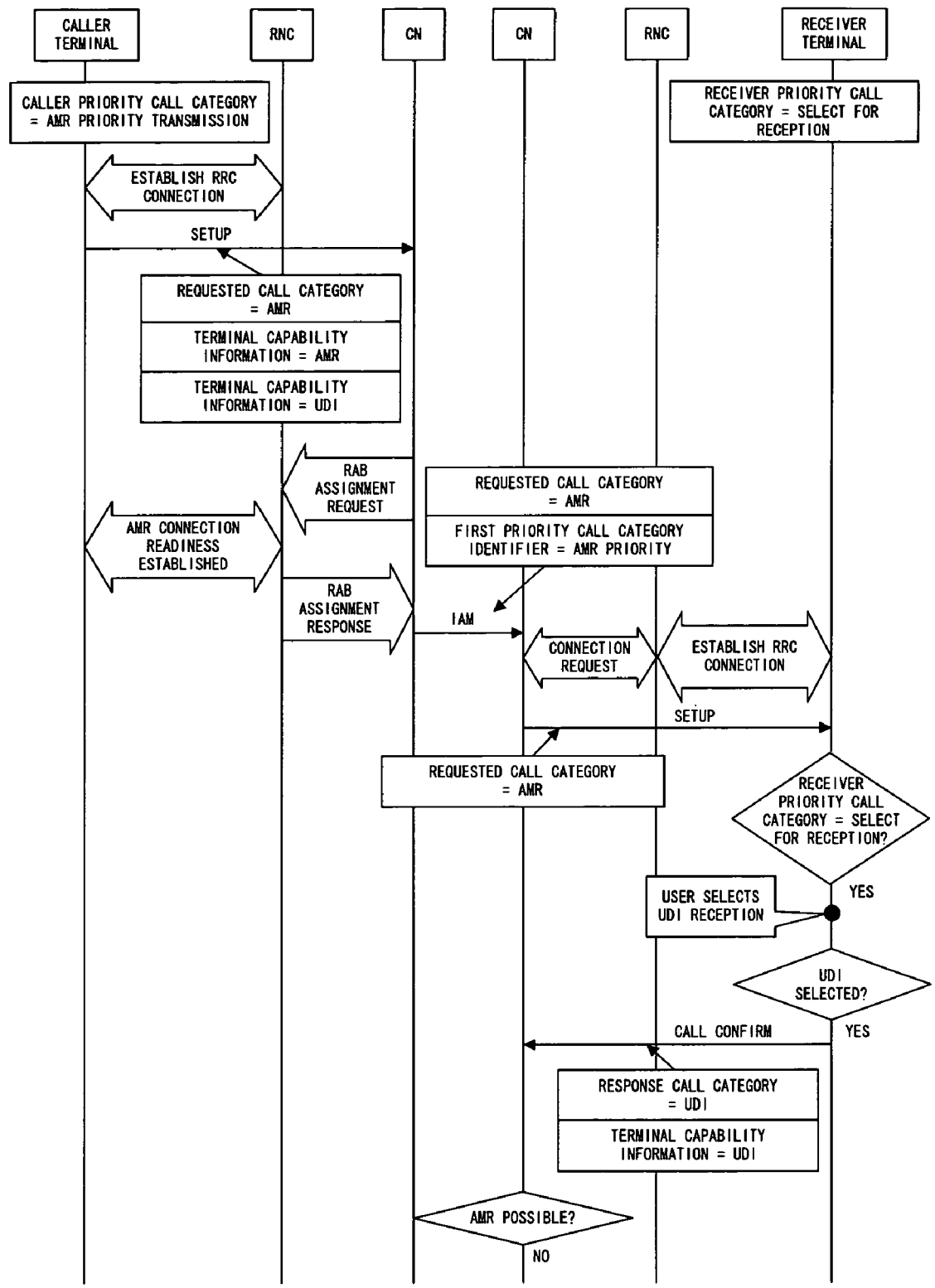
FIG. 58 exemplifies processing for telecommunication between a caller terminal and a receiver terminal in the case of setting up an "AMR priority transmission" for a caller priority call category and a "select for reception", followed by selecting a "UDI reception" for a receiver priority call category.

FIGS. 58 and 59 exemplify processing for telecommunication between a caller terminal and a receiver terminal in the case of setting up an "AMR priority transmission" for a caller priority call category and a "select for reception", followed by selecting a "UDI reception" for a receiver priority call category.

A caller terminal refers to the SETUP setting information 80 at the time of a transmission and obtains a SETUP setting (i.e., a requested call category of "AMR" and terminal capability information of "UDI/AMR") corresponding to the caller priority category of "AMR priority transmission", followed by transmitting the SETUP setting together with a SETUP signal to a caller side CN.

Having received the SETUP setting from the caller terminal, the caller side CN refers to the priority call category judgment information 90 and obtains a priority call category identifier (i.e., a first priority call category identifier) of "AMR priority" corresponding to the SETUP setting (i.e., a requested call category of "AMR" and terminal capability information of "UDI/AMR"), followed by transmitting the first priority call category identifier together with an IAM signal to a receiver side CN.

Having received the first priority call category identifier, the receiver side CN stores it in the storage unit 21c. And the receiver side CN refers to the requested call category judgment information 100 and obtains a requested call category of "AMR" corresponding to the first priority call category identifier, followed by transmitting the requested call category together with the SETUP signal to a receiver terminal.

Having received the SETUP signal from the receiver side CN, the receiver terminal refers to a receiver priority call category stored by the storage unit 24c for example and judges whether or not the aforementioned receiver priority call category is "select for reception". If the receiver priority call category is "select for reception", the display unit 24e displays a menu of "UDI reception" or "AMR reception" to prompt a user selection.

If the user selects "UDI reception" by handling the operator unit 24d, the receiver terminal refers to the CALL CONFIRM setting information 110 and obtains a CALL CONFIRM setting (i.e., a response call category of "UDI" and terminal capability information of "UDI") corresponding to the receiver priority call category of "UDI reception", followed by transmitting the CALL CONFIRM setting together with a CALL CONFIRM signal to the receiver side CN.

Having received the CALL CONFIRM setting from the receiver terminal, the receiver side CN refers to the priority call category judgment information 90, obtains a priority call category identifier (i.e., a second priority call category identifier) of "UDI" corresponding to the and CALL CONFIRM setting (i.e., a response call category of "UDI" and terminal capability information of "UDI") and stores it in the storage unit 21c.

The receiver side CN further refers to the storage unit 21c to obtain the first priority call category identifier and second priority call category identifier, and also refers to the connection call category judgment information 120 to judge a connection call category to be "UDI", that is, to judge that the caller terminal transmitting by the caller priority call category of "AMR priority transmission" can be connected to the receiver terminal responding by the receiver priority call category of "UDI reception" by the UDI.

Then, the processing of the paragraph (9) shown by FIG. 7 establishes the UDI connection.

As described thus far, a Core Network (CN; i.e., a telecommunication control system) according to the present embodiment determines a first priority call category identifier from a SETUP setting (i.e., a requested call category and terminal capability information) transmitted from a caller terminal, and determines a second priority call category identifier from a CALL CONFIRM setting (i.e., a response call category and terminal capability information) transmitted from a receiver terminal, followed by determining a connection configuration from the first priority call category identifier and second priority call category identifier.

Therefore, it is possible to determine the most appropriate connection configuration for connecting between the caller terminal and receiver terminal based on a connection configuration requested by the caller terminal and the one requested by the receiver terminal.

It is also possible to connect between the caller terminal and receiver terminal by a connection configuration desired by a user of a portable terminal, thereby enabling a drastic reduction of large load processing such as a connection is once disconnected followed by a reconnection.

As a result, wireless resources comprised by a CN can be effectively utilized, enabling increased active subscribers in the same network for instance.

It is also possible to avoid a case of being limited to a connection configuration requested by a caller terminal only because the most appropriate connection configuration is determined by a connection configuration requested by the caller terminal and the one requested by the receiver terminal.

For instance, even in the case of the caller terminal requesting for a UDI connection, it is possible to connect by a connection configuration (i.e., an AMR connection) requested by the receiver terminal if the caller priority call category of the caller terminal is set up with "UDI priority transmission" and the receiver priority call category of the receiver terminal is set up with "AMR reception". And if the receiver priority call category of the receiver terminal is set up with "select for reception", it is possible to select a connection configuration (i.e., AMR or UDI) responding to a call request from the caller terminal.

Furthermore, there is no necessity of a work required of a user at the time of a transmission, such as an advance validation of whether or not a receiver terminal is one capable of a UDI connection because the most appropriate connection configuration is determined by a connection configuration requested by the caller terminal and the one requested by the receiver terminal.

Also as shown by the present embodiment, an application of the present invention to an IMT-2000 system makes it possible to obtain the above described benefit while maintaining interchangeability with an existing system. For instance, what is enabled is a telecommunication system allowing both the conventional portable terminals and ones according to the present invention to coexist.

Although the present embodiment takes an example of a system configuration of the IMT (International Mobile Telecommunications)-2000 in the above description, it is apparent that an application of the present invention to other systems for carrying out the same telecommunication processing provides the same benefit, in lieu of being limited by the above described embodiment.

Also note that the SETUP setting information 80, the priority call category judgment information 90 shown by FIG. 11, requested call category judgment information 100 shown by FIG. 12, CALL CONFIRM setting information 110 shown by FIG. 13 and connection call category judgment information 120 shown by FIG. 14 are not meant to be limited by how they are put forth in the respective drawings. For instance, although a UDI selection is selected by matching with the setting of the first priority call category identifier if the first priority call category identifier is "UDI priority" and the second priority call category identifier is "AMR priority" in the application of the connection call category judgment information 120, it may be appropriate to select an AMR connection by matching with the setting of the second priority call category identifier.

What is claimed is:

1. A telecommunication control system, in a telecommunication network having one, two or more telecommunication control systems to perform a call control between terminals and to enable telecommunication between a caller terminal and a receiver terminal by an intercommunication between a caller side telecommunication control system of the one for communicating with the caller terminal and a receiver side telecommunication control system of the one for communicating with the receiver terminal, comprising:

a caller priority call category judgment unit to generate a first priority call category identifier by determining a priority call category based on first connection configuration information notified by the caller terminal;

a priority call category identifier notification unit to notify the receiver side telecommunication control system of the first priority call category identifier;

a requested call category judgment unit to judge a requested call category to be requested to the receiver terminal from a first priority call category identifier notified by the priority call category identifier notification unit;

a requested call category notification unit to notify the receiver terminal of the requested call category;

a receiver priority call category judgment unit to generate a second priority call category identifier by determining a priority call category based on second connection configuration information notified by the receiver terminal;

a connection call category judgment unit to determine a connection call category based on the first priority call category identifier and second priority call category identifier; and a telecommunication establishment unit to make telecommunication between the caller terminal and receiver terminal established by a connection call category judged by the connection call category judgment unit.

2. The telecommunication control system according to claim 1, further comprising a priority call category judgment information storage unit to store priority call category judgment information which defines a priority call category identifier corresponding to first connection configuration information transmitted from said caller terminal, wherein said caller priority call category judgment unit refers to the priority call category judgment information storage unit and generates a first priority call category identifier corresponding to the first connection configuration information.

3. The telecommunication control system according to claim 1, further comprising a requested call category judgment information storage unit to store requested call category judgment information which defines a requested call category, that is, the one corresponding to said first priority call category identifier, to be transmitted to a receiver terminal, wherein said requested call category judgment unit refers to the requested call category judgment information storage unit and judges a requested call category corresponding to the first priority call category identifier.

4. The telecommunication control system according to claim 1, further comprising a priority call category judgment information storage unit to store priority call category judgment information which defines a priority call category identifier corresponding to second connection configuration information transmitted from said receiver terminal, wherein said receiver priority call category judgment unit refers to the priority call category judgment information storage unit and generates a second priority call category identifier corresponding to said second connection configuration information.

5. The telecommunication control system according to claim 1, further comprising a connection call category judgment information storage unit to store connection call category judgment information which defines connection call categories corresponding to said first and second priority call category identifiers, wherein said connection call category judgment unit refers to the connection call category judgment information storage unit and determines a connection call category corresponding to the first and second priority call category identifiers.

6. A telecommunication method used for a telecommunication control system, in a telecommunication network having one, two or more telecommunication control systems to perform a call control between terminals and to enable telecommunication between a caller terminal and a receiver terminal by an intercommunication between a caller side telecommunication control system of the one for communicating with the caller terminal and a receiver side telecommunication control system of the one for communicating with the receiver terminal, the method makes the telecommunication control system carry out;

a priority call category judgment process for generating a first priority call category identifier by determining a priority call category based on first connection configuration information notified by the caller terminal;

a priority call category identifier notification process for notifying the receiver side telecommunication control system of the first priority call category identifier;

a requested call category judgment process for judging a requested call category to be requested to the receiver terminal from a first priority call category identifier notified by the priority call category identifier notification process;

a requested call category notification process for notifying the receiver terminal of the requested call category;

a priority call category judgment process for generating a second priority call category identifier by determining a priority call category based on second connection configuration information notified by the receiver terminal;

a connection call category judgment process for determining a connection call category based on the first priority call category identifier and second priority call category identifier; and a telecommunication establishment process for making telecommunication between the caller terminal and receiver terminal established by a connection call category judged by the connection call category judgment process.

7. A telecommunication system having one, two or more telecommunication control systems to perform a call control between terminals and to enable telecommunication between a caller terminal and a receiver terminal by an intercommunication between a caller side telecommunication control system of the one for communicating with the caller terminal and a receiver side telecommunication control system of the one for communicating with the receiver terminal, comprising:

a terminal which includes a caller call category setup unit to enable a setup of a caller call category, a caller call category notification unit to notify the caller side telecommunication control system of first connection configuration information responding to a caller call category set up by the caller call category setup unit, a receiver call category setup unit to enable a setup of a receiver call category, and a receiver call category notification unit to notify the receiver side telecommunication control system of second connection configuration information corresponding to a receiver call category set up by the receiver call category setup unit according to a request from the receiver side telecommunication control system; and a telecommunication control system which includes a caller priority call category judgment unit to generate a first priority call category identifier by determining a priority call category based on the first connection configuration information notified by the caller terminal, a priority call category identifier notification unit to notify the receiver side telecommunication control system of the first priority call category identifier, a requested call category judgment unit to judge a requested call category to be requested to the receiver terminal based on the first priority call category identifier notified by the priority call category identifier notification unit, a requested call category notification unit to notify the receiver terminal of the requested call category, a receiver priority call category judgment unit to generate a second priority call category identifier by determining a priority call category based on the second connection configuration information notified by the receiver terminal, a connection call category judgment unit to determine a connection call category based on the first priority call category identifier and second call category identifier, and a telecommunication establishment unit to make telecommunication between the caller terminal and receiver terminal established by a connection call category judged by the connection call category judgment unit.

* * * * *